US007952862B2

(12) United States Patent
Sakai

(10) Patent No.: US 7,952,862 B2
(45) Date of Patent: May 31, 2011

(54) ELECTRO-OPTICAL DEVICE AND ELECTRONIC APPARATUS

(75) Inventor: Toyohiro Sakai, Azumino (JP)

(73) Assignee: Epson Imaging Devices Corporation (JP)

(*) Notice: Subject to any disclaimer, the term of this patent is extended or adjusted under 35 U.S.C. 154(b) by 65 days.

(21) Appl. No.: 12/389,949

(22) Filed: Feb. 20, 2009

(65) Prior Publication Data

US 2009/0213534 A1 Aug. 27, 2009

(30) Foreign Application Priority Data

Feb. 22, 2008 (JP) ................................. 2008-041042
Feb. 22, 2008 (JP) ................................. 2008-041043
Feb. 22, 2008 (JP) ................................. 2008-041044

(51) Int. Cl.
H05K 5/00 (2006.01)
H05K 7/00 (2006.01)
(52) U.S. Cl. .......... 361/679.21; 361/679.56; 361/679.58
(58) Field of Classification Search ............. 361/679.21, 361/679.58, 679.56
See application file for complete search history.

(56) References Cited

U.S. PATENT DOCUMENTS

| 4,394,067 | A * | 7/1983 | Spruijt et al. ................. 349/153 |
| 6,151,091 | A | 11/2000 | Muramatsu |
| 6,309,902 | B1 | 10/2001 | Muramatsu |
| 7,019,809 | B2 | 3/2006 | Sekiguchi |
| 7,256,856 | B2 | 8/2007 | Imaeda |
| 7,271,861 | B2 | 9/2007 | Yamazaki |
| 7,324,172 | B2 | 1/2008 | Yamazaki |
| 2001/0044170 | A1 | 11/2001 | Muramatsu |
| 2007/0279546 | A1* | 12/2007 | Sohn ................................ 349/58 |
| 2008/0169497 | A1 | 7/2008 | Iino et al. |
| 2009/0115942 | A1* | 5/2009 | Watanabe ...................... 349/96 |

FOREIGN PATENT DOCUMENTS

| JP | 06-051285 | 2/1994 |
| JP | 07-028409 | 1/1995 |
| JP | 10-207399 | 8/1998 |
| JP | 11-242237 | 9/1999 |
| JP | 2000-242189 | 9/2000 |
| JP | 2002-108235 | 4/2002 |
| JP | 2003-005158 | 1/2003 |
| JP | 2003-280028 | 10/2003 |
| JP | 2003-295163 | 10/2003 |
| JP | 2004-165684 | 6/2004 |
| JP | 2004-258523 | 9/2004 |
| JP | 2005-043810 | 2/2005 |
| JP | 2006-011163 | 1/2006 |
| JP | 2006-079061 | 3/2006 |
| JP | 2006-227417 | 8/2006 |
| JP | 2007-193160 | 8/2007 |
| JP | 2007-225633 | 9/2007 |
| JP | 2007-240811 | 9/2007 |
| WO | WO03/003108 | 1/2003 |
| WO | WO2007/066424 | 6/2007 |

* cited by examiner

Primary Examiner — Jayprakash N Gandhi
Assistant Examiner — Anthony M Haughton
(74) Attorney, Agent, or Firm — Harness, Dickey & Pierce, P.L.C.

(57) ABSTRACT

An electro-optical device includes a panel having an electro-optical material with terminals in an end portion thereof, a wiring board connected to the terminals, a protective member fixed to the panel, a space portion defined by the end portion of the panel and the protective member, and a space filling member provided in the space portion between the end portion of the panel and the protective member.

4 Claims, 26 Drawing Sheets

ELECTRO-OPTICAL DEVICE AND ELECTRONIC APPARATUS

BACKGROUND

1. Technical Field

The present invention relates to an electro-optical device, such as a liquid crystal display or an organic EL (Electro Luminescence) device, and to an electronic apparatus, such as a mobile phone.

2. Related Art

An electro-optical device, such as a liquid crystal display, is widely used in an electronic apparatus, such as a mobile phone. For example, an electro-optical device is used as an image display unit of the electronic apparatus. A liquid crystal display serving as an electro-optical device is provided with liquid crystal serving as an electro-optical material interposed between a pair of substrates arranged so as to be opposite each other. An organic EL device serving as an electro-optical device is provided with an organic EL material serving as an electro-optical material on a substrate, and a protective member on the organic EL material.

A substrate for supporting the electro-optical material is formed of, for example, glass. The substrate may be subjected to impact when the electro-optical device or the electronic apparatus is accidently dropped, and may be damaged. In many cases, the boundary between two substrates arranged so as to be opposite each other in the liquid crystal display, or the boundary between the substrate and the protective member in the organic EL device may be damaged. This is considered to occur because stress becomes concentrated at the boundary.

A liquid crystal display 101 shown in FIG. 26A is taken into consideration. The liquid crystal display 101 has a large-area lower glass substrate 102, a small-area upper glass substrate 103, an upper polarizing plate 104 adhered to the outer surface of the upper glass substrate 103, and a lower polarizing plate 107 adhered to the lower glass substrate 102. A driving IC 105 is mounted in a planar portion of an extended portion of the lower glass substrate 102 outside the upper glass substrate 103, and an FPC (Flexible Printed Circuit) board 106 is connected to the edge portion of the extended portion.

The liquid crystal display 101 is received by a frame member, which is a part of the liquid crystal display 101, or by a receiving member, which is a part of an electronic apparatus using the liquid crystal display 101, in a portion indicated by a chain line $X_0$, that is, in the surface of the upper polarizing plate 104. The surface indicated by the chain line $X_0$ may be called a receiving surface. Typically, an interval of about 0.2 to 0.3 mm is formed between the receiving surface $X_0$ and the surface of the FPC board 106. If the liquid crystal display 101 is accidently dropped and the surface of the liquid crystal display 101 on the upper polarizing plate 104 side collides against an obstacle, such as a floor, as shown in FIG. 26B, a bending load F is applied to the extended portion of the lower substrate 102, and tensile stress $\sigma$ is generated at the boundary A between the lower substrate 102 and the upper substrate 103.

The tensile stress $\sigma$ was analyzed by using simulation software, and the analysis result shown in FIG. 27 was obtained. That is, it could be seen that stress was specifically concentrated at a central portion B in a widthwise direction (a densely hatched portion) at the boundary A between the lower substrate 102 and the upper substrate 103. For this reason, when the bending load F was applied to the extended portion of the lower substrate 102, the substrate was easily damaged at the boundary A.

In order to prevent the substrate from being damaged, an electro-optical device is known in which epoxy resin is applied to the boundary between a pair of substrates arranged so as to be opposite each other, thereby reinforcing the boundary (for example, see JP-A-2006-227417 (p. 4 and FIG. 1). In such an electro-optical device, resin is applied to the edge portion where a crack is easily generated, thereby increasing stress resistance.

In the known electro-optical device disclosed in JP-A-2006-227417, resin is applied to a portion where a crack is easily generated, thereby increasing stress resistance in the corresponding portion. However, it is not sufficient to suppress occurrence of a crack when the electro-optical device is accidently dropped. In addition, when an impact is applied to the electro-optical device, it is necessary to suppress occurrence of large stress inside the electro-optical device, which causes a crack.

SUMMARY

The invention can be implemented by the following aspects.

According to a first aspect of the invention, an electro-optical device includes a panel having an electro-optical material with terminals in an end portion thereof, a wiring board connected to the terminals, a protective member fixed to the panel, a space portion defined by the end portion of the panel and the protective member, and a space filling member provided in the space portion between the end portion of the panel and the protective member.

In this configuration, the "electro-optical material" is a material whose optical state changes in accordance with a change in electrical input. For example, the electro-optical material is liquid crystal used in a liquid crystal display or an organic EL material used in an organic EL device. The "panel" is a unit that can form an image by action of the electro-optical material. In the liquid crystal display, the panel is a unit including, for example, a polarizing plate, a visual quality improving sheet, and the like. The visual quality improving sheet is, for example, an anti-reflection sheet, a viewing angle adjusting sheet, or the like. In the organic EL device, the panel is a unit including a protective film for protecting an organic EL layer serving as an electro-optical material. When a visual quality improving sheet and the like are provided so as to overlap the protective film, the panel is a unit including the visual quality improving sheet.

The "wiring board" is, for example, an FPC board or a non-flexible circuit board. The "protective member" is a member for protecting the panel from impact. The protective member is formed of a flat plate-shaped plastic sheet having an area slightly larger than the panel.

The "space filling member" is a space member for burying a gap and is formed of a tape, resin (for example, silicon or epoxy), or the like. The tape is formed of resin, such as PET (polyethylene terephthalate), polycarbonate, or the like. The space filling member may be provided separately from the protective member or may be formed integrally with the protective member.

In the known electro-optical device, a space is formed between the end portion of the panel and the protective member. For this reason, when impact is applied to the panel due to dropping, the end portion of the panel in a portion where the space is formed may be bent in a direction close to the protective member, stress may be intensively generated in a portion where the panel starts to be bent, and the panel may be damaged or cracked from the portion. In contrast, with the electro-optical device according to the first aspect of the invention, the space filling member is filled, that is, implanted or crammed, in the space portion formed between the end portion of the panel and the protective member. For this reason, the end portion of the panel is received by the protective member through the space filling member. Therefore, even if impact is applied to the panel, the end portion of the panel is not bent and stress is not generated inside the end portion of the panel. As a result, the end portion of the panel can be effectively prevented from being damaged or cracked.

In the electro-optical device according to the first aspect of the invention, the space filling member may be provided in a region corresponding to the end portion of the panel.

In the electro-optical device according to the first aspect of the invention, the panel may have a pair of substrates with the electro-optical material interposed therebetween, one substrate of a pair of substrates may have a step portion protruding toward a principal surface of the other substrate, and the space portion may include a space portion corresponding to the height of the step portion. The principal surface is not a thin side surface, but a wide surface opposite the electro-optical material, which has a principal action as a substrate. With this configuration, the space portion includes the space portion corresponding to the protruding height of the step portion. In the electro-optical device having a step portion at the boundary between the substrates, stress may become concentrated at the step portion, and the substrate may be damaged from the step portion. However, if the above configuration is applied to such an electro-optical device, the substrate can be effectively prevented from being damaged.

The electro-optical device according to the first aspect of the invention may have a pair of substrates, like a liquid crystal display, or may have a single substrate. For example, the electro-optical device having a single substrate is an organic EL device (Organic Electroluminescence Display: OELD). The above-described configuration relates to an electro-optical device having a pair of substrates.

In the electro-optical device according to the first aspect of the invention, the space filling member may be fixed to the panel. With this configuration, the space filling member can be constantly disposed at an accurate position with respect to the panel.

According to a second aspect of the invention, an electronic apparatus includes a panel having an electro-optical material with terminals in an end portion thereof, a wiring board connected to the terminals, a casing fixing the panel, a protective member provided in the casing to protect the panel, a space portion defined by the end portion of the panel and the protective member, and a space filling member provided in the space portion between the end portion of the panel and the protective member.

In this electronic apparatus, the protective member is not fixed to the panel. In addition, in this electronic apparatus, the space filling member may be provided on the panel side, or the space filling member may be provided on the protective member side, that is, the casing.

In the known electronic apparatus, a space is formed between the end portion of the panel and the protective member. For this reason, when impact is applied to the panel due to dropping, the end portion of the panel in a portion where the space is formed may be bent in a direction close to the protective member, stress may be intensively generated in a portion where the panel starts to be bent, and the panel may be damaged or cracked from the portion. In contrast, with the electronic apparatus according to the second aspect of the invention, the space filling member is filled, that is, crammed in the space portion formed between the end portion of the panel and the protective member. For this reason, the end portion of the panel is received by the protective member through the space filling member. Therefore, even if impact is applied to the panel, the end portion of the panel is not bent, and stress is not generated inside the end portion of the panel. As a result, the end portion of the panel can be effectively prevented from being damaged or cracked.

In the electronic apparatus according to the second aspect of the invention, the space filling member may be fixed to the protective member. In this electronic apparatus, after the panel is fixed to the casing of the electronic apparatus, the protective member is mounted in the casing. Therefore, the space filling member is automatically disposed at a predetermined position so as to bury the space portion in the end portion of the panel. With this configuration, an electronic apparatus using the space filling member can be easily manufactured.

According to a third aspect of the invention, an electro-optical device includes a panel having an electro-optical material with terminals in an end portion thereof, a step portion being formed in the panel, and a space filling member provided in the end portion of the panel so as to have a height corresponding to the step portion. With this configuration, the panel and the space filling member are received by a protective member or an adequate receiving member. Therefore, when impact is applied to the panel, the space filling member and the receiving member together can prevent the end portion of the panel being bent. As a result, stress can be prevented from being intensively generated in the end portion of the panel, and thus the panel can be effectively prevented from being damaged.

According to a fourth aspect of the invention, an electro-optical device includes a substrate, an electro-optical material layer provided on the substrate, and a surface member provided so as to be opposite the substrate with the electro-optical material layer interposed therebetween. The substrate extends outward of the surface member in plan view, a space filling member is provided in a region corresponding to the extended portion, and the height of an outer surface of the space filling member from a surface of the substrate is equal to the height of an outer surface of the surface member from the surface of the substrate.

In this configuration, the "surface member" is a member located on an outermost side of an electro-optical panel, such as a liquid crystal panel or an organic EL panel, which generates an image. The surface member is, for example, a polarizing plate used in a liquid crystal display, a protective member protecting an EL layer in an organic EL device, or a visual quality improving sheet (for example, an anti-reflection sheet or a viewing angle adjusting sheet) used in various display devices.

With the electro-optical device according to the fourth aspect of the invention, the space filling member is provided in the extended portion of the substrate, and the height of the outer surface of the space filling member from the surface of the substrate is equal to the height of the outer surface of the surface member, such as a polarizing plate, from the surface of the substrate. Therefore, when the surface member is received by a receiving surface, the receiving surface also receives the surface of the space filling member. In the related art, the extended portion of the substrate is not received by the receiving surface. For this reason, if impact is applied to the substrate due to dropping, the extended portion of the substrate may be bent, stress may be generated at the boundary between the substrate and the surface member, and the substrate may be damaged or cracked from the boundary. In contrast, in the electro-optical device according to the fourth aspect of the invention, the extended portion of the substrate is received by the receiving surface through the space filling member. Therefore, when impact is applied to the substrate, the extended portion of the substrate is not bent, and thus stress is not generated at the boundary between the substrate and the surface member. As a result, the substrate can be effectively prevented from being damaged or cracked.

In the electro-optical device according to the fourth aspect of the invention, the surface member may be received by the protective member, and the protective member may extend to a region corresponding to the space filling member. The protective member is formed by a portion of a frame covering an electro-optical panel, such as a liquid crystal panel or an EL panel, opposite the surface member. For example, the protective member may be implemented by a protective cover protecting an electro-optical panel from impact or the like. If the protective member extends to the extended portion of the substrate, the protective member can prevent the extended portion of the substrate from being bent when impact is applied to the substrate. As a result, the substrate can be prevented from being damaged or cracked.

In the electro-optical device according to the fourth aspect of the invention, a wiring board may be connected to the extended portion of the substrate, the wiring board may extend outward of the substrate, and the space filling member may be provided on at least the wiring board extending onto the substrate. In general, the wiring board is connected to the edge portion of the extended portion of the substrate. The wiring board may be an FPC board. If the space filling member is provided in the edge portion of the substrate to which the wiring board is connected, and the space filling member is received by the protective member, the extended portion of the substrate can be effectively prevented from being bent when impact is applied to the substrate.

In the electro-optical device according to the fourth aspect of the invention, the space filling member may be a tape member, and the tape member may have an area equal to or smaller than the extended portion of the substrate. If the space filling member is a tape member, the space filling member can be simply provided on the substrate. In addition, if the tape member has the same area as the extended portion of the substrate or if the tape member has an area smaller than the extended portion of the substrate, the tape member can function as a space member for preventing the extended portion from being bent.

The electro-optical device according to the fourth aspect of the invention may further include a second substrate, the electro-optical material layer being interposed between the substrate and the second substrate. The surface member may be an optical element provided on the second substrate. This electro-optical device is an electro-optical device in which an electro-optical material is interposed between a pair of substrates. This electro-optical device is predominantly implemented as a liquid crystal display, which a liquid crystal layer is used as the electro-optical material layer. In such an electro-optical device, a member that is received by the protective member may be an optical element provided on the second substrate, for example, a polarizing plate. The polarizing plate is an optical element functioning to transmit specific polarized light and to absorb other polarized light.

In the electro-optical device according to the fourth aspect of the invention, in which the second substrate is used, the space filling member may be provided from the wiring board to the second substrate. In this configuration, the space filling member is provided over the wide region of the extended portion of the substrate. With this configuration, the space filling member can effectively prevent the extended portion of the substrate from being bent when impact is applied to the substrate.

In the electro-optical device according to the fourth aspect of the invention, an IC chip may be provided in the extended portion of the substrate, and the height of the IC chip from the surface of the substrate may be less than the height of the surface member from the surface of the substrate. In this case, the space filling member may be provided from the wiring board to the second substrate through the IC chip. If the space filling member is provided in a wide range of the extended portion of the substrate including the IC chip, a single rectangular sheet-like space filling member can be used, and the space filling member can be easily handled.

In the above-described electro-optical device, in which the space filling member covers the IC chip, the space filling member may have a light-shielding property to prevent light from entering the IC chip. With this configuration, the space filling member can prevent light from entering the IC chip, and thus the IC chip can be effectively prevented from being erroneously operated due to light.

In the electro-optical device according to the fourth aspect of the invention, an IC chip may be provided in the extended portion of the substrate, and the height of the IC chip from the surface of the substrate may be more than the height of an inner surface of the surface member from the surface of the substrate. In this case, an opening may be provided in the space filling member, and in a state where the IC chip is set in the opening, the space filling member may be provided from the wiring board to the second substrate. With this configuration, even if a high IC chip is used, the space filling member can be provided in the extended portion of the substrate without any problem.

According to a fifth aspect of the invention, an electronic apparatus that uses the electro-optical device according to the fourth aspect of the invention has a protective member receiving the surface member, which is an optical element of the electro-optical device. Such a protective member may be, for example, a protective cover for protecting the electro-optical device. Such an electronic apparatus is, for example, a mobile phone, a personal digital assistant, a portable TV, or the like. With the electronic apparatus according to the fifth aspect of the invention, the protective member receives the extended portion of the substrate of the electro-optical device through the space filling member, in addition to the surface member of the electro-optical device. Therefore, when impact is applied to the substrate due to dropping, the extended portion of the substrate can be prevented from being bent. As a result, the substrate can be effectively prevented from being damaged or cracked, and impact-resistant strength of the electronic apparatus can be increased.

According to a sixth aspect of the invention, an electro-optical device includes a substrate having an electro-optical material with terminals in an end portion thereof, a member provided opposite the substrate with the electro-optical material interposed therebetween, a protective member fixed to the member, an electronic part provided in the end portion of the substrate, a space portion defined by the end portion of the substrate and the protective member, and a spacer provided in the space portion between the end portion of the substrate and the protective member, and in a region where the electronic part is not provided.

In this configuration, the "protective member" is a member for protecting a panel (for example, a liquid crystal panel or an organic EL panel) which performs image display. The protective member may be formed by, for example, a flat plate-shaped sheet made of plastic. The electronic part is a part constituting an electronic circuit, for example, an IC chip.

The "member provided opposite the substrate with the electro-optical material interposed therebetween" is a member to which the protective member is fixed. The member may be a member disposed on an outermost side of the electro-optical device to form an outermost surface of the electro-optical device, or a member disposed closer to the substrate than the outermost surface forming member. For example, when the outermost surface forming member is a polarizing plate, and the polarizing plate is fixed onto the glass substrate, the protective member may be fixed to the glass substrate, not the polarizing plate. In this case, the "member provided opposite the substrate with the electro-optical material interposed therebetween" is not the polarizing plate forming the outermost surface of the electro-optical device, but the underlying glass substrate.

In the known electro-optical device, a space portion is formed in the end portion of the substrate. If impact is applied to the electro-optical device due to dropping, and an external force is applied to the substrate, the substrate may be bent in the space portion, stress may be generated in a portion where the substrate starts to be bent, and the substrate may be damaged or cracked from the portion. In contrast, with the electro-optical device according to the sixth aspect of the invention, the spacer is provided in the space portion which is formed in the end portion of the substrate. Therefore, the space is buried with the spacer, when impact is applied to the substrate, the substrate is not bent in the space portion, and stress is not generated in the substrate. As a result, the substrate can be effectively prevented from being damaged or cracked. In this way, an electro-optical device having excellent impact resistance can be obtained.

In the electro-optical device according to the sixth aspect of the invention, the spacer may have a corner portion near a corner portion of the substrate, and the corner portion of the spacer may be in a region within 0.5 mm, in two directions, of the corner portion from the vertex of the corner portion of the substrate. If the spacer is provided in the end portion of the substrate within the range, the end portion of the substrate can be effectively prevented from being bent.

According to a seventh aspect of the invention, an electro-optical device includes a substrate having an electro-optical material with terminals in an end portion thereof, a member provided opposite the substrate with the electro-optical material interposed therebetween to form an outermost surface, a protective member fixed to the member, an electronic part provided in the end portion of the substrate, and a space portion defined by the end portion of the substrate and the protective member. The height from a surface of the substrate, on which the terminals are provided, to an outer surface of the electronic part is less than the height from the surface of the substrate, on which the terminals are provided, to an outer surface of the member. A spacer is provided on at least the electronic part in the space portion between the end portion of the substrate and the protective member.

In this configuration, the outermost surface forming member is a member provided on an outermost side of an electro-optical panel, for example, a liquid crystal panel or an EL panel, which is a single unified configuration (unit) for displaying an image. For example, the member is (1) a polarizing plate used in a liquid crystal display, (2) a protective member protecting an organic EL layer in an organic EL display, (3) a visual quality improving sheet (for example, an anti-reflection sheet or a viewing angle adjusting sheet) used in various display devices, or (4) a glass substrate.

With this electro-optical device, the spacer is buried in the space portion that is formed between the electronic part provided in the end portion of the substrate and the protective member. Therefore, when impact is applied to the substrate, the substrate is not bent in the space portion, and thus stress is not generated in the substrate. As a result, the substrate can be effectively prevented from being damaged or cracked. In this way, an electro-optical device having excellent impact resistance can be obtained.

According to an eighth aspect of the invention, an electronic apparatus includes a substrate having an electro-optical material with terminals in an end portion thereof, a member provided opposite the substrate with the electro-optical material interposed therebetween, a casing fixing the substrate, a protective member provided in the casing to protect the substrate, an electronic part provided in the end portion of the substrate, a space portion defined by the end portion of the substrate and the protective member, and a spacer provided in the space portion between the end portion of the substrate and the protective member, and in a region where the electronic part is not provided.

With this electronic apparatus, the spacer is buried in the space portion formed in the end portion of the substrate. Therefore, when impact is applied to the substrate, the substrate is not bent in the space portion, and thus stress is not generated in the substrate. As a result, the substrate can be effectively prevented from being damaged or cracked. In this way, an electronic apparatus having excellent impact resistance can be obtained.

According to a ninth aspect of the invention, an electronic apparatus includes a substrate having an electro-optical material with terminals in an end portion thereof, a member provided opposite the substrate with the electro-optical material interposed therebetween to form an outermost surface, a casing fixing the substrate, a protective member provided in the casing to protect the substrate, an electronic part provided in the end portion of the substrate, and a space portion defined by the end portion of the substrate and the protective member. The height from a surface of the substrate, on which the terminals are provided, to an outer surface of the electronic part is less than the height from the surface of the substrate, on which the terminals are provided, to an outer surface of the member. A spacer is provided on at least the electronic part in the space portion between the end portion of the substrate and the protective member.

With this electronic apparatus, the spacer is buried in the space portion that is formed between the electronic part provided in the end portion of the substrate and the protective member. Therefore, when impact is applied to the substrate, the substrate is not bent in the space portion, and thus stress is not generated in the substrate. As a result, the substrate can be effectively prevented from being damaged or cracked. In this way, an electronic apparatus having excellent impact resistance can be obtained.

According to a tenth aspect of the invention, an electro-optical device includes a substrate having an electro-optical material with terminals in an end portion thereof, a member provided opposite the substrate with the electro-optical material interposed therebetween to form an outermost surface, an electronic part provided in the end portion of the substrate, and a spacer provided in a region where the electronic part is not provided. The height from a surface of the substrate, on which the terminals are provided, to an outer surface of the spacer is substantially equal to the height from the surface of the substrate, on which the terminals are provided, to an outer surface of the member.

With this electro-optical device, the height of the outer surface of the spacer is substantially equal to the height of the outer surface of the outermost surface forming member. For this reason, when the outermost surface forming member is received by a protective cover or another receiving member, the receiving member necessarily receives the spacer. Therefore, the end portion of the substrate can be received by the receiving member such that the end portion of the substrate, in which the spacer is provided, is not bent. As a result, the end portion of the substrate can be prevented from being bent when impact is applied to the substrate, and the substrate can be prevented from being damaged or cracked.

According to an eleventh aspect of the invention, an electro-optical device includes a substrate having an electro-optical material with terminals in an end portion thereof, a member provided opposite the substrate with the electro-optical material interposed therebetween to form an outermost surface, an electronic part provided in the end portion of the substrate, and a spacer provided on at least the electronic part. The height from a surface of the substrate, on which the terminals are provided, to an outer surface of the spacer is substantially equal to the height from the surface of the substrate, on which the terminals are provided, to an outer surface of the member.

With this electro-optical device, the spacer is provided on the electronic part provided in the end portion of the substrate, and the height of the outer surface of the spacer is substantially equal to the height of the outer surface of the outermost surface forming member. For this reason, when the outermost surface forming member is received by a protective cover or another receiving member, the receiving member necessarily receives the spacer. Therefore, the end portion of the substrate can be received by the receiving member such that the end portion of the substrate, in which the electronic part and the spacer are provided, is not bent. As a result, the end portion of the substrate can be prevented from being bent when impact is applied to the substrate, and the substrate can be prevented from being damaged or cracked.

According to a twelfth aspect of the invention, an electro-optical device includes a substrate, an electro-optical material layer provided on the substrate, and a member provided opposite the substrate with the electro-optical material layer interposed therebetween to form an outermost surface. The substrate has an extended portion extending outside the outermost surface forming member in plan view, that is, an end portion. An electronic part (for example, an IC chip) is provided in the end portion of the substrate, and the electronic part is provided so as to lean to one side with respect to a center line of the end portion of the substrate in a direction along a side of the outermost surface forming member, which forms the end portion of the substrate. A spacer is provided in the end portion of the substrate opposite the side to which the electronic part leans, and the spacer is used so as to bury a space on the substrate to a position corresponding to the height of the outermost surface forming member from a surface of the substrate.

With this electro-optical device, the spacer is provided in a region opposite the side, to which the electronic part leans, in the extended portion of the substrate, that is, the end portion of the substrate. The spacer is used so as to bury the space on the substrate to the position corresponding to the height of the outermost surface forming member from the surface of the substrate. Therefore, when the outermost surface forming member is received by a receiving member, such as a protective cover, the receiving member also receives a surface of the spacer. In the related art, a region opposite the electronic part in the end portion of the substrate is not received by the receiving member. For this reason, if impact is applied to the substrate due to dropping, the region in the end portion of the substrate may be bent, stress may be generated in a portion where the substrate starts to be bent, and the substrate may be damaged or cracked from the portion. In contrast, with the electro-optical device according to the twelfth aspect of the invention, the end portion of the substrate is received by the receiving member through the spacer. Therefore, when impact is applied to the substrate, the end portion of the substrate is not bent, and thus stress is not generated in the substrate. As a result, the substrate can be effectively prevented from being damaged or cracked. In this way, an electro-optical device having excellent impact resistance can be obtained.

The receiving member may be one of the constituent elements of the electro-optical device or one of the constituent elements of the electronic apparatus using the electro-optical device. The receiving member may function as a protective member or a protective cover of the electro-optical panel.

In the electro-optical device according to twelfth aspect of the invention, the height of a surface of the electronic part from the surface of the substrate may be equal to the height of a surface of the outermost surface forming member from the surface of the substrate, and the height of a surface of the spacer from the surface of the substrate may be equal to the height of the surface of the outermost surface forming member from the surface of the substrate. With this configuration, the end portion of the substrate can be received by the receiving member through the electronic part and the spacer, and as a result, the receiving member can prevent the end portion of the substrate from being bent.

In the electro-optical device according to the twelfth aspect of the invention, the height of the surface of the electronic part from the surface of the substrate may be less than the height of the surface of the outermost surface forming member from the surface of the substrate, and the height of the surface of the spacer from the surface of the substrate may be more than the height of the surface of the outermost surface forming member from the surface of the substrate. A second spacer may be provided on the electronic part and the second spacer, and the height of a surface of the second spacer from the surface of the substrate may be equal to the height of the surface of the outermost surface forming member from the surface of the substrate.

With this configuration, the end portion of the substrate can be received by the receiving member through a laminate of an electronic part and a second spacer, and a laminate of the spacer and the second spacer. The receiving member can prevent the end portion of the substrate from being bent.

In the above-described electro-optical device using the second spacer, the height of the surface of the electronic part from the surface of the substrate may be equal to the height of the surface of the spacer from the surface of the substrate, and the second spacer may have a uniform thickness. With this configuration, the second spacer can be easily formed, and the configuration for preventing the end portion of the substrate can be made stable.

In the electro-optical device using the second spacer, the second spacer may have a width larger than the electronic part and smaller than the spacer in plan view. The electronic part is a small electronic part, and thus if the second spacer is formed so as to be larger than the width of the electronic part, the corresponding portion can be made stable in a state of being received by the receiving member.

In the electro-optical device using the second spacer, the second spacer may be a light-shielding sheet. With this configuration, light can be prevented from entering the electronic part, and the electronic part can be prevented from being erroneously operated due to light. In addition, the second spacer may have an area larger than the electronic part in plan view. With this configuration, light can be effectively prevented from entering the electronic part.

In the electro-optical device according to the twelfth aspect of the invention, the height of a surface of the electronic part from a surface of the substrate may be less than the height of a surface of the outermost surface forming member from the surface of the substrate, and the height of a surface of the spacer from the surface of the substrate may be equal to the height of the surface of the outermost surface forming member from the surface of the substrate. A second spacer may be provided on the electronic part, and the height of a surface of the second spacer from the surface of the substrate may be equal to the height of the surface of the outermost surface forming member from the surface of the substrate. This electro-optical device has the configuration in which a second spacer is provided only on the electronic part, and no second spacer is provided on the spacer. With this electro-optical device, one side of the end portion of the substrate is received by a laminate of the electronic part and the second spacer, and the other side of the end portion of the substrate is received by the single-layered spacer.

In the electro-optical device according to the twelfth aspect of the invention, the spacer may have the same area as the electronic part in plan view, and the electronic part and the spacer may be provided symmetric with respect to a center line of the end portion of the substrate in a direction along a side of the outermost surface forming member, which forms the end portion of the substrate. With this configuration, even if the electronic part and the spacer are small, the extended portion of the substrate can be stably received by the receiving member.

According to a thirteenth aspect of the invention, an electro-optical device includes a panel having an electro-optical material with terminals in an end portion thereof, a protective member protecting the panel, a space portion defined by the end portion of the panel and the protective member, and an additional member provided in the space portion between the end portion of the panel and the protective member, and outside a display region of the panel.

In this configuration, the "protective member" may be formed by a flat plate-shaped plastic sheet member having an opening corresponding to an effective display region of the panel. Usually, the opening is blocked by a transparent plastic film.

The "additional member" functions as a space member burying the space portion between the end portion of the panel and the protective member, and is formed by a tape or resin (for example, silicon or epoxy). The tape is formed of resin, such as PET or polycarbonate. The additional member may be provided separately from the protective member, or may be formed by integral molding with the protective member.

In the known electro-optical device, a space is formed between the end portion of the panel and the protective member. For this reason, when impact is applied to the panel due to dropping, the end portion of the panel in a portion where the space is formed may be bent in a direction close to the protective member, stress may be intensively generated in a portion where the panel starts to be bent, and the panel may be damaged or cracked from the portion. In contrast, with the electro-optical device according to the thirteenth aspect of the invention, the additional member is provided in the space portion, which is formed between the end portion of the panel and the protective member. For this reason, the end portion of the panel is received by the protective member through the additional member. Therefore, even if impact is applied to the panel, the end portion of the panel is not bent, and stress is not generated inside of the end portion of the panel. As a result, the end portion of the panel can be effectively prevented from being damaged or cracked.

In the electro-optical device according to the thirteenth aspect of the invention, the additional member is provided between the end portion of the panel and the protective member, and is also provided in a portion other than the display region. In the configuration in which an additional member is provided only in the end portion of the panel, and no additional member is provided in a main body portion of the panel, a step is newly generated between the end portion and the main body portion of the panel. For this reason, when impact is applied to the panel, the panel may be damaged due to the new step. In contrast, in the electro-optical device according to the thirteenth aspect of the invention, the additional member is provided in the main body portion of the panel, as well as the main body portion of the panel. Therefore, there is no case in which a step is newly generated between the end portion and the main body portion of the panel. In addition, if the additional member is provided in the main body portion of the panel, the main body portion can be reinforced.

In the electro-optical device according to the thirteenth aspect of the invention, the additional member may be formed of an impact absorbing material. The impact absorbing material is a material absorbing an impact force. Examples of the impact absorbing material include (1) rubber, (2) a foam material containing acrylic resin as a major component, (3) a gel material containing urethane resin as a major component, (4) a gel material containing polyurethane resin as a major component, (5) a material containing ether-based polyurethane resin as a major component, and (6) a gel material containing silicon as a major component. If the additional member is formed of an impact absorbing material, when impact is applied to the panel due to dropping, a load to be applied to the panel can be reduced. As a result, an electro-optical device can be further reliably prevented from being damaged.

In the electro-optical device according to the thirteenth aspect of the invention, a portion of the additional member provided in the space portion may be thicker than a portion of the additional member provided outside a display region of the panel. With the thick portion, a space between the end portion of the panel and the protective member can be effectively buried.

In the electro-optical device according to the thirteenth aspect of the invention, a part may be provided in the end portion of the panel, and the additional member may be provided in the space portion between the part and the protective member. With this configuration, the end portion of the panel can be received by the protective member through the part. The additional member may be in contact with the top surface of the part or may be separated from the top surface of the part at an appropriate gap.

The electro-optical device according to the thirteenth aspect of the invention may further include a wiring board connected to the end portion of the panel, and an IC chip provided in the end portion of the panel. The part may be at least one of the wiring board and the IC chip. In this case, the part may be at least one of the wiring board and the IC chip. The wiring board or the IC chip has a comparatively large area. Therefore, if the wiring board or the IC chip is received by the additional member and the protective member, the end portion of the panel can be stably received. The "wiring board" is, for example, an FPC board or a non-flexible circuit board.

In the electro-optical device according to the thirteenth aspect of the invention, in a portion of the additional member provided in the space portion, a thick portion, which is thicker than a portion outside the display region of the panel, may be formed separately from a remaining portion of the additional member, and the thick portion and the remaining portion may be bonded to each other. With this configuration, the shape or dimension of the thick portion can be freely formed. In addition, the main body portion and the thick portion of the additional member may be formed of materials having different properties. As a result, a degree of freedom in design increases.

In the electro-optical device according to the thirteenth aspect of the invention, the panel may have a pair of substrates with the electro-optical material interposed therebetween, one substrate of a pair of substrates may have a step portion protruding toward a principal surface of the other substrate, and the space portion may include a space portion corresponding to the height of the step portion. In this electro-optical device, one substrate of a pair of substrates has the step portion protruding toward the principal surface of the other substrate, and the space portion defined by the end portion of the panel and the protective member includes the space portion corresponding to the height of the step portion. The principal surface is not a thin side surface, but a wide surface opposite the electro-optical material, which has a principal action as a substrate.

In this configuration, the space portion includes the space portion corresponding to the protruding height of the step portion. In this electro-optical device that has the step portion at the boundary between the substrates, stress may become concentrated at the step portion, and the substrate may be damaged from the portion. If the above configuration is applied to such an electro-optical device, the substrate can be effectively prevented from being damaged. The electro-optical device according to the thirteenth aspect of the invention may have a pair of substrates, like a liquid crystal display, or may have a single substrate. For example, the electro-optical device having a single substrate is an organic EL device. The above-described configuration relates to an electro-optical device having a pair of substrates.

According to a fourteenth aspect of the invention, an electronic apparatus includes a panel having an electro-optical material with terminals in an end portion thereof, a casing fixing the panel, a protective member provided in the casing to protect the panel, a space portion defined by the end portion of the panel and the protective member, and an additional member provided in the space portion between the end portion of the panel and the protective member, the additional member may be provided outside a display region of the panel. In this electronic apparatus, typically, the protective member is not fixed to the panel.

In the known electronic apparatus, a space is formed between the end portion of the panel and the protective member. For this reason, when impact is applied to the panel due to dropping, the end portion of the panel in a portion where the space is formed may be bent in a direction close to the protective member, stress may be intensively generated in a portion where the panel starts to be bent, and the panel may be damaged or cracked from the portion. In contrast, with the electronic apparatus according to the fourteenth aspect of the invention, the additional member is provided in the space portion that is formed between the end portion of the panel and the protective member. For this reason, the end portion of the panel is received by the protective member through the additional member. Therefore, even if impact is applied to the panel, the end portion of the panel is not bent, and stress is not generated in the end portion of the panel. As a result, the end portion of the panel can be effectively prevented from being damaged or cracked.

According to a fifteenth aspect of the invention, an electro-optical device includes a panel having an electro-optical material with terminals in an end portion thereof, and an additional member provided in the end portion of the panel and outside a display region of the panel. With this configuration, the panel and the additional member are received by the protective member. Therefore, the additional member and the protective member together can prevent the end portion of the panel from being bent when impact is applied to the panel. As a result, stress can be prevented from being intensively generated in the end portion of the panel, and thus the panel can be effectively prevented from being damaged.

According to a sixteenth aspect of the invention, an electro-optical device includes a substrate, an electro-optical material layer provided on the substrate, a surface member provided opposite the substrate with the electro-optical material layer interposed therebetween, and an additional member receiving a surface of the surface member. The substrate has an extended portion extending outward of the surface member in plan view. The additional member is formed of an impact absorbing material, and has an extended portion extending outward of the surface member in plan view. The extended portion of the additional member has a thick portion that is formed thick to prevent the substrate from being bent toward the additional member.

In this configuration, the "surface member" is a member provided on an outermost side of an electro-optical panel, such as a liquid crystal panel. The surface member is, for example, (1) a polarizing plate used in a liquid crystal display, (2) a protective member protecting an organic EL layer in an organic EL display, (3) a visual quality improving sheet (for example, an anti-reflection sheet or a viewing angle adjusting sheet) used in various display devices, or (4) a glass substrate. The "additional member" has the same function as the above-described additional member.

With the electro-optical device according to the sixteenth aspect of the invention, the entire electro-optical panel having the substrate, the electro-optical material layer, and the surface member is received by the additional member formed of the impact absorbing material. Therefore, even if large impact is applied to the electro-optical device due to dropping, the electro-optical panel is not subjected to large impact and is protected so as not to be damaged or cracked.

The extended portion of the substrate of the electro-optical panel is received by the extended portion of the additional member. For this reason, when impact is applied to the substrate due to dropping, the substrate is not curved or bent. Therefore, bending stress is not generated at the boundary between the substrate and the surface member, and as a result, the substrate is prevented from being damaged or cracked. In this way, an electro-optical device having excellent impact resistance can be obtained.

In the electro-optical device according to the sixteenth aspect of the invention, the thick portion of the extended portion of the additional member may be in contact with or close to a surface of the substrate. With this configuration, the substrate can be directly received by the additional member.

In the electro-optical device according to the sixteenth aspect of the invention, a part may be provided in the extended portion of the substrate. In this case, the thick portion of the extended portion of the additional member may be in contact with or close to a surface of the part. With this configuration, the extended portion of the substrate can be received by the additional member through the part.

In the electro-optical device according to the sixteenth aspect of the invention, the part may be an IC chip mounted on a wiring board connected to the substrate or the substrate. The wiring board or the IC chip has a comparatively large area in the extended portion of the substrate. Therefore, if the wiring board or the IC chip is received, the extended portion of the substrate can be stably received.

In the electro-optical device according to the sixteenth aspect of the invention, the part may be a wiring board, the wiring board may be connected to an edge portion of the substrate, and the thick portion of the extended portion of the additional member may be in contact with or close to a surface of a portion of the wiring board connected to the substrate. In general, the wiring board is connected to the edge portion of the substrate. Therefore, if a connection end portion of the wiring board is received by the thick portion of the extended portion of the additional member, the extended portion of the substrate can be reliably prevented from being bent, and the extended portion of the substrate can be effectively from being prevented.

In the electro-optical device according to the sixteenth aspect of the invention, the thick portion of the extended portion of the additional member may be integrally connected to a remaining portion of the additional member in a material manner, that is, in a member manner. With this configuration, the additional member can be simply formed of a single sheet-like material.

In the electro-optical device according to the sixteenth aspect of the invention, the thick portion of the extended portion of the additional member may be formed separately from a remaining portion of the additional member in a material manner, that is, in a member manner, and the thick portion and the remaining portion may be bonded to each other. With this configuration, the shape or dimension of the thick portion can be freely formed. In addition, the main body portion and the thick portion of the additional member may be formed of materials having different properties. As a result, a degree of freedom in design increases.

The electro-optical device according to the sixteenth aspect of the invention may further include a protective member that protects a structure including the substrate, the electro-optical material, and the surface member. In this case, the additional member may be disposed between the surface member and the protective member. The structure including the substrate, the electro-optical material, and the surface member may be called an electro-optical panel. The electro-optical panel is a liquid crystal panel when the electro-optical material is liquid crystal or an organic EL panel when the electro-optical material is an organic EL material.

The protective member may be formed of a plastic sheet material to have a flat plate shape with an opening formed to correspond to an effective display region of the electro-optical panel. Typically, the opening is blocked by a transparent plastic film. The protective member prevents the electro-optical panel from being damaged due to external impact or from protruding to the outside. Like the above configuration, if the additional member made of the impact absorbing material is provided between the protective member and the surface member, the electro-optical device can be effectively protected from impact.

According to a seventeenth aspect of the invention, an electronic apparatus includes the above-described electro-optical device (excluding an electro-optical device including a protective member), and a protective member protecting the electro-optical device. The additional member constituting the electro-optical device is disposed between the surface member constituting the electro-optical device and the protective member.

With this electronic apparatus, the protective member can protect the electro-optical device from being damaged or cracked. In addition, the additional member made of the impact absorbing material is disposed between the protective member and the electro-optical panel. Therefore, high impact resistance is achieved. Furthermore, the extended portion of the substrate constituting the electro-optical panel is received by the thick portion of the extended portion of the additional member. When impact is applied to the substrate, the extended portion of the substrate is not bent, and thus tensile stress is not generated in the substrate. As a result, the substrate (consequently, the electro-optical device and the electronic apparatus) is prevented from being damaged.

According to an eighteenth aspect of the invention, an electronic apparatus has mounted thereon the above-described electro-optical device. For example, with the electro-optical device according to the twelfth aspect of the invention, in which the electronic part is mounted to lean to one side in the end portion of the substrate, the end portion of the substrate can be prevented from being bent, and the substrate can be effectively prevented from being damaged. Therefore, in the electronic apparatus using the electro-optical device, a portion where the electro-optical device is provided can be effectively prevented from being damaged.

BRIEF DESCRIPTION OF THE DRAWINGS

The invention will be described with reference to the accompanying drawings, wherein like numbers reference like elements.

DESCRIPTION OF EXEMPLARY EMBODIMENTS

Electro-Optical Device According to First Embodiment

Figure 1:
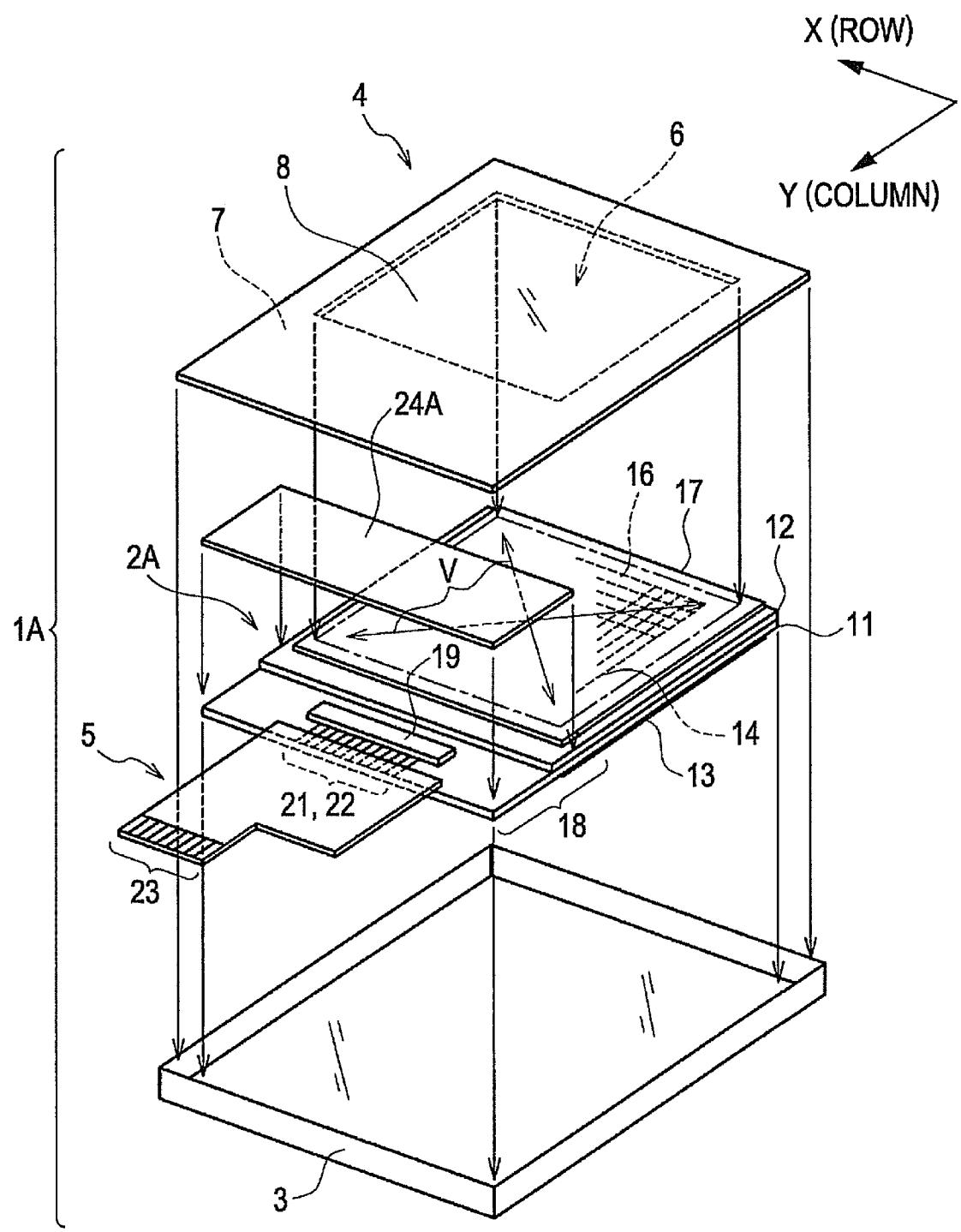
FIG. 1 is an exploded perspective view showing an electro-optical device according to a first embodiment of the invention.

Hereinafter, an embodiment of the invention will be described with reference to the drawings. Although the following description will be provided with reference to the drawings, in terms of ease of understanding of distinctive portions, the constituent elements in the drawings may be shown on a scale different from that of the actual constituent elements.

FIG. 1 shows a liquid crystal display which is an example of an electro-optical device according to this embodiment. A liquid crystal display 1A includes a liquid crystal panel 2A serving as a panel, an FPC (Flexible Printed Circuit) board 5, serving as a wiring board, connected to the liquid crystal panel 2A, a lower frame 3, and a protective cover 4 serving as a protective member or a receiving member. When the liquid crystal panel 2A is a transmissive liquid crystal panel, a backlight, serving as an illumination device, which is not shown in FIG. 1, is provided between the lower frame 3 and the liquid crystal panel 2A. The lower frame 3 and the protective cover 4 function as a frame covering the liquid crystal panel 2A.

The lower frame 3 is a boxlike frame member, made of metal or plastic, having side wall portions on four sides. A cutout may be provided on a side corresponding to the FPC board 5. The protective cover 4 is formed, for example, by attaching a transparent plastic sheet 8 to the entire surface of a plastic flat plate frame 7 having a rectangular opening 6 such that the opening 6 is covered with the transparent plastic sheet 8. The flat plate frame 7 is formed of hard plastic, and has flexibility but has strong elasticity sufficient to maintain the flat plate shape. If the liquid crystal panel 2A is housed in the lower frame 3, and the protective cover 4 is incorporated into the lower frame 3 on the liquid crystal panel 2A, the liquid crystal display 1A as a single module is completed.

The shape of the lower frame 3 is determined in various ways in accordance with the shape and function of an electronic apparatus (for example, a mobile phone) into which the liquid crystal display 1A is incorporated. Accordingly, the shape of the protective cover 4 is also appropriately determined. The lower frame 3 may be a constituent element of an electronic apparatus, and in this case, the protective cover 4 becomes one of the constituent elements of the electronic apparatus.

The liquid crystal panel 2A is formed by bonding an element substrate 11 (lower side of FIG. 1) and a color filter substrate 12 provided on an upper side so as to be opposite the element substrate 11 using a frame-shaped sealing material (not shown) around the periphery of the element substrate 11 and the color filter substrate 12. In a region surrounded by the sealing material between the element substrate 11 and the color filter substrate 12, for example, TN (Twisted Nematic)-mode liquid crystal serving as an electro-optical material is filled to form a liquid crystal layer serving as an electro-optical material layer. In this embodiment, the color filter substrate 12 is disposed on an observation side (the upper side of FIG. 1), and the element substrate 11 is disposed on a rear side (the lower side of FIG. 1) when viewed from the observation side.

The element substrate 11 is formed of, for example, glass or plastic, and has a substrate (hereinafter, referred to as a base material substrate) serving as a base material having a rectangular shape (oblong or square) when viewed from the observation side in plan view. The base material substrate defines the entire shape of the element substrate 11. A polarizing plate 13 is provided on a principal surface (a wide surface with no side surface) outside of the base material substrate (the lower side of FIG. 1). As occasion demands, other optical elements are provided. A plurality of source lines 14 and a plurality of gate lines 16 are provided on a principal surface inside of the base material surface (the liquid crystal layer side). The source lines 14 and the gate lines 16 are perpendicular to each other in plan view. In each rectangular planar region surrounded by the source lines 14 and the gate lines 16, a TFT (Thin Film Transistor) element serving as a switching element or an active element, a pixel electrode, and the like, all of which are not shown, are formed. The TFT element is formed using an amorphous silicon semiconductor.

The source lines 14 extend in a column direction Y. The gate lines 16 extend in a row direction X. The TFT element is connected to a corresponding one of the source lines 14 and a corresponding one of the gate lines 16. The source line 14, the gate line 16, and the pixel electrode are connected to the source, gate, and drain of the corresponding TFT element, respectively. The source lines 14 function as data lines transmitting data signals to the TFT elements. The gate lines 16 function as scanning lines transmitting scanning signals to the TFT elements.

Next, the color filter substrate 12 disposed opposite the element substrate 11 is formed of, for example, glass or plastic, and has a base material substrate having a rectangular shape (oblong or square) when viewed from the observation side in plan view. The base material substrate defines the entire shape of the color filter substrate 12. A polarizing plate 17 is provided on a principal surface outside of the base material substrate (the upper side of FIG. 1). If necessary, other optical elements are provided. The polarizing plate 17 has substantially the same area and planar shape as the polarizing plate 13.

The element substrate 11 has an extended portion 18 extending outward of the polarizing plate 17 serving as a surface member in plan view.

Figure 2A:
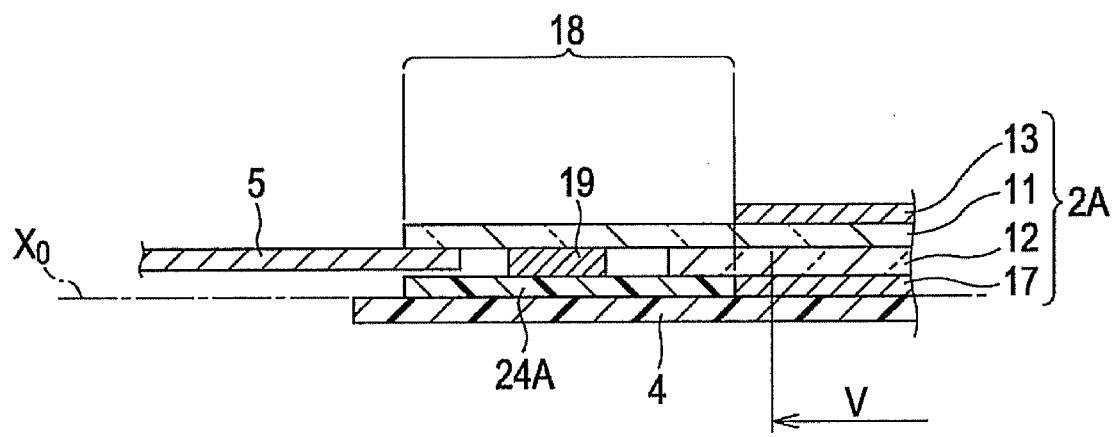
FIG. 2A is a side sectional view of main parts of FIG. 1.

FIG. 2A shows a sectional structure around the extended portion 18 of the element substrate 11. FIG. 2A shows a state where the element substrate 11 and the color filter substrate 12 are inverted vertically, as compared with the state of FIG. 1. In this embodiment, the polarizing plate 17 is provided around a surface on an outermost side of the liquid crystal panel 2A. In this specification, such a member provided on the outermost side of the liquid crystal panel 2A is called a surface member of the liquid crystal panel. In this embodiment, the polarizing plate 17 is provided on the outermost side, and thus the polarizing plate 17 becomes a surface member. When an additional optical element is provided outside of the polarizing plate 17, the additional optical element becomes a surface member.

A light-shielding film (not shown) having a lattice shape in plan view, color films (not shown) opposite the pixel electrodes on the element substrate 11, and a common electrode (not shown) are provided on a principal surface inside of the color filter substrate 12 (the liquid crystal layer side). The common electrode is a planar electrode opposite a plurality of pixel electrodes arranged in the row direction X and the column direction Y on the element substrate 11. Each of the color films is an optical element transmitting one of R (red), G (green), and B (blue). The color films of R, G, and B are arranged in a predetermined shape, for example, in a strip shape in plan view. The light-shielding film is formed by overlapping the color films of different colors or is formed of a predetermined material, such as Cr (chromium).

A plurality of pixel electrodes on the element substrate 11 and the common electrode on the color filter substrate 12 overlap in a plurality of dot-like (that is, island-shaped) regions in plan view. The overlap regions form subpixels, which are unit regions for display. A pixel includes three subpixels corresponding to R, G, and B. A plurality of pixels are arranged in a matrix in the row direction X and the column direction Y to form a rectangular effective display region V. Images, such as characters, numerals, and graphics, are displayed inside the effective display region V.

A driving IC 19 is mounted at an appropriate position on the surface of the extended portion 18 of the element substrate 11 by a conductive bonding element, for example, an ACF (Anisotropic Conductive Film). Typically, this technique is called COG (Chip On Glass). A plurality of wiring terminals 21 are formed in an edge portion of the extended portion 18, that is, in the end portion of the liquid crystal panel 2A. A plurality of input bumps provided on a mounting surface of the driving IC 19 are connected to the wiring terminals 21. A plurality of output bumps provided on the mounting surface of the driving IC 19 are connected to the source lines 14 and the gate lines 16 on the element substrate 11, and the common electrode on the color filter substrate 12.

The FPC board 5 is bonded to the edge portion of the extended portion 18 of the element substrate 11 by a conductive bonding element, for example, an ACF. The FPC board 5 has a plurality of output terminals 22 in an edge portion thereof on a side to which the element substrate 11 is bonded, a circuit including a plurality of electronic parts (not shown), and a plurality of input terminals 23 in an edge portion on a side opposite the side to which the element substrate 11 is bonded. The input terminals 23, the electronic parts, and the output terminals 22 are electrically connected to each other by a wiring pattern (not shown).

As known in the related art, in order to form the FPC board 5, for example, a copper wiring pattern is formed on a base film made of polyimide by photo-etching, coverlay or resist made of polyimide is provided on the copper wiring pattern, and circuit parts are mounted at necessary positions. As the circuit parts, capacitors, coils, resistors, varistors, and the like are used. The circuit parts and the wiring pattern may be provided on one surface of the FPC board 5 or may be provided on both surfaces of the FPC board 5. Contact holes for allowing electrical conduction between both surfaces of the FPC board 5 are provided at necessary positions of the FPC board 5. If necessary, the FPC board 5 may have a different laminate structure.

With the above-described configuration, if a predetermined driving signal is input from the input terminals 23 of the FPC board 5, scanning signals and data signals for liquid crystal driving are generated by the driving IC 19, and are then transmitted to the subpixels constituting each pixel. Thus, necessary TFT elements are turned on/off. Therefore, depending on the switching operation of the TFT elements, a desired image is displayed inside the effective display region V.

In this embodiment, the FPC board 5 and the color filter substrate 12 have substantially the same thickness. The thickness is, for example, approximately 0.3 mm, and from now on, a case in which the thickness is small, for example, approximately 0.1 mm is taken into consideration. A difference in thickness between the FPC board 5 and the color filter substrate 12 is in the range of ±0.1 mm. The difference of ±0.1 mm is regarded as an error range when both have the same thickness. The thickness of the polarizing plate 17 is, for example, approximately 0.12 to 0.15 mm. The thickness of the driving IC 19 is, for example, approximately 0.3 mm, and from now on, a case in which the thickness is reduced to be approximately 0.1 mm is taken into consideration.

A step portion corresponding to the thickness of the color filter substrate 12 and a step portion corresponding to the thickness of the polarizing plate 17 are present between the element substrate 11 and the protective cover 4. The height of a step portion in the liquid crystal panel 2A means the total height of the step portions. If an additional element is present on the polarizing plate 17, a step portion corresponding to the additional element is included in the height of the step portion in the liquid crystal panel 2A. The protective cover 4 is a flat plate-shaped sheet material. For this reason, if the protective cover 4 is directly mounted on the surface of the liquid crystal panel 2A, that is, on the surface of the polarizing plate 17, a space portion is formed between the extended portion 18 of the element substrate 11 and the protective cover 4 due to the step portion of the liquid crystal panel 2A.

A tape 24A serving as a space filling member is provided on the extended portion 18 of the element substrate 11. The tape 24A is provided over a portion of the color filter substrate 12 extending from the polarizing plate 17 in plan view, the top surface of the driving IC 19, and an upper surface of a connection end portion of the FPC board 5 to the element substrate 11. The height of an outer surface of the tape 24A from the surface of the element substrate 11 is set so as to be equal to the height of the step portion of the liquid crystal panel 2A, in this embodiment, the total height of the step portion corresponding to the thickness of the color filter substrate 12 and the step portion corresponding to the thickness of the polarizing plate 17. Therefore, the outer surface of the tape 24A is aligned with the outer surface of the polarizing plate 17 serving as a surface member.

The tape 24A is sheetlike and formed of resin, such as PET or polycarbonate. The tape 24A may be formed as a member separately from the protective cover 4 or may be formed integrally with the protective cover 4. When the tape 24A is formed separately from the protective cover 4, the tape 24A may be fixed to the protective cover 4 by bonding or adhesion, or may not be fixed to the protective cover 4.

One end of the tape 24A inside of the panel (the right side of FIG. 2A) is in contact with the edge portion of the color filter substrate 12 outside the polarizing plate 17 in plan view. The other end of the tape 24A is in contact with the edge portion of the FPC board 5. In FIG. 2A, a slight gap is shown between the tape 24A and the FPC board 5. This gap is a gap within an error range, and it is convenient to say that the tape 24A and the FPC board 5 are in contact with each other. A chain line $X_0$ indicates a surface of the protective cover 4 on the liquid crystal panel 2A side, and the outer surface of the tape 24A and the polarizing plate 17 are received by the surface $X_0$ of the protective cover 4. As can be understood from the above description, the tape 24A is disposed so as to be crammed in the space portion of the extended portion 18 in the end portion of the panel and the protective cover 4, to thereby bury the space portion.

In this embodiment, the height of the outer surface of the tape 24A from the surface of the element substrate 11 corresponding to the connection end portion of the FPC board 5 to the element substrate 11 is set so as to be substantially equal to the height of the outer surface of the polarizing plate 17 serving as a surface member of the liquid crystal panel 2A from the surface of the element substrate 11. Specifically, both have substantially the same height within an error range of ±0.05 mm. For this reason, the receiving surface $X_0$ of the protective cover 4 is in contact with the polarizing plate 17 serving as a surface member of the liquid crystal panel 2A and the tape 24A in a region corresponding to the connection end portion of the FPC board 5 to the element substrate 11. This contact state is a concept including a case in which there is an error of up to ±0.1 mm between the polarizing plate 17 and the receiving surface $X_0$ and between the tape 24A and the receiving surface $X_0$.

Figure 26A:
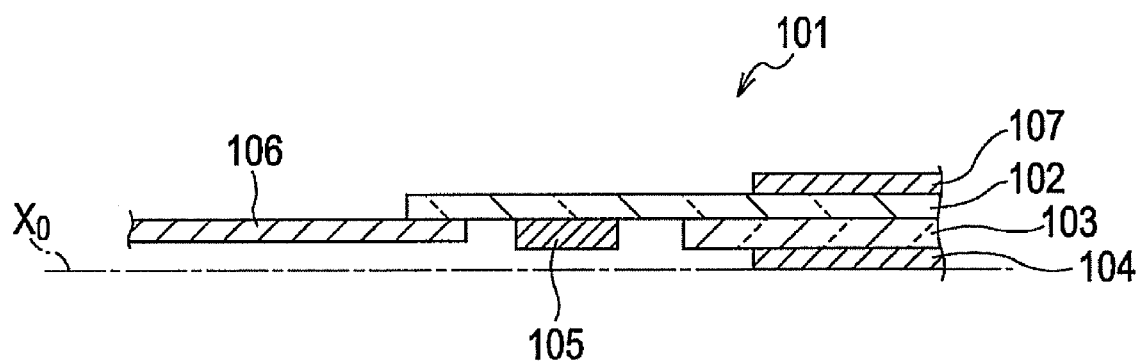
FIG. 26 is a side sectional view showing main parts of a known electro-optical device.
Figure 26B:
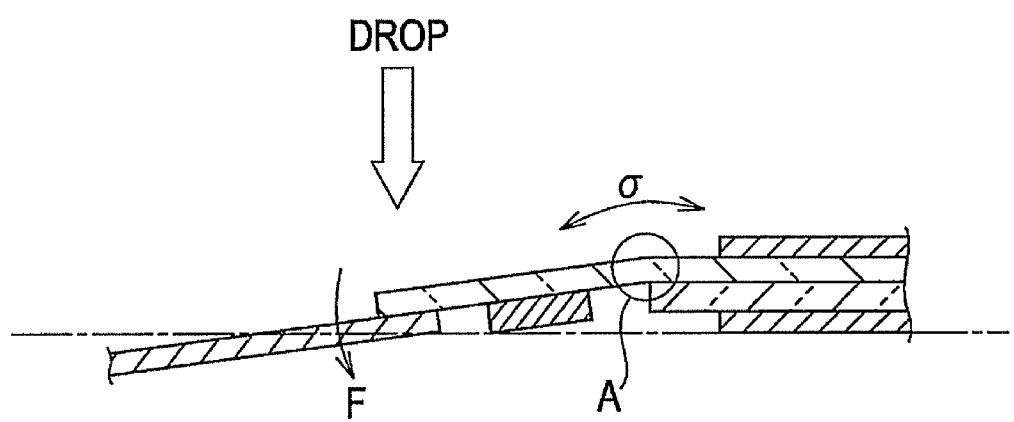
Figure 27:
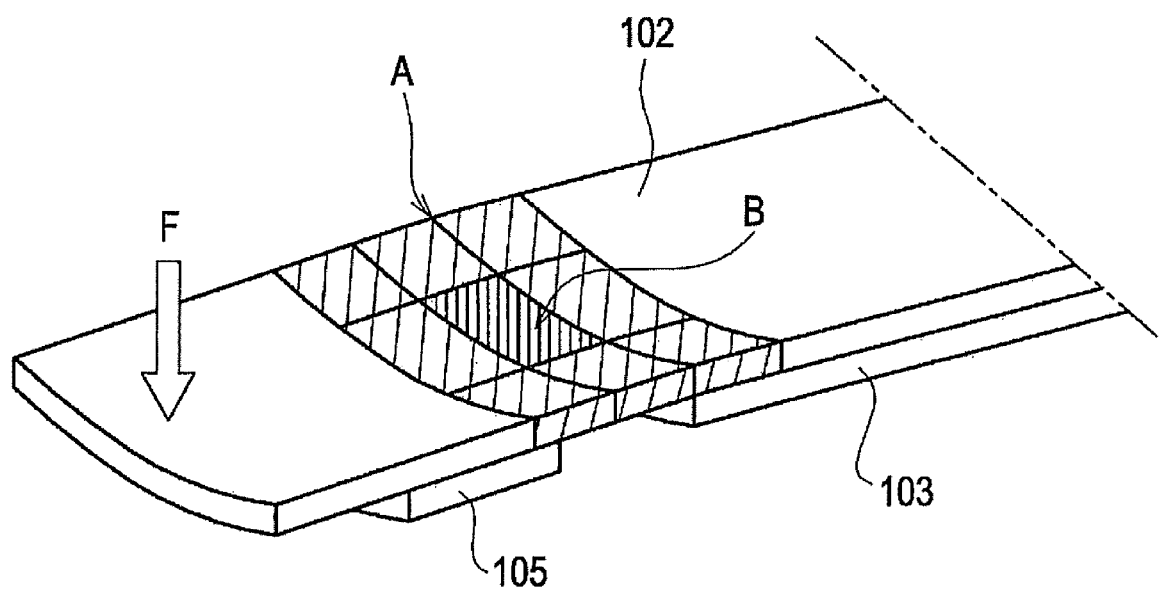
FIG. 27 is a diagram showing a stress distribution state of the result of an impact simulation regarding the related art shown in FIG. 26.

As described above, in this embodiment, when the liquid crystal panel 2A is received by the receiving surface $X_0$ of the protective cover 4, in a region corresponding to the extended portion 18, the receiving surface $X_0$ is in surface contact with the surface of the tape 24A, such that no gap is formed between the receiving surface $X_0$ and the extended portion 18. For this reason, as shown in FIG. 26B, even if impact is applied to the liquid crystal panel due to dropping, the element substrate 11 is not curved or bent, and thus bending stress is not generated at the boundary between the element substrate 11 and the color filter substrate 12. As a result, the element substrate 11 is prevented from being damaged or cracked.

In this embodiment, as shown in FIG. 2A, the tape 24A is provided on the edge portion of the color filter substrate 12 beyond the boundary between the element substrate 11 and the color filter substrate 12, that is, the stop portion corresponding to the thickness of the color filter substrate 12. For this reason, the extended portion 18 of the element substrate 11 is not bent easily, as compared with a case in which no tape 24A is provided on the edge portion of the color filter substrate 12.

The tape 24A preferably has a light-shielding property. In this case, light can be prevented from entering the driving IC 19, and the driving IC 19 can be prevented from being erroneously operated due to light. The space filling member is not limited to the tape 24A, and resin (for example, silicon resin or epoxy resin) may be filled at least between the connection end portion of the FPC board 5 to the element substrate 11 and the receiving surface $X_0$.

Modification 1 of Electro-Optical Device

In the foregoing description, as shown in FIG. 1, the tape 24A is provided substantially over the entire surface of the extended portion 18 of the element substrate 11 so as to cover the driving IC 19 in plan view. Alternatively, the tape 24A may be separately provided on the left and right sides (the row direction X) or on the upper and lower sides (the column direction Y) with the driving IC 19 interposed therebetween in plan view. In addition, a plurality of tapes 24A may be separately provided on the extended portion 18.

Electro-Optical Device According to Second Embodiment

Figure 2B:
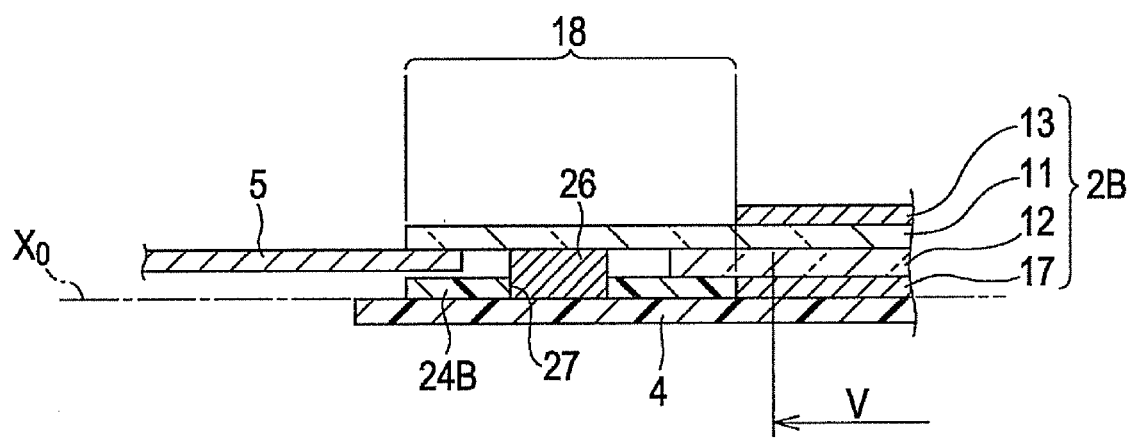
FIG. 2B is a side sectional view of main parts in an electro-optical device according to a second embodiment of the invention.
Figure 3:
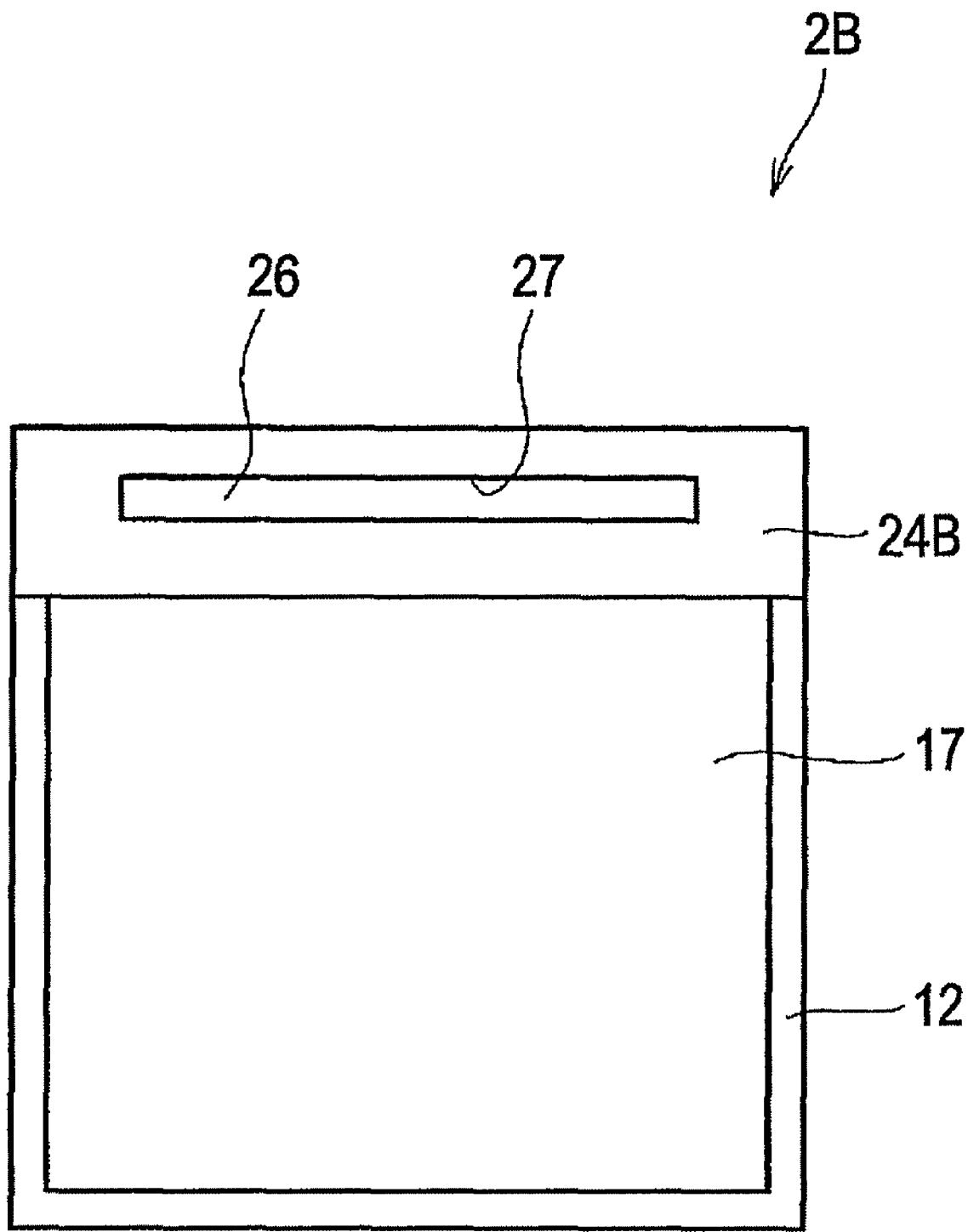
FIG. 3 is a plan view when viewed from an arrow III of FIG. 2B.

FIGS. 2B and 3 show a liquid crystal panel 2B that is a main part of a liquid crystal display serving as an electro-optical device of this embodiment. FIG. 2B shows a side sectional structure of main parts of the liquid crystal panel 2B, and FIG. 3 shows a planar structure when viewed from an arrow III of FIG. 2B. In FIG. 3, the protective cover 4 is not shown. Instead of the liquid crystal panel 2A of FIG. 1, the liquid crystal panel 2B shown in FIGS. 2B and 3 is housed in the lower frame 3, and is received and protected by the protective cover 4.

In FIG. 2B, the liquid crystal panel 2B has the same configuration as the liquid crystal panel 2A of the first embodiment shown in FIG. 2A, excluding a driving IC 26. The same parts are represented by the same reference numerals, and descriptions thereof will be omitted. The height of the driving IC 19 used in the liquid crystal panel 2A of FIG. 2A is substantially equal to the thickness of the color filter substrate 12 and the thickness of the FPC board 5. In contrast, the driving IC 26 used in the liquid crystal panel 2B of this embodiment is set so as to be thicker than the color filter substrate 12 and the FPC board 5.

An opening 27 in which the driving IC 26 is set is provided at an appropriate position of a tape 24B. The tape 24B serving as a space filling member is provided from a position corresponding to the connection end portion of the FPC board 5 to the element substrate 11 to the edge portion of the color filter substrate 12 outside the polarizing plate 17 in plan view. The driving IC 26 is set in the opening 27 of the tape 24B. With this configuration, as shown in FIG. 3, the driving IC 26 is exposed to the outside through the opening 27 of the tape 24B.

The receiving surface $X_0$ of the protective cover 4 is in contact with the polarizing plate 17 serving as a surface member of the liquid crystal panel 2B and the tape 24B in a region corresponding to the connection end portion of the FPC board 5 to the element substrate 11. This contact state is a concept including a case in which there is an error of up to ±0.1 mm between the polarizing plate 17 and the receiving surface $X_0$ and between the tape 24B and the receiving surface $X_0$.

As described above, in this embodiment, when the liquid crystal panel 2B is received by the receiving surface $X_0$ of the protective cover 4, on the extended portion 18, the receiving surface $X_0$ is in surface contact with the surface of the tape 24B, such that no gap is formed between the receiving surface $X_0$ and the extended portion 18. That is, the space portion between the extended portion 18 and the protective cover 4 in the end portion of the panel is buried by, that is, filled with the tape 24B. For this reason, as shown in FIG. 26B, when impact is applied to the liquid crystal panel due to dropping, the element substrate 11 is not curved or bent due to the tape 24B and the protective cover 4, and thus bending stress is not generated at the boundary between the element substrate 11 and the color filter substrate 12. As a result, the element substrate 11 is prevented from being damaged or cracked.

Electro-Optical Device According to Third Embodiment

Figure 4A:
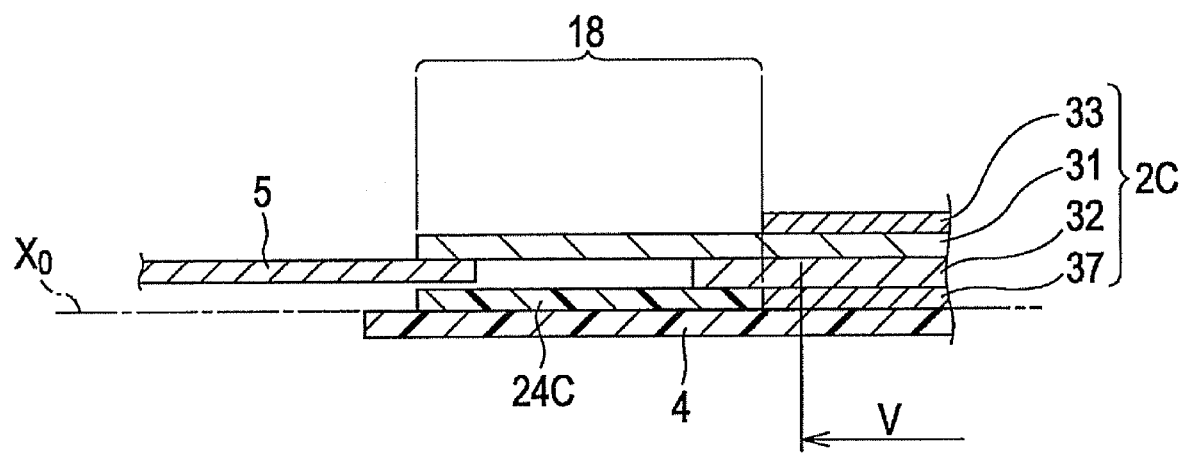
FIG. 4A is a side sectional view of main parts in an electro-optical device according to a third embodiment of the invention.

FIG. 4A shows a liquid crystal panel 2C that is a main part of a liquid crystal display serving as an electro-optical device of this embodiment. Instead of the liquid crystal panel 2A of FIG. 1, the liquid crystal panel 2C is housed in the lower frame 3 and is protected by the protective cover 4 serving as a protective member. The liquid crystal panel 2C has an element substrate 31, a polarizing plate 33 adhered to the outer surface of the element substrate 31, a color filter substrate 32, and a polarizing plate 37, serving as a surface member, adhered to the outer surface of the color filter substrate 32.

Like the element substrate 11 shown in FIG. 1, on the element substrate 31, a plurality of source lines 14 are formed so as to extend in the column direction Y, and a plurality of gate lines 16 are formed so as to extend in the row direction X perpendicular to the column direction Y. In each rectangular planar region surrounded by the source lines 14 and the gate lines 16, a TFT element serving as a switching element or an active element, a pixel electrode, and the like, all of which are not shown, are formed. In this embodiment, the TFT element is formed using a low-temperature polysilicon semiconductor.

In this embodiment, when the TFT element is formed using a low-temperature polysilicon semiconductor, the same circuit as the electronic circuit in the driving IC 19 of FIG. 1 is incorporated in a peripheral region of the element substrate 31 outside the effective display region V. The technique for incorporating an electronic circuit on a substrate constituting a liquid crystal panel is called SOG (System On Glass). In this embodiment using the SOG technique, no driving IC is mounted on the surface of the extended portion 18 of the element substrate 31.

Between the extended portion 18 of the element substrate 31 in the end portion of the liquid crystal panel 2C and the protective cover 4, a step portion corresponding to the thickness of the color filter substrate 32 and a step portion corresponding to the thickness of the polarizing plate 37 are present. The height of a step portion provided in the liquid crystal panel 2C means the total height of the step portions. A space portion is formed between the extended portion 18 of the element substrate 31 and the protective cover 4 due to the step portion of the liquid crystal panel 2C.

In this embodiment, in which no driving IC is mounted on the extended portion 18 of the element substrate 31, a tape 24C serving as a space filling member is provided in an upper region of the extended portion 18 of the element substrate 31 (in the drawing, a lower region). Specifically, the tape 24C is provided over the color filter substrate 32 and the FPC board 5 such that one end of the tape 24C is in contact with a portion of the color filter substrate 32 where the polarizing plate 37 is not adhered, and the other end of the tape 24C is in contact with a portion corresponding to the connection end portion of the FPC board 5 to the element substrate 31. The surface of the polarizing plate 37 serving as a surface member of the liquid crystal panel 2C and the surface of the tape 24C are received by the receiving surface $X_0$ of the protective cover 4. That is, the height of an outer surface of the tape 24C from the surface of the element substrate 31 is set so as to be equal to the height of the step portion of the liquid crystal panel 2C, in this embodiment, the total height of the step portion corresponding to the thickness of the color filter substrate 32 and the step portion corresponding to the thickness of the polarizing plate 37. Therefore, the outer surface of the tape 24C is aligned with the outer surface of the polarizing plate 37 serving as a surface member.

As described above, in this embodiment, when the liquid crystal panel 2C is received by the receiving surface $X_0$, on the extended portion 18, the receiving surface $X_0$ is in surface contact with the surface of the tape 24C, such that there is no gap between the receiving surface $X_0$ and the extended portion 18. That is, the space portion formed by the extended portion 18 and the protective cover 4 in the end portion of the panel is buried by, that is, filled with the tape 24C. For this reason, as shown in FIG. 26B, even if impact is applied to the liquid crystal panel due to dropping, the element substrate 31 is not curved or bent due to the tape 24C and the protective cover 4, and thus bending stress is not generated at the boundary between the element substrate 31 and the color filter substrate 32. As a result, the element substrate 31 is prevented from being damaged or cracked.

Electro-Optical Device According to Fourth Embodiment

Figure 4B:
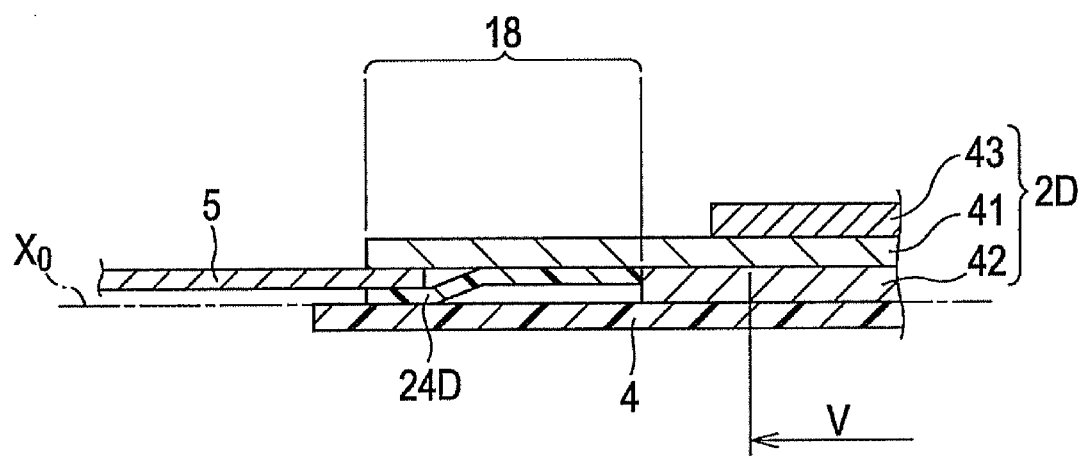
FIG. 4B is a side sectional view of main parts in an electro-optical device according to a fourth embodiment of the invention.

FIG. 4B shows a liquid crystal panel 2D that is a main part of a liquid crystal display serving as an electro-optical device of this embodiment. Instead of the liquid crystal panel 2A of FIG. 1, the liquid crystal panel 2D is housed in the lower frame 3 and is protected by the protective cover 4 serving as a protective member. The liquid crystal panel 2D has an element substrate 41, a polarizing plate 43 adhered to the outer surface of the element substrate 41, and a color filter substrate 42. No polarizing plate is provided on the outer surface of the color filter substrate 42. That is, the color filter substrate 42 becomes a surface member that is a member on the outermost side of the liquid crystal panel 2D.

A polarizing element having the same function as the polarizing plate 17 of FIG. 2A is formed on the surface of the color filter substrate 42 between the element substrate 41 and the color filter substrate 42 by a known film forming process. A step portion corresponding to the thickness of the color filter substrate 42 is present between the extended portion 18 of the element substrate 41 and the protective cover 4. The height of a step portion provided in the liquid crystal panel 2D is the height of the step portion of the color filter substrate 42. A space portion is formed between the extended portion 18 of the element substrate 41 and the protective cover 4 due to the step portion of the liquid crystal panel 2D.

A tape 24D serving as a space filling member is provided on the extended portion 18 of the element substrate 41. One end of the tape 24D inside of the liquid crystal panel 2D (the right side of FIG. 4B) is in contact with the surface of the element substrate 41. One end of the tape 24D outside of the liquid crystal panel 2D extends to the surface of the connection portion of the FPC board 5 to the element substrate 41 and is in contact with the surface. The height of the outer surface of the extended portion of the tape 24D to the surface of the FPC board 5 from the surface of the element substrate 41 is set so as to be equal to the height of the step portion of the liquid crystal panel 2D, in this embodiment, the height of the step portion corresponding to the thickness of the color filter substrate 42. Therefore, the outer surface of the tape 24D is aligned with the outer surface of the color filter substrate 42 serving as a surface member.

In this embodiment, when the liquid crystal panel 2D is received by the receiving surface $X_0$ of the protective cover 4, in the edge portion of the extended portion 18, the receiving surface $X_0$ is in surface contact with the surface of the tape 24D, such that there is no gap between the receiving surface $X_0$ and the portion of the extended portion 18. That is, the space portion formed by the extended portion 18 and the protective cover 4 in the end portion of the panel is buried by, that is, filled with the tape 24D. For this reason, as shown in FIG. 26B, even if impact is applied to the liquid crystal panel due to dropping, the extended portion 18 of the element substrate 41 is not curved due to the tape 24D and the protective cover 4, and thus bending stress is not generated at the boundary between the element substrate 41 and the color filter substrate 42. As a result, the element substrate 41 is prevented from being damaged or cracked.

Electro-Optical Device According to Fifth Embodiment

Figure 5:
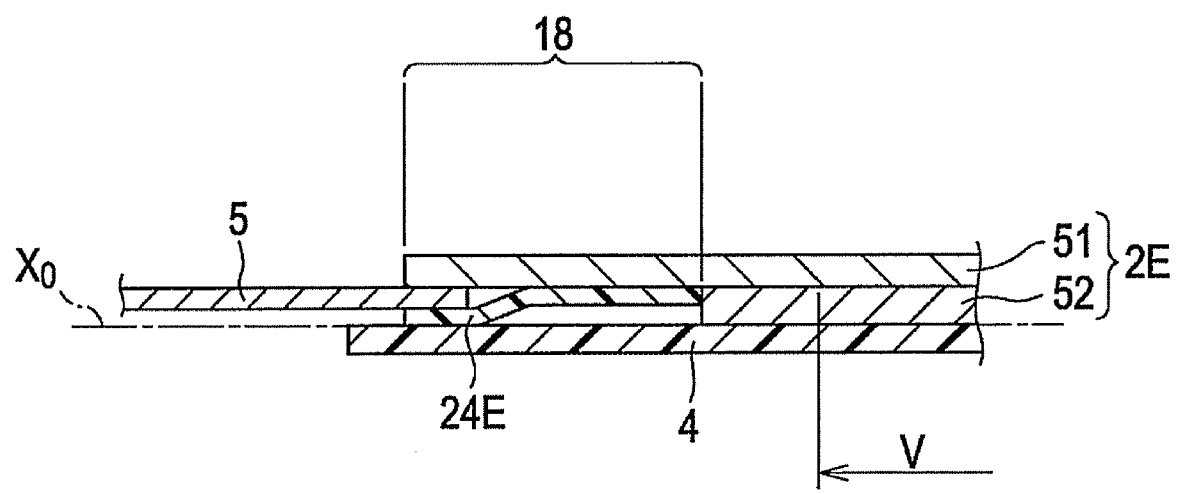
FIG. 5 is a side sectional view of main parts in an electro-optical device according to a fifth embodiment of the invention.

FIG. 5 shows an EL panel 2E, serving as an electro-optical panel, which is a main part of an organic EL device (Organic Light Emitting Diode: OLED) serving as an electro-optical device of this embodiment. Instead of the liquid crystal panel 2A of the FIG. 1, the EL panel 2E is housed in the lower frame 3 and is protected by the protective cover 4 serving as a protective member. The EL panel 2E has an element substrate 51 and a counter substrate 52.

On the element substrate 51, subpixels are formed by organic EL materials emitting light in colors of R (red), G (green), and B (blue), each pixel is formed by a collection of subpixels of R, G, and B, and an effective display region V (see FIG. 1) is formed by a collection of a plurality of pixels. The counter substrate 52 functions as a protective member for protecting organic EL materials and other elements formed on the element substrate 51. The counter substrate 52 may function as a visual quality improving sheet for improving visual quality of display, for example, an anti-reflection sheet or a viewing angle adjusting sheet. The counter substrate 52 is a non-flexible hard substrate, such as a glass substrate, or a flexible plastic film. In this embodiment, the counter substrate 52 becomes a surface member that is a member provided on the outermost side of the EL panel 2E.

A step portion corresponding to the thickness of the counter substrate 52 is present between the element substrate 51 and the protective cover 4. The height of a step portion provided in the EL panel 2E is the height of the step portion of the counter substrate 52. A space portion is formed between the extended portion 18 of the element substrate 51 and the protective cover 4 due to the step portion of the EL panel 2E.

A tape 24E serving as a space filling member is provided on the extended portion 18 of the element substrate 51. One end of the tape 24E inside of the EL panel 2E is in contact with the surface of the element substrate 51, and one end of the tape 24E outside of the EL panel 2E extends to the surface of the connection end portion of the FPC board 5 to the element substrate 51 and is in contact with the surface.

The height of the outer surface of the extended portion of the tape 24E to the surface of the FPC board 5 from the surface of the element substrate 51 is set so as to be equal to the height of the step portion of the EL panel 2E, in this embodiment, the height of the step portion corresponding to the thickness of the counter substrate 52. Therefore, the outer surface of the tape 24E is aligned with the outer surface of the counter substrate 52 serving as a surface member.

In this embodiment, when the EL panel 2E is received by the receiving surface $X_0$ of the protective cover 4, in the edge portion of the extended portion 18 in the end portion of the panel, the receiving surface $X_0$ is in surface contact with the surface of the tape 24E, such that there is no gap between the receiving surface $X_0$ and the edge portion of the extended portion 18. That is, the space portion formed by the extended portion 18 and the protective cover 4 in the end portion of the panel is buried by, that is, filled with the tape 24E. For this reason, as shown in FIG. 26B, even if impact is applied to the liquid crystal panel due to dropping, the element substrate 51 is not curved or bent due to the tape 24E and the protective cover 4, and thus bending stress is not generated at the boundary between the element substrate 51 and the counter substrate 52. As a result, the element substrate 51 is prevented from being damaged or cracked.

Electronic Apparatus According to Sixth Embodiment

Figure 6:
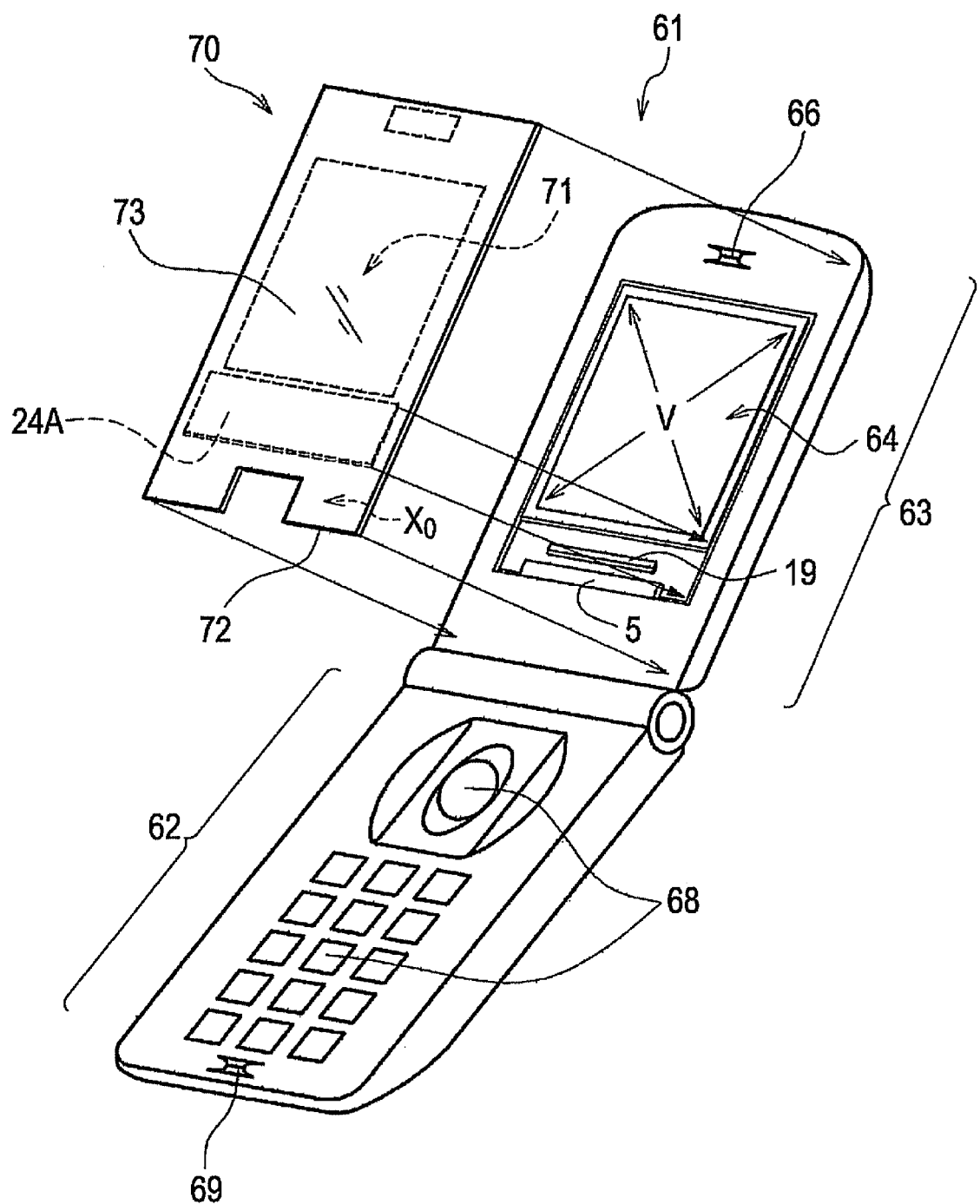
FIG. 6 is a partially exploded perspective view showing an electronic apparatus according to a sixth embodiment of the invention.

FIG. 6 is a partially exploded perspective view showing an electronic apparatus of this embodiment. A mobile phone 61 shown in FIG. 6 has a main body portion 62 and a display body portion 63 provided openably with respect to the main body portion 62. The display body portion 63 is provided with an electro-optical panel 64 and a receiver 66. A machine frame portion of the display body portion 63 forms a casing for housing, fixing, and supporting the electro-optical panel 64. Various kinds of display regarding a telephone call are displayed in the effective display region V of the electro-optical panel 64. A control section for controlling the operation of the electro-optical panel 64 is incorporated into the main body portion 62 or the display body portion 63 as a part of a controller for overall control of the mobile phone or separately from the controller. The main body portion 62 is provided with operating buttons 68 and a transmitter 69.

The electro-optical panel 64 is formed by the liquid crystal panel 2A shown in FIG. 2A, the liquid crystal panel 2B shown in FIG. 2B, the liquid crystal panel 2C shown in FIG. 4A, the liquid crystal panel 2D shown in FIG. 4B, or the EL panel 2E shown in FIG. 5. FIG. 6 shows a case in which the liquid crystal panel 2A of FIG. 2A is representatively used. In this embodiment, the liquid crystal panels 2A to 2D and the EL panel 2E are not provided with the tapes 24A to 24E serving as a space filling member. The tapes 24A to 24E are provided by bonding or adhesion to a protective cover 70 serving as a protective member.

The electro-optical panel 64 is housed in a container provided in the display body portion 63, and the protective cover 70 is mounted in the machine frame portion on the surface of the display body portion 63 by bonding so as to cover the electro-optical panel 64. The tape 24A provided in the protective cover 70 is directly provided in the machine frame portion of the display body portion 63 serving as a casing. A rear surface of the protective cover 70 forms the receiving surface $X_0$ in FIG. 2A or the like, and the rear surface of the protective cover 70 receives the surface member (in the liquid crystal panel 2A of FIG. 2A, the polarizing plate 17), which is a member provided on the outermost side of the electro-optical panel 64.

The protective cover 70 is formed, for example, by adhering a transparent plastic sheet 73 to the entire surface of a plastic flat plate frame 72 having an opening 71 such that the opening 71 is covered with the transparent plastic sheet 73. An image to be displayed in the effective display region V of the electro-optical panel 64 is visible through the opening 71.

With respect to the electro-optical panel 64 in this embodiment, as described in connection with the liquid crystal panel 2A shown in FIG. 2A, when the liquid crystal panel 2A is received by the receiving surface $X_0$ of the protective cover 70 (corresponding to reference numeral 4), on the extended portion 18 in the end portion of the panel, the receiving surface $X_0$ is in surface contact with the surface of the tape 24A, such that there is no gap between the receiving surface $X_0$ and the extended portion 18. That is, the space portion in the end portion of the panel is filled with, that is, buried by the tape 24A. For this reason, as shown in FIG. 26B, even if the mobile phone 61 is accidently dropped and impact is applied to the liquid crystal panel, the element substrate 11 of FIG. 2A is not curved, and thus bending stress is not generated at the boundary between the element substrate 11 and the color filter substrate 12. As a result, the element substrate 11 is prevented from being damaged or cracked. For this reason, the drop impact resistance of the mobile phone 61 can be improved.

Electronic Apparatus According to Seventh Embodiment

Figure 7:
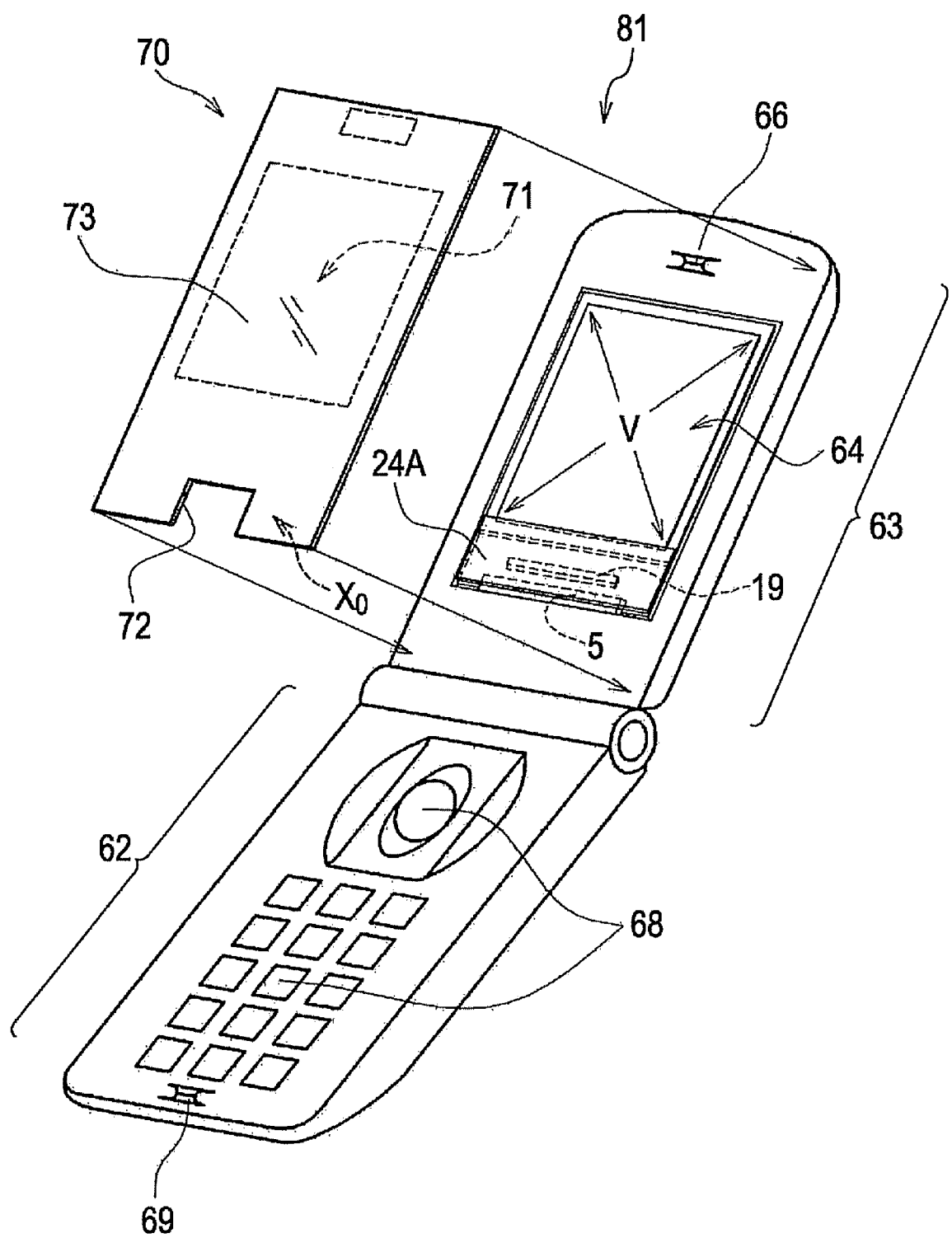
FIG. 7 is a partially exploded perspective view showing an electronic apparatus according to a seventh embodiment of the invention.

FIG. 7 shows a mobile phone which is an example of an electronic apparatus of this embodiment. A mobile phone 81 shown in FIG. 7 is different from the mobile phone 61 shown in FIG. 6 as follows. In the mobile phone 61 shown in FIG. 6, the tape 24A serving as a space filling member is fixed to the protective cover 70 serving as a protective member. That is, the tape 24A is provided in the display body portion 63 serving as a casing, not in the electro-optical panel 64.

In contrast, in this embodiment, as shown in FIG. 7, the tape 24A is provided in the end portion of the electro-optical panel 64 (that is, the extended portion of the substrate) in advance. Then, the electro-optical panel 64 having the tape 24A is housed in a predetermined housing region of the display body portion 63, and subsequently the protective cover 70 is mounted on the display body portion 63. In a state where the protective cover 70 is mounted in such a manner, as shown in FIG. 2A, the polarizing plate 17 of the liquid crystal panel 2A is received by the protective cover 70 (corresponding to reference numeral 4), and simultaneously the extended portion 18 is received through the tape 24A.

With this configuration, as shown in FIG. 26B, even if the mobile phone 81 is accidently dropped and impact is applied to the liquid crystal panel, the element substrate 11 of FIG. 2A is not curved, and thus bending stress is not generated at the boundary between the element substrate 11 and the color filter substrate 12. As a result, the element substrate 11 is prevented from being damaged or cracked. For this reason, the drop impact resistance of the mobile phone 81 of FIG. 7 can be improved.

Electro-Optical Device According to Eighth Embodiment

Figure 8:
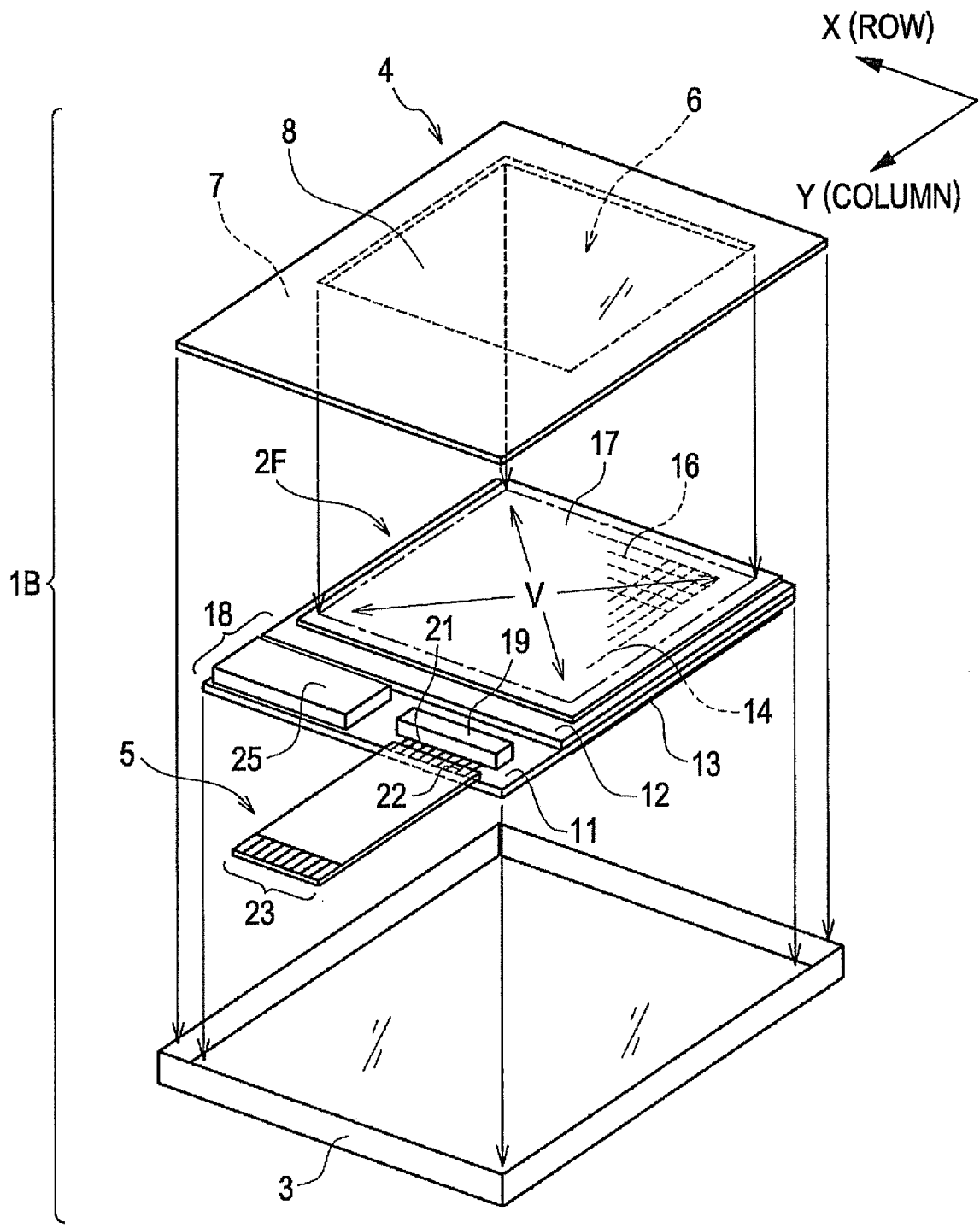
FIG. 8 is an exploded perspective view of an electro-optical device according to an eighth embodiment of the invention.

FIG. 8 shows a liquid crystal display which is an example of an electro-optical device of this embodiment. In FIG. 8, a liquid crystal panel 2F has the same configuration as the liquid crystal panel 2A of the first embodiment shown in FIG. 1, excluding a spacer 25. The same parts are represented by the same reference numerals, and descriptions thereof will be omitted. The liquid crystal display 1B has a liquid crystal panel 2F serving as an electro-optical panel, an FPC board 5, serving as a wiring board, connected to the liquid crystal panel 2F, a lower frame 3, and a protective cover 4 serving as a protective member. Instead of the liquid crystal panel 2A of FIG. 1, the liquid crystal panel 2F is housed in the lower frame 3 and is protected by the protective cover 4 serving as a protective member.

The liquid crystal panel 2F is formed by bonding an element substrate 11 on a lower side of FIG. 8 and a color filter substrate 12 provided on an upper side so as to be opposite the element substrate 11 by a frame-shaped sealing material (not shown in FIG. 8) around the periphery of the element substrate 11 and the color filter substrate 12.

Figure 9A:
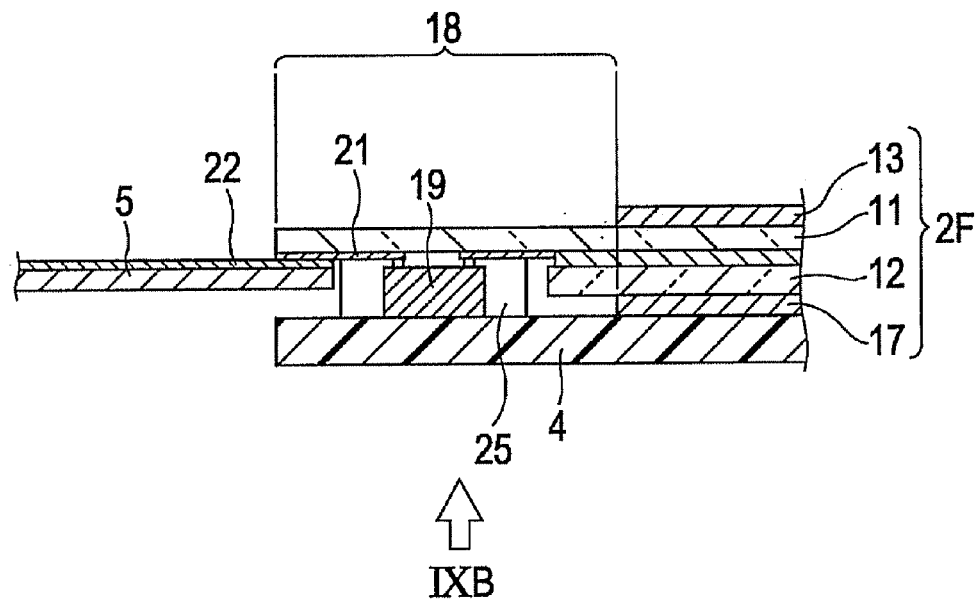
FIGS. 9A and 9B are a side sectional view and a plan view showing main parts of the electro-optical device of FIG. 8, respectively.

FIG. 9A shows a sectional structure around the extended portion 18 of the element substrate 11. FIG. 9A shows a state where the element substrate 11 and the color filter substrate 12 are inverted vertically, as compared with the state of FIG. 8. In this embodiment, the polarizing plate 17 is provided around a surface on an outermost side of the liquid crystal panel 2F. In this embodiment, the polarizing plate 17 is provided on the outermost side, and thus the polarizing plate 17 becomes a member forming the outermost surface. When an additional optical element is provided outside of the polarizing plate 17, the additional optical element becomes a member forming the outermost surface. Examples of the additional optical element includes a phase plate, a visual quality improving film (for example, an anti-reflection sheet or a viewing angle adjusting sheet), and the like.

In this embodiment, the thickness of each of the element substrate 11 and the color filter substrate 12 is approximately 0.2 mm. The thickness of the substrate is basically the thickness of the base material substrate before member elements, such as electrodes, a semiconductor structure, and various resin films, are formed on a substrate as a base material made of glass or plastic by a known film forming technique. However, since the thickness of the member elements is sufficiently smaller than the thickness of the base material substrate, the thickness of the substrate is a concept including both the thickness of the base material substrate and the thickness of the substrate after the member elements are formed on the base material substrate.

In FIG. 9A, a gap is shown between the element substrate 11 and the color filter substrate 12. This gap is a so-called cell gap that is maintained by spacers inside the panel or the sealing material around the panel. The cell gap is actually about 5 µm and is negligible with respect to the thickness of the substrate 12, the polarizing plate 17, and the FPC board 5, or the like.

The thickness of the polarizing plate 17 is approximately 0.15 mm. The thickness of the driving IC 19 is, for example, approximately 0.35 mm. That is, the thickness of the driving IC 19 becomes the total thickness of the color filter substrate 12 and the polarizing plate 17. For this reason, the height of the surface of the driving IC 19 from the surface of the element substrate 11 is set so as to be equal to the height of the surface of the polarizing plate 17 from the surface of the element substrate 11. The thickness of the spacer 25 is the same as the thickness of the driving IC 19, and is, for example, approximately 0.35 mm. Therefore, the height of the surface of the spacer 25 from the surface of the element substrate 11 is set so as to be equal to the height of the surface of the polarizing plate 17 from the surface of the element substrate 11.

When an additional optical element is provided on the polarizing plate 17, that is, when an additional optical element becomes a member forming the outermost surface, the height of each of the driving IC 19 and the spacer 25 is set so as to be equal to the height of the additional optical element. The fact that the height of one element is equal to the height of another element is a concept including a case in which the height of one element is completely equal to the height of another element, and a case in which a difference is present due to a part error, an assembling error, or a design tolerance. Specifically, if a difference is in the range of approximately ±0.05 mm, it can be understood that the height of one element is equal to the height of another element.

The FPC board 5 is thinner than the color filter substrate 12. As described above, the FPC board 5 is formed by overlapping a wiring pattern, coverlay, resist, circuit parts, and the like on the base film, but the thickness of the FPC board 5 used herein means the thickness of a portion excluding the circuit parts.

The protective cover 4 is in direct contact with the surface of the polarizing plate 17 that is a member forming the outermost surface of the liquid crystal panel 2F. As occasion demands, the protective cover 4 may be in contact with the polarizing plate 17 through an additional element, such as a bonding agent or an impact absorbing material.

Figure 9B:
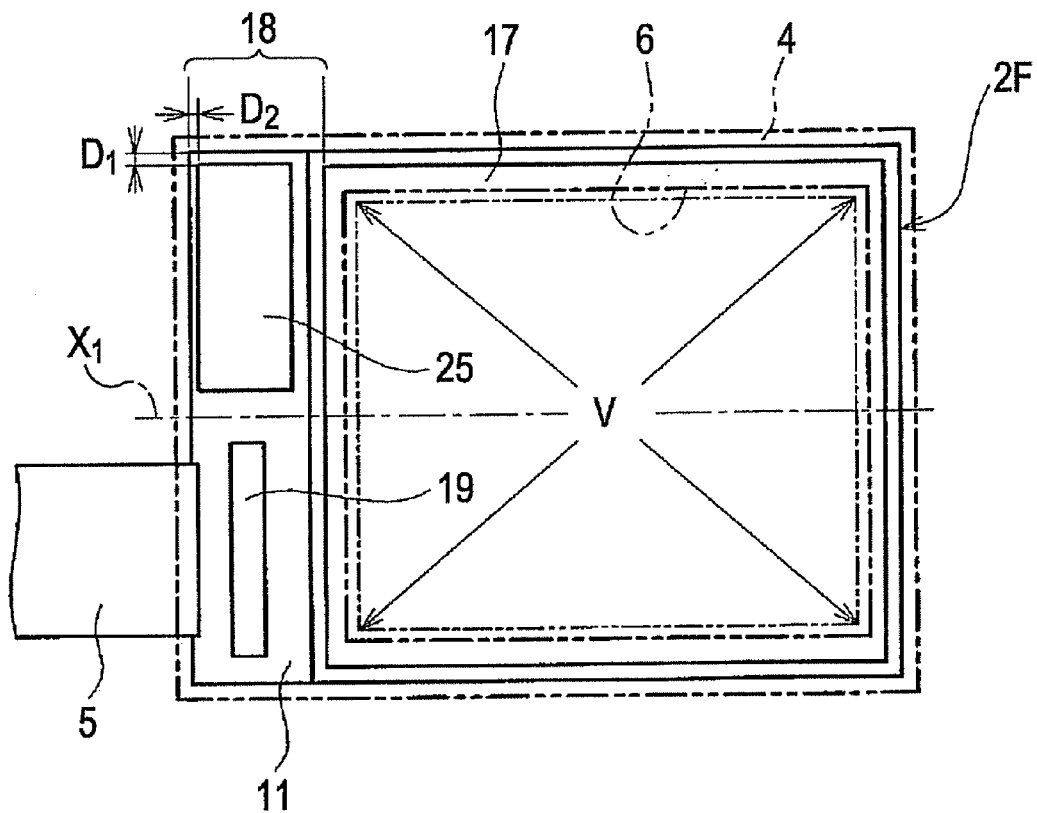

FIG. 9B shows a state where the liquid crystal panel 2F is viewed from an arrow IXB of FIG. 9A in plan view. The protective cover 4 is indicated by a chain line. The protective cover 4 is in contact with a peripheral portion of the polarizing plate 17 in a peripheral portion of the opening 6 and receives the liquid crystal panel 2F along the polarizing plate 17. In this way, the entire liquid crystal panel 2F is received by the protective cover 4.

The protective cover 4 linearly extends to a region opposite the extended portion 18 in the end portion of the element substrate 11, and is in contact with the surfaces of the driving IC 19 and the spacer 25. In this case, the protective cover 4 may be in direct contact with the driving IC 19 and the spacer 25, or may be in contact with the driving IC 19 and the spacer 25 through a bonding agent. In this way, the extended portion 18 of the element substrate 11 is received by the protective cover 4 through the driving IC 19 and the spacer 25. That is, the protective cover 4 receives the extended portion 18 of the element substrate 11 of the liquid crystal panel 2F, as well as the main body portion of the liquid crystal panel 2F.

The fact that the protective cover 4 is in contact with the surface of each of the polarizing plate 17, the driving IC 19, and the spacer 25 is a concept taking a part error, an assembling error, or a design tolerance in consideration, that is, a case in which there is a slight gap in the error range. Specifically, there may be a gap of approximately ±0.1 mm between the protective cover 4 and the elements, such as the polarizing plate 17, the driving IC 19, and the spacer 25.

With the above-described receiving structure of the protective cover 4, the entire liquid crystal panel 2F of FIG. 9A is received by the protective cover 4. For this reason, as shown in FIG. 26B, even if impact is applied to the liquid crystal panel due to dropping, the liquid crystal panel 2F is not subjected to large impact, and is protected from being damaged or cracked. In addition, the extended portion 18 of the element substrate 11 of the liquid crystal panel 2F is received by the protective cover 4 through the driving IC 19 and the spacer 25. For this reason, the element substrate 11 is not curved or bent, and thus bending stress is not generated at the boundary between the element substrate 11 and the color filter substrate 12. As a result, the element substrate 11 is prevented from being damaged or cracked.

In the above-described manner, a liquid crystal display having excellent impact resistance is configured. Of course, when an impact load is applied to the extended portion 18 of the element substrate 11, specifically, a portion extending outside of the color filter substrate 12, the flat plate frame 7 of the protective cover 4 (see FIG. 8) has sufficient hardness, that is, sufficient mechanical strength to prevent the extended portion 18 from being bent or curved.

As shown in FIG. 9B, the driving IC 19 is mounted so as to lean to one side (the lower side in the drawing) with respect to the center line $X_1$ of the extended portion 18 in a direction along a side of the polarizing plate 17 forming the extended portion 18 in the end portion of the element substrate 11. In this embodiment, the TFT element is formed using a low-temperature polysilicon semiconductor, and thus the circuit parts can be easily incorporated onto the substrate of the liquid crystal panel 2F. For this reason, the driving IC 19 can be reduced in size, and thus the driving IC 19 can be mounted so as to lean to one side with respect to the center line $X_1$.

The spacer 25 is provided on the extended portion 18 in a region on a side opposite the side, on which the driving IC 19 is disposed, with respect to the center line $X_1$. If the spacer 25 is not provided, a large gap, that is, space portion is formed between the protective cover 4 and the extended portion 18 in the corresponding region. For example, a gap of approximately 0.2 to 0.3 mm is formed. In this case, if impact is applied to the liquid crystal panel 2F, and an impact load is applied to the extended portion 18 of the element substrate 11, the extended portion 18 in the portion where the gap is formed may be bent or curved, stress may be generated at the boundary between the element substrate 11 and the color filter substrate 12, and the element substrate 11 may be damaged or cracked.

In contrast, in this embodiment, the spacer 25 is provided in a region on a side opposite the side, on which the driving IC 19 is disposed, with respect to the center line $X_1$ on the extended portion 18 in the end portion of the substrate. The height of the surface of the spacer 25 from the surface of the element substrate 11 is set so as to be equal to the height of the surface of the polarizing plate 17 serving as a member forming the outermost surface from the surface of the element substrate 11. In other words, a space in an upward region of the extended portion 18 is buried by the spacer 25 to a position corresponding to the height of the surface of the polarizing plate 17 from the surface of the element substrate 11. Therefore, in a region where the spacer 25 is provided, when impact is applied to the element substrate 11, the spacer 25 can prevent the extended portion 18 from being bent, and thus the element substrate 11 can be prevented from being damaged.

In this embodiment, the planar shape of the element substrate 11 is an oblong or square, and the planar shape of the spacer 25 is a rectangle. The spacer 25 is placed on the extended portion 18 such that the intervals $D_1$ and $D_2$ between the a corner portion of the element substrate 11 and a corner portion of the spacer 25 corresponding to the corner portion of the element substrate 11 in two directions at a right angle are all set so as to be 0.5 mm or less. From the experiment of the inventors, it can be seen that, when the intervals $D_1$ and $D_2$ are all set so as to be 0.5 mm or less, even if impact is applied to the liquid crystal panel 2F, the element substrate 11 is not damaged.

In this embodiment, the area of the spacer 25 is set so as to be larger than the area of the driving IC 19 in plan view. For this reason, the element substrate 11 is received by the wide area of the protective cover 4 through the spacer 25. The spacer 25 may have the same area as the driving IC 19, and may be disposed so as to be symmetric with the driving IC 19 with respect to the center line $X_1$. With this configuration, even if the area of the spacer 25 is not set so large, the extended portion 18 of the element substrate 11 can be stably received by the protective cover 4.

Electro-Optical Device According to Ninth Embodiment

Figure 10A:
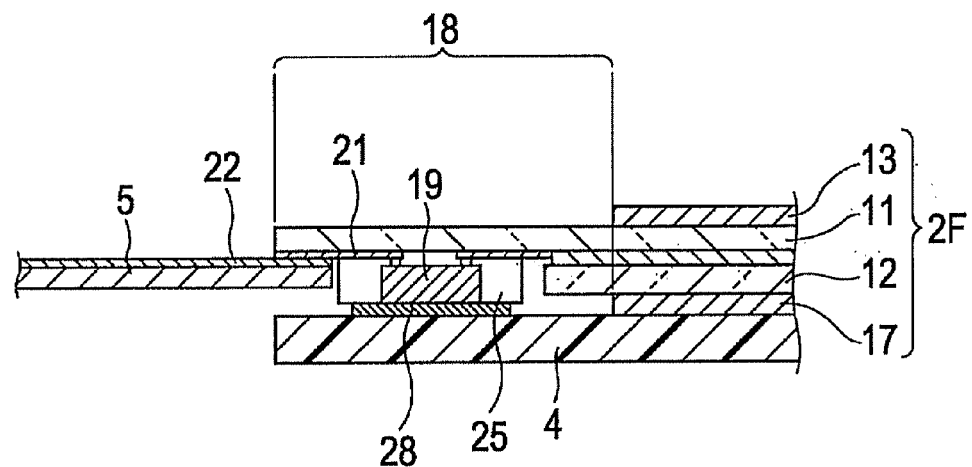
FIGS. 10A and 10B are a side sectional view and a plan view showing main parts of an electro-optical device according to a ninth embodiment of the invention, respectively.
Figure 10B:
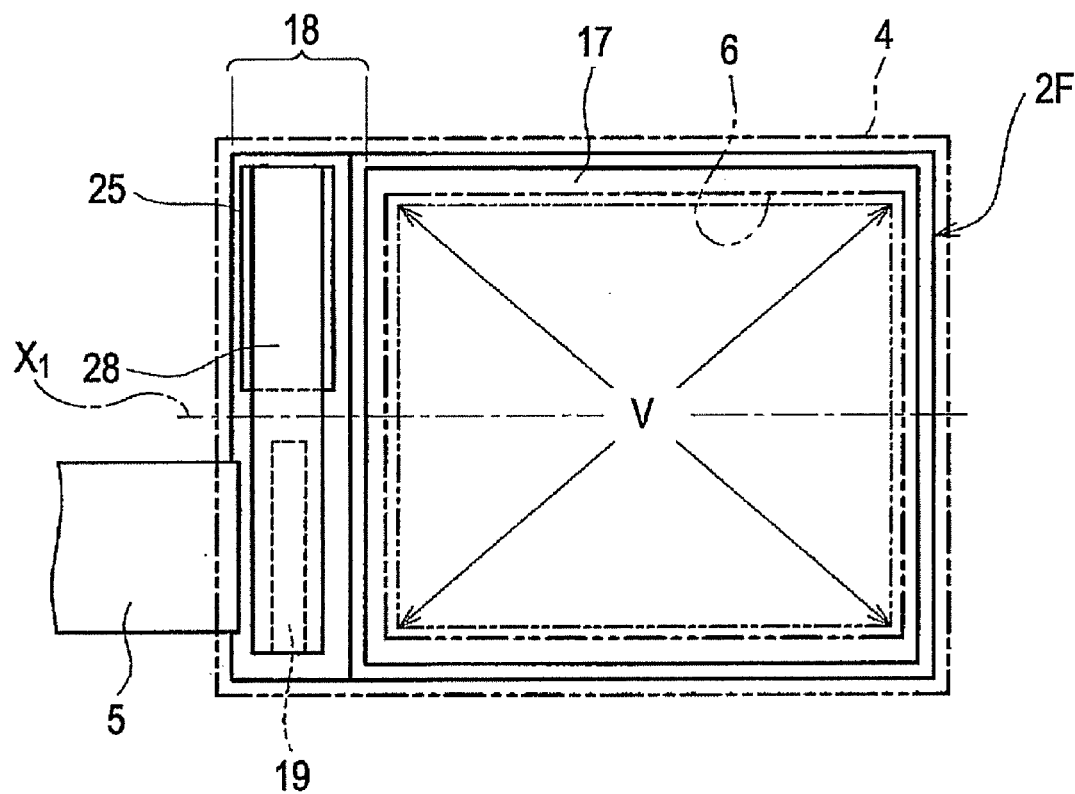

FIGS. 10A and 10B show a sectional structure of main parts of a liquid crystal display serving as an electro-optical device of this embodiment. FIG. 10A is a side sectional view of main parts of the liquid crystal display, and FIG. 10B is a plan view of the liquid crystal display. Similarly to the foregoing embodiment shown in FIG. 9A, this liquid crystal display has a liquid crystal panel 2F that has an element substrate 11, a color filter substrate 12, a polarizing plate 13, and a polarizing plate 17 serving as a member forming the outermost surface. Similarly to the embodiment of FIG. 9A, a driving IC 19 serving as an electronic part is mounted so as to lean to one side with respect to the center line $X_1$ in the end portion of the element substrate 11, that is, on the extended portion 18, which is a portion of the substrate extending outside of the polarizing plate 17 in plan view, and a spacer 25 is provided in a region on the opposite side.

In the embodiment of FIG. 9A, the thickness of each of the driving IC 19 and the spacer 25 is set to the total thickness of the color filter substrate 12 and the polarizing plate 17. In contrast, in this embodiment, the thickness of each of the driving IC 19 and the spacer 25 is set so as to be smaller than the total thickness of the color filter substrate 12 and the polarizing plate 17. That is, the height of the surface of the driving IC 19 from the surface of the element substrate 11 and the height of the surface of the spacer 25 from the surface of the element substrate 11 are set so as to be less than the height of the surface of the polarizing plate 17 from the surface of the element substrate 11. In addition, a light-shielding tape 28 serving as a second spacer is provided on the driving IC 19 and the spacer 25. The light-shielding tape 28 may be adhered or bonded to or simply placed on the driving IC 19 and the spacer 25. The height of the surface of the light-shielding tape 28 from the surface of the element substrate 11 is set so as to be equal to the height of the surface of the polarizing plate 17 from the surface of the element substrate 11.

Specifically, the thickness of the color filter substrate 12 is 0.2 mm, the thickness of the polarizing plate 17 is 0.15 mm, the thickness of each of the driving IC 19 and the spacer 25 is 0.3 mm, and the thickness of the light-shielding tape 28 is 0.05 mm. Therefore, the total thickness of the driving IC 19 and the light-shielding tape 28, the total thickness of the spacer 25 and the light-shielding tape 28, and the total thickness of the color filter substrate 12 and the polarizing plate 17 are equal to each other. The light-shielding tape 28 has a uniform thickness over the entire region. With this configuration, the protective cover 4 is in contact with both the surface of the polarizing plate 17 serving as a member forming the outermost surface and the surface of the light-shielding tape 28, and receives the polarizing plate 17 and the light-shielding tape 28. That is, the protective cover 4 receives both the main body portion and the extended portion 18 of the liquid crystal panel 2F.

With the above-described receiving structure of the protective cover 4, as shown in FIG. 26B, the entire liquid crystal panel 2F of FIG. 10A is received by the protective cover 4. Therefore, when impact is applied to the liquid crystal panel 2F due to dropping, the liquid crystal panel 2F is not subjected to large impact, and is protected from being damaged or cracked. In addition, the extended portion 18 in the end portion of the element substrate 11 of the liquid crystal panel 2F is received by the protective cover 4 through both of a laminate structure of the driving IC 19 and the light-shielding tape 28, and a laminate structure of the spacer 25 and the light-shielding tape 28. For this reason, the element substrate 11 is not curved or bent, and thus bending stress is not generated at the boundary between the element substrate 11 and the color filter substrate 12. As a result, the element substrate 11 is prevented from being damaged or cracked. In such a manner, a liquid crystal display having excellent impact resistance is configured.

In FIG. 10B, the width of the light-shielding tape 28 along the center line $X_1$ is set so as to be larger than the width of the driving IC 19 and smaller than the width of the spacer 25 in plan view. If the width of the light-shielding tape 28 is larger than the width of the driving IC 19, light can be effectively prevented from entering the driving IC 19. However, the width of the light-shielding tape 28 may be smaller than the width of the driving IC 19 or may be larger than the width of the spacer 25. The second spacer provided to overlap the driving IC 19 and the spacer 25 is not necessarily limited to a light-shielding tape, and a tape not having a light-shielding property, or a sheet material other than the tape may be used.

Electro-Optical Device According to Tenth Embodiment

Figure 11A:
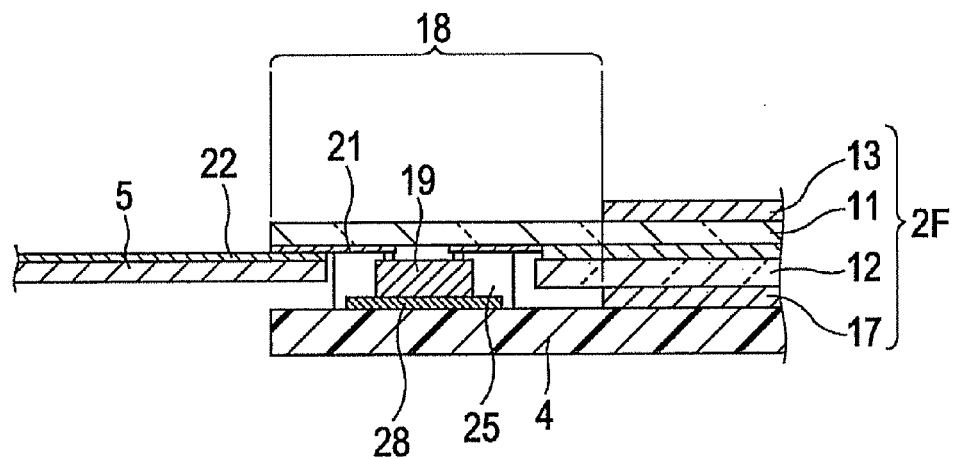
FIGS. 11A and 11B are a side sectional view and a plan view showing main parts of an electro-optical device according to a tenth embodiment of the invention, respectively.
Figure 11B:
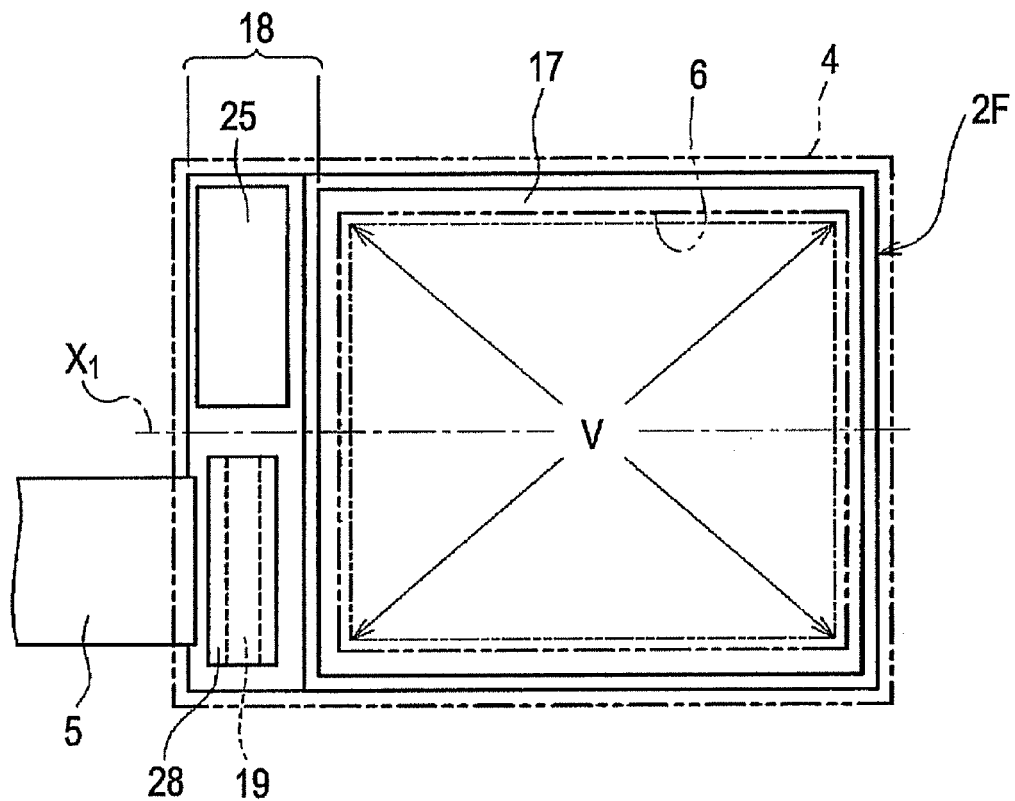

FIGS. 11A and 11B show a sectional structure of main parts of a liquid crystal display serving as an electro-optical device of this embodiment. FIG. 11A is a side sectional view of main parts of the liquid crystal display, and FIG. 11B is a plan view of the liquid crystal display. Similarly to the foregoing embodiments shown in FIGS. 9A and 9B, and FIGS. 10A and 10B, the liquid crystal display has a liquid crystal panel 2F that has an element substrate 11, a color filter substrate 12, a polarizing plate 13, and a polarizing plate 17 serving as a member forming the outermost surface. Similarly to the embodiments of FIGS. 9A and 9B, and FIGS. 10A and 10B, a driving IC 19 is mounted so as to lean to one side with respect to the center line $X_1$ in the end portion of the element substrate 11, that is, the extended portion 18, which is a portion of the substrate extending outside of the polarizing plate 17 in plan view, and a spacer 25 is provided in a region on the opposite side. In addition, similarly to the embodiment of FIG. 10, a light-shielding tape 28 serving as a second spacer is used.

In the foregoing embodiment of FIGS. 10A and 10B, the light-shielding tape 28 is provided on the surfaces of both of the driving IC 19 and the spacer 25, and the light-shielding tape 28 is in contact with the protective cover 4 serving as a receiving member. In contrast, in this embodiment, as shown in FIGS. 11A and 11B, a light-shielding tape 28 is laminated only on the driving IC 19, and no light-shielding tape is laminated on the spacer 25. That is, in this embodiment, the thickness of the driving IC 19 is set so as to be smaller than the total thickness of the color filter substrate 12 and the polarizing plate 17, and the thickness of the spacer 25 is set so as to be equal to the total thickness of the color filter substrate 12 and the polarizing plate 17.

The height of the surface of the driving IC 19 from the surface of the element substrate 11 is set so as to be less than the height of the surface of the polarizing plate 17 serving as a member forming the outermost surface from the surface of the element substrate 11. The height of the surface of the spacer 25 from the surface of the element substrate 11 is set so as to be equal to the height of the surface of the polarizing plate 17 from the surface of the element substrate 11. The light-shielding tape 28 is provided only on the driving IC 19. The height of the surface of the light-shielding tape 28 from the surface of the element substrate 11 is set so as to be equal to the height of the surface of the polarizing plate 17 from the surface of the element substrate 11. With this configuration, the protective cover 4 is in contact with both of the surface of the polarizing plate 17 serving as a member forming the outermost surface, the surface of the light-shielding tape 28, and the surface of the spacer 25, and receives the polarizing plate 17, the light-shielding tape 28, and the spacer 25. That is, the protective cover 4 receives both of the main body portion and the extended portion 18 of the liquid crystal panel 2F. Though not shown, the height of the surface of the driving IC 19 from the surface of the element substrate 11 may be set so as to be equal to the height of the surface of the polarizing plate 17 serving as a member forming the outermost surface from the surface of the element substrate 11. The height of the surface of the spacer 25 from the surface of the element substrate 11 may be set so as to be less than the height of the surface of the polarizing plate 17 from the surface of the element substrate 11. The light-shielding tape 28 may be provided only on the spacer 25. The height of the surface of the light-shielding tape 28 from the surface of the element substrate 11 may be set so as to be equal to the height of the surface of the polarizing plate 17 from the surface of the element substrate 11. The light-shielding tape 28 is laminated only on the spacer 25, and no light-shielding tape is laminated on the driving IC 19. That is, the thickness of the spacer 25 may be set so as to be smaller than the total thickness of the color filter substrate 12 and the polarizing plate 17, and the thickness of the driving IC 19 may be set so as to be equal to the total thickness of the color filter substrate 12 and the polarizing plate 17.

With the above-described receiving structure of the protective cover 4, the entire liquid crystal panel 2F of FIG. 11A is received by the protective cover 4. For this reason, as shown in FIG. 26B, when impact is applied to the liquid crystal panel due to dropping, the liquid crystal panel 2F is not subjected to large impact, and is protected from being damaged or cracked. In addition, the extended portion 18 of the element substrate 11 of the liquid crystal panel 2F is received by the protective cover 4 through a laminate structure of the driving IC 19 and the light-shielding tape 28, and the spacer 25. For this reason, the element substrate 11 is not curved or bent, and thus bending stress is not generated at the boundary between the element substrate 11 and the color filter substrate 12. As a result, the element substrate 11 is prevented from being damaged or cracked. In this way, a liquid crystal display having excellent impact resistance is configured.

Electro-Optical Device According to Eleventh Embodiment

Figure 12:
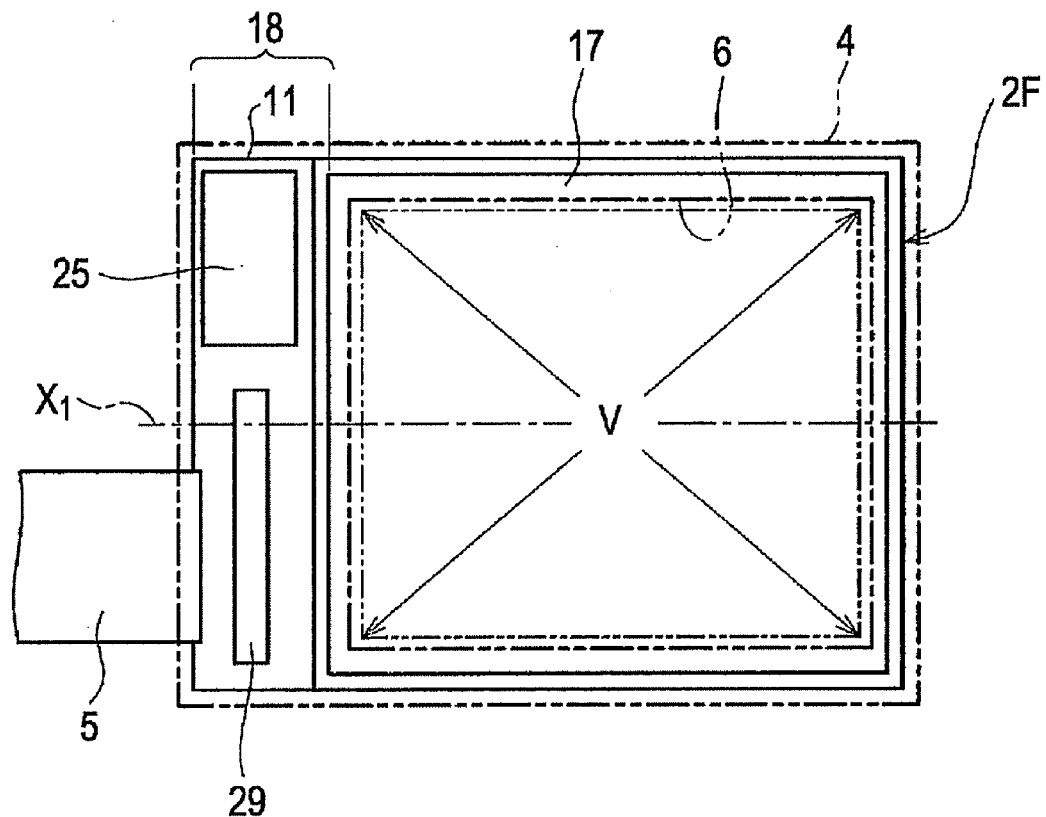
FIG. 12 is a plan view showing an electro-optical device according to an eleventh embodiment of the invention.

FIG. 12 shows a planar structure of a liquid crystal display serving as an electro-optical device of this embodiment. The liquid crystal display corresponds to an alteration of the embodiment shown in FIGS. 9A and 9B. Specifically, in this embodiment, a driving IC 29 serving as an electronic part is provided so as to lean to one side with respect to the center line $X_1$ on the extended portion 18 in the end portion of the element substrate 11. The driving IC 29 is provided beyond the center line $X_1$. In the liquid crystal display having the above configuration, the protective cover 4 is in contact with the polarizing plate 17 serving as a member forming the outermost surface of the liquid crystal panel 2F and receives the polarizing plate 17. The protective cover 4 is also in contact with the driving IC 29 and the spacer 25, and receives the driving IC 29 and the spacer 25. Since the protective cover 4 receive the driving IC 29 and the spacer 25, when impact is applied to the element substrate 11, the protective cover 4 can prevent the extended portion 18 of the element substrate 11 from being bent, and as a result, the element substrate 11 can be prevented from being damaged.

Electro-Optical Device According to Twelfth Embodiment

Figure 13:
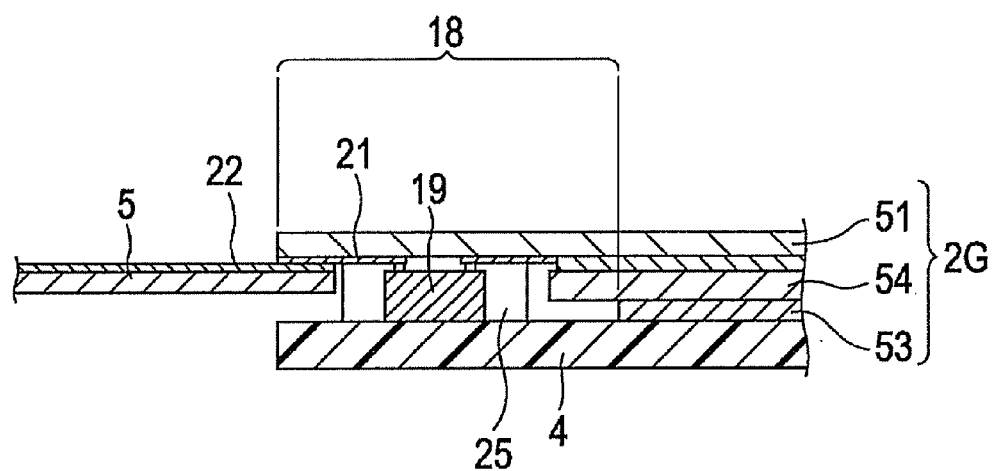
FIG. 13 is a side sectional view showing main parts of an electro-optical device according to a twelfth embodiment of the invention.

FIG. 13 shows a sectional structure of main parts of an organic EL display serving as an electro-optical device of this embodiment. In this embodiment, the same parts as those in the embodiment of FIG. 5 are represented by the same reference numerals, and descriptions thereof will be omitted. In this display, instead of the liquid crystal panel 2F of FIG. 8, an EL panel 2G serving as an electro-optical panel is housed in the lower frame 3 and is protected by the protective cover 4. The EL panel 2G has an element substrate 51 and counter members 54 and 53. The counter member 54 is a protective film, and the counter member 53 is a visual quality improving sheet. The visual quality improving sheet 53 is, for example, an anti-reflection sheet or a viewing angle adjusting sheet. In this embodiment, the visual quality improving sheet 53 functions as a member forming an outermost surface that is a member on an outermost side of the EL panel 2G.

The protective film 54 functions as a protective member for protecting organic EL materials or other elements formed on the element substrate 51. The visual quality improving sheet 53 improves visual quality of an image to be displayed in the effective display region V (see FIG. 8). The visual quality improving sheet 53 prevents reflection of light on an image display surface or adjusts the viewing angle, at which an image is visible, wide or narrow. A driving IC 19 and a spacer 25 are provided on the extended portion (that is, in the end portion of the element substrate 51) 18 extending outside of the visual quality improving sheet 53 on the element substrate 51 in plan view, and an FPC board 5 is connected to the edge portion of the extended portion 18.

The thickness of each of the driving IC 19 and the spacer 25 is set so as to be equal to the total thickness of the protective film 54 and the visual quality improving sheet 53. For this reason, the height of the surface of the driving IC 19 or the spacer 25 from the surface of the element substrate 51 is set so as to be equal to the height of the surface of the visual quality improving sheet 53 from the surface of the element substrate 11.

When an additional optical element is provided on the visual quality improving sheet 53, that is, when an additional optical element becomes a member forming the outermost surface, the height of each of the driving IC 19 and the spacer 25 is set so as to be equal to the additional optical element. The fact that the height of one element is equal to the height of another element is a concept including a case in which the height of one element is completely equal to the height of another element, and a case in which a difference is present due to a part error, an assembling error, or a design tolerance. Specifically, if a difference is in the range of approximately ±0.05 mm, it can be understood that the height of one element is equal to the height of another element.

The protective cover 4 is in direct contact with the surface of the visual quality improving sheet 53 serving as a member forming the outermost surface of the EL panel 2G. As occasion demands, the protective cover 4 may be in contact with the visual quality improving sheet 53 through an additional element, such as a bonding agent or an impact absorbing material. The protective cover 4 linearly extends to a region opposite the extended portion 18 of the element substrate 51, and is in contact with the surfaces of the driving IC 19 and the spacer 25. In this case, the protective cover 4 may be in direct contact with the driving IC 19 and the spacer 25, or may be in contact with the driving IC 19 and the spacer 25 through a bonding agent. With this configuration, the extended portion 18 of the element substrate 51 is received by the protective cover 4 through the driving IC 19 and the spacer 25. That is, the protective cover 4 receives the extended portion 18 in the end portion of the element substrate 51 of the EL panel 2G, as well as the main body portion of the EL panel 2G.

The fact that the protective cover 4 is in contact with the surface of each of the visual quality improving sheet 53, the driving IC 19, and the spacer 25 is a concept taking a part error, an assembling error, or a design tolerance in consideration, that is, a case in which there is a slight gap in the error range. Specifically, there may be a gap of approximately ±0.1 mm between the protective cover 4 and the elements, such as the visual quality improving sheet 53, the driving IC 19, and the spacer 25.

With the above-described receiving structure of the protective cover 4, the entire EL panel 2G of FIG. 13 is received by the protective cover 4. For this reason, as shown in FIG. 26B, when impact is applied to the EL panel due to dropping, the EL panel 2G is not subjected to large impact, and is protected from being damaged or cracked. In addition, the extended portion 18 in the end portion of the element substrate 51 of the EL panel 2G is received by the protective cover 4 through the driving IC 19 and spacer 25. For this reason, the element substrate 51 is not curved or bent, and thus bending stress is not generated at the boundary between the element substrate 51 and the protective film 54. As a result, the element substrate 51 is prevented from being damaged or cracked.

In the above-described manner, an organic EL display having excellent impact resistance is configured. Of course, when an impact load is applied to the extended portion 18 of the element substrate 51, the flat plate frame 7 of the protective cover 4 (see FIG. 8) has sufficient hardness, that is, sufficient mechanical strength to prevent the extended portion 18 from being bent or curved.

Electro-Optical Device According to Thirteenth Embodiment

Figure 14:
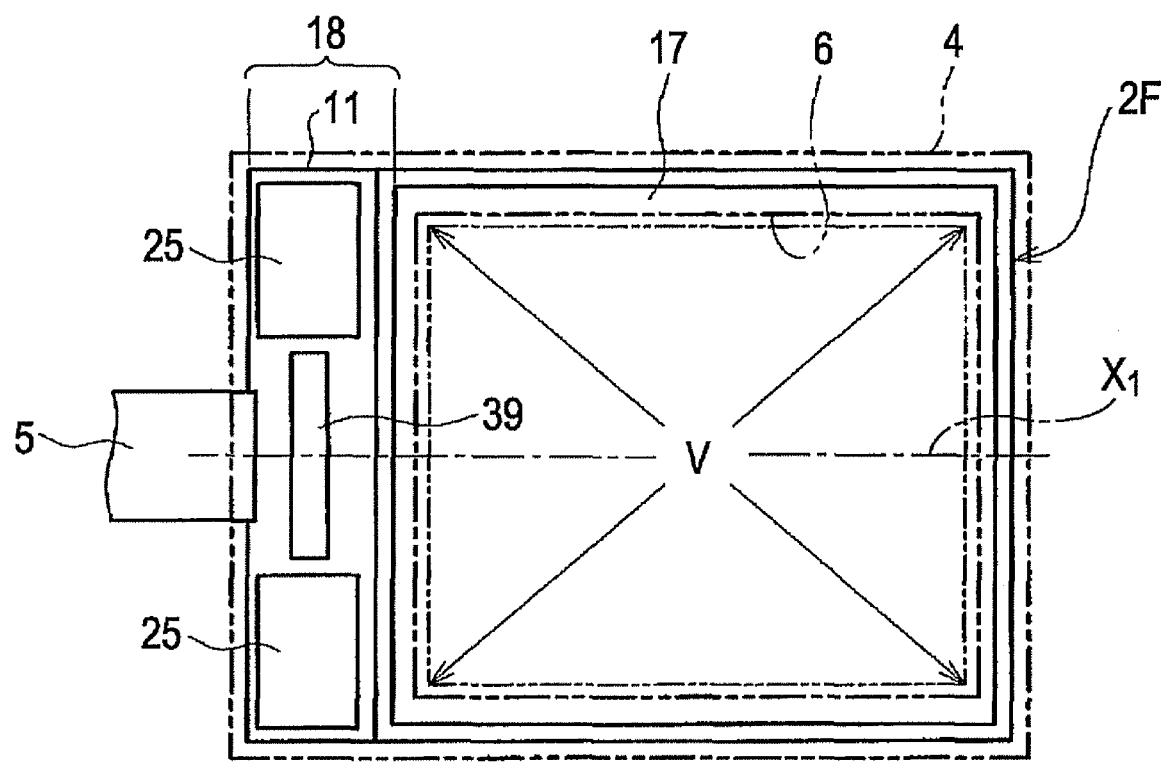
FIG. 14 is a plan view showing an electro-optical device according to a thirteenth embodiment of the invention.

FIG. 14 shows a planar structure of a liquid crystal display serving as an electro-optical device of this embodiment. This liquid crystal display corresponds to an alteration of the embodiments shown in FIGS. 9A and 9B, and FIG. 12. Specifically, in this embodiment, a driving IC 39 serving as an electronic part is provided in the central portion of the extended portion 18, without leaning to one side with respect to the center line $X_1$ on the extended portion 18 in the end portion of the element substrate 11. In addition, two spacers 25 are separately provided on both sides of the driving IC 39. The spacer 25 may be provided on one side.

In the liquid crystal display having the above-described configuration, the protective cover 4 is in contact with the polarizing plate 17 serving a member forming the outermost surface of the liquid crystal panel 2F and receives the polarizing plate 17. The protective cover 4 is also in contact with the driving IC 39 and the spacer 25, and receives the driving IC 39 and the spacer 25. Since the protective cover 4 receives the driving IC 39 and the spacer 25, when impact is applied to the element substrate 11, the protective cover 4 can prevent the extended portion 18 of the element substrate 11 from being bent, and as a result, the element substrate 11 can be prevented from being damaged.

Electro-Optical Device According to Fourteenth Embodiment

Figure 15A:
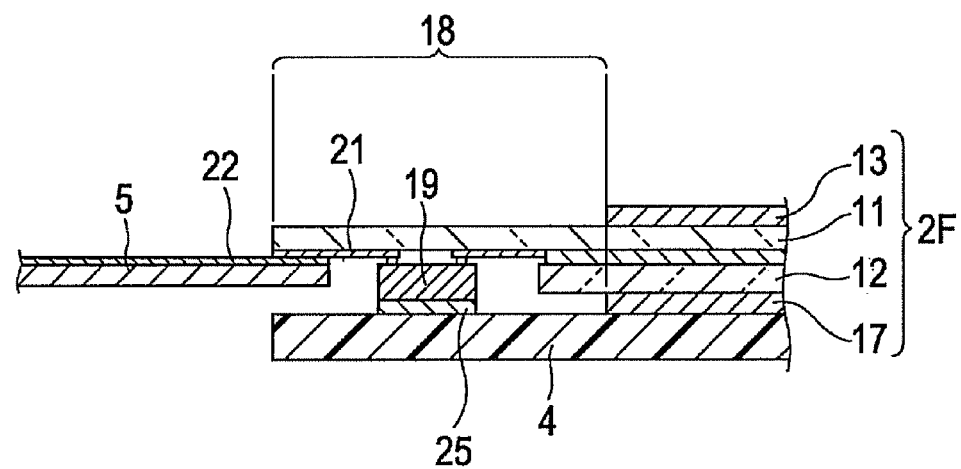
FIGS. 15A and 15B are a side sectional view and a plan view showing main parts of an electro-optical device according to a fourteenth embodiment of the invention, respectively.
Figure 15B:
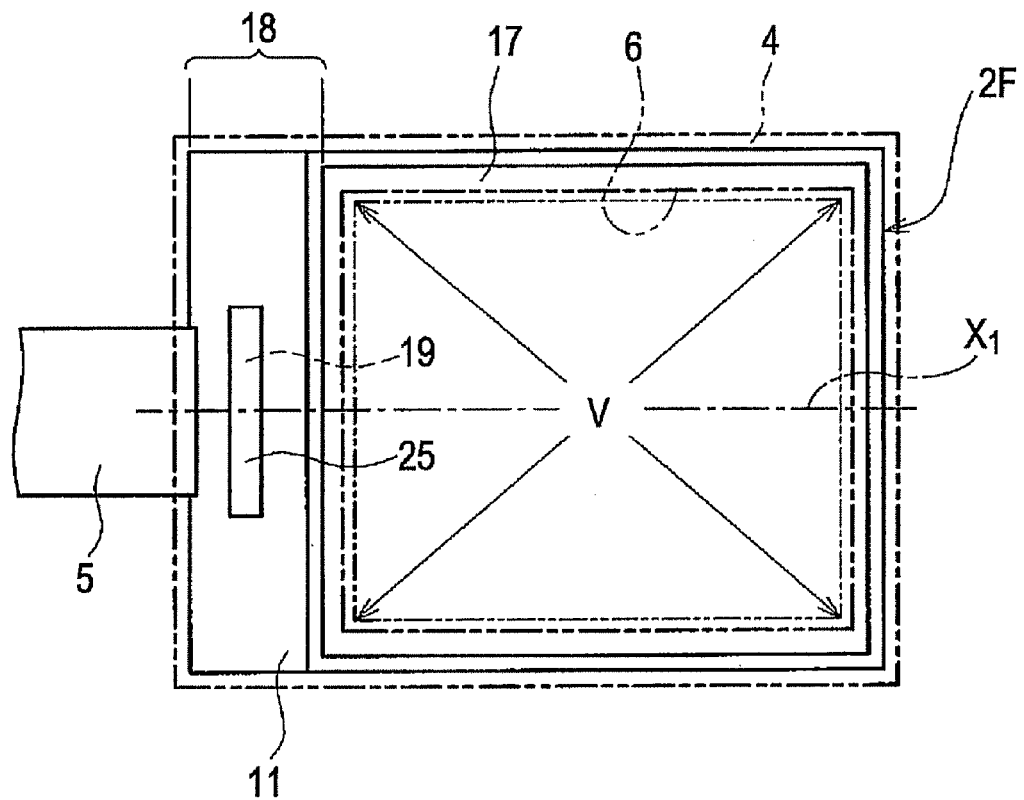

FIGS. 15A and 15B show a planar structure of a liquid crystal display serving as an electro-optical device of this embodiment. In this embodiment, the same parts as those in the embodiments of FIG. 8 and FIGS. 9A and 9B are represented by the same reference numerals, and descriptions thereof will be omitted. In the liquid crystal display of this embodiment, a spacer 25 is provided only on the driving IC 19 serving as an electronic part, and no spacer 25 is provided in a region on the substrate 11 where the driving IC 19 is not provided. In this embodiment, the extended portion 18 of the substrate 11 is received by the protective cover 4 through the driving IC 19 and the spacer 25. For this reason, when impact is applied to the substrate 11, the protective cover 4 can prevent the extended portion 18 from being bent.

The material for the spacer 25 is not limited to a specific material, and in this embodiment, the spacer 25 is formed of an exoergic material having high thermal conductivity. The thermal conductivity of the exoergic material is not limited to a specific value, and in this embodiment, the spacer 25 is formed of a material having thermal conductivity higher than the driving IC 19 and lower than the protective cover 4. With this configuration, the spacer 25 can efficiently cool the driving IC 19.

In this embodiment, the driving IC 19 is mounted in the central portion of the extended portion 18, but if necessary, as shown in FIGS. 9A and 9B, the driving IC 19 may be mounted so as to lean to one side on the extended portion 18. In this embodiment, the spacer 25 has the same planar shape as the driving IC 19, but the spacer 25 and the driving IC 19 may have different planar shapes.

Modification 2 of Electro-Optical Device

Although in each of the eighth to fourteenth embodiments, a single driving IC 19, 29, or 39 is mounted in the extended portion 18 of the element substrate 11, that is, in the end portion of the substrate, a plurality of driving ICs may be mounted on the substrate 11. In this case, the spacer 25 is disposed to correspond to the driving ICs 19, 29, and 39.

In the foregoing description, a case in which the protective cover 4 is fixed to the polarizing plate 17 (FIGS. 9A, 10A, and 11A) serving as a member forming the outermost surface or the visual quality improving sheet 53 (FIG. 13). Alternatively, the protective cover 4 may be fixed to a member other than the polarizing plate 17 or the visual quality improving sheet 53. For example, the protective cover 4 may be fixed to the substrate 12 to which the polarizing plate 17 is adhered, or the protective film 54 to which the visual quality improving sheet 53 is adhered.

Electronic Apparatus According to Fifteenth Embodiment

Figure 16:
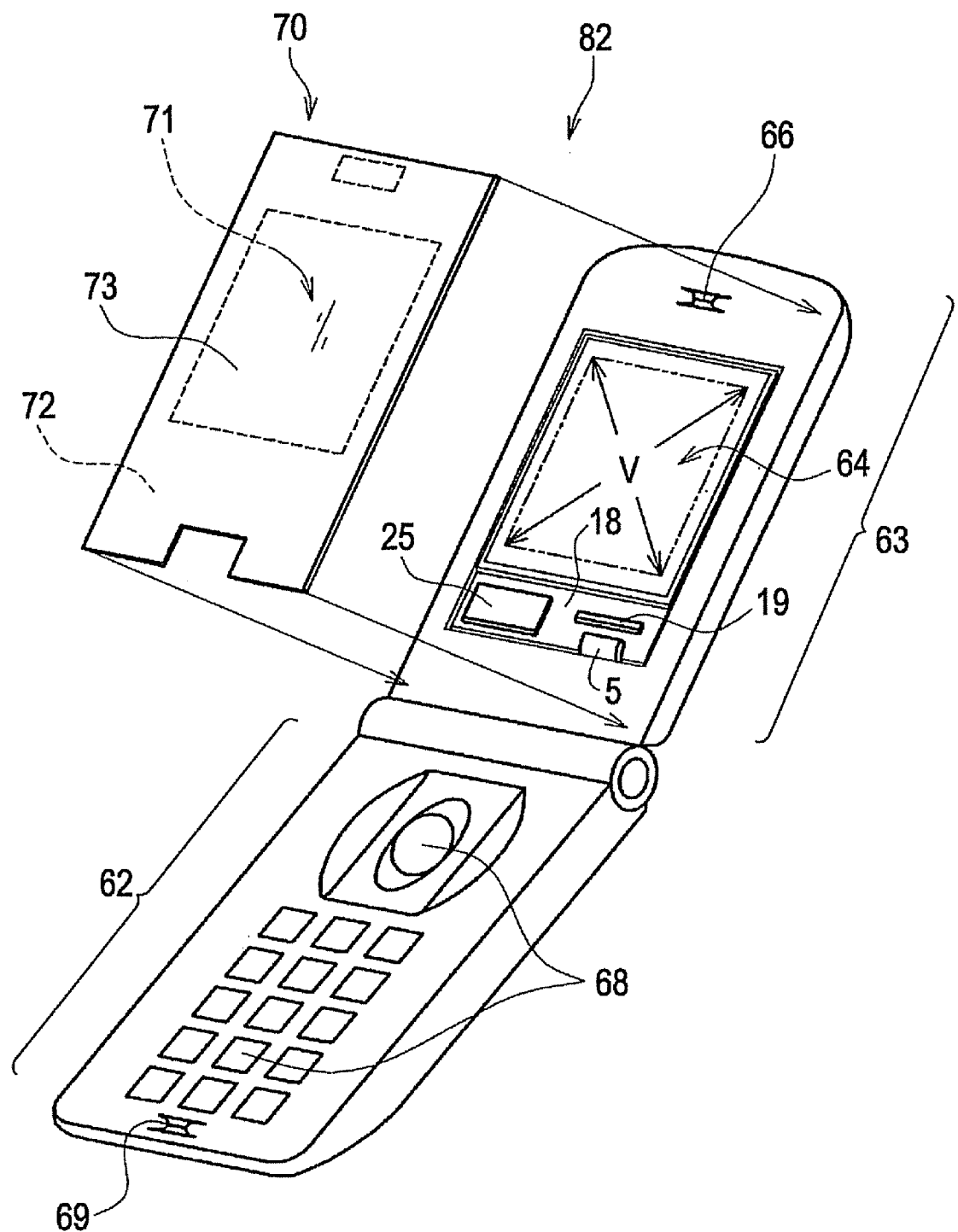
FIG. 16 is a partially exploded perspective view showing an electronic apparatus according to a fifteenth embodiment of the invention.

FIG. 16 is a partially exploded perspective view showing an electronic apparatus of this embodiment. A mobile phone 82 shown in FIG. 16 has a main body portion 62 and a display body portion 63 provided openably with respect to the main body portion 62. The display body portion 63 is provided with an electro-optical panel 64 and a receiver 66. Various kinds of display regarding a telephone call are displayed in the effective display region V of the electro-optical panel 64. A control section for controlling the operation of the electro-optical panel 64 is incorporated into the main body portion 62 or the display body portion 63 as a part of a controller for overall control of the mobile phone or separately from the controller. The main body portion 62 is provided with operating buttons 68 and a transmitter 69.

The electro-optical panel 64 is formed by the liquid crystal panel 2F shown in FIGS. 9A and 9B, 10A and 10B, 11A and 11B, or 12, or the EL panel 2G shown in FIG. 13. FIG. 16 shows a case in which the liquid crystal panel 2F of FIGS. 9A and 9B is representatively used. The electro-optical panel 64 is housed in a container provided in the display body portion 63, and the protective cover 70 is mounted in the display body portion 63 by bonding so as to cover the electro-optical panel 64. A rear surface of the protective cover 70 receives a member forming an outermost surface (in the liquid crystal panel 2F of FIGS. 9A and 9B, the polarizing plate 17), which is a member provided on an outermost side of the electro-optical panel 64.

The protective cover 70 is formed by attaching a transparent plastic sheet 73 to the entire surface of a plastic flat plate frame 72 having a rectangular opening 71 such that the opening 71 is covered with the transparent plastic sheet 73. An image to be displayed in the effective display region V of the electro-optical panel 64 is visible through the opening 71. When impact is applied to the extended portion 18 in the end portion of the substrate of the electro-optical panel 64, the flat plate frame 72 has sufficient mechanical strength, hardness, or elastic strength to prevent the display body portion 63 from being bent or curved outward.

With respect to the electro-optical panel 64 in this embodiment, as described in connection with the liquid crystal panel 2F shown in FIG. 9A, when the electro-optical panel 64 is received by the protective cover 70, as shown in FIG. 9A, the main body portion of the electro-optical panel 64 (the liquid crystal panel 2F of FIG. 9A) is received by the protective cover 70 (the protective cover 4 of FIG. 9A). In addition, the extended portion 18 of the substrate (the element substrate 11 of FIG. 9A) of the electro-optical panel 64 is received by the protective cover 70 (the protective cover 4 of FIG. 9A) through the driving IC 19 and the spacer 25.

Therefore, as shown in FIG. 26B, even if the mobile phone 82 is accidently dropped and impact is applied to the electro-optical panel, the substrate (the element substrate 11) of the electro-optical panel (the liquid crystal panel 2F) of FIG. 9A is not curved, and thus bending stress is not generated at the boundary between the substrate (the element substrate 11) and the counter member (the color filter substrate 12). As a result, the substrate is prevented from being damaged or cracked. For this reason, the drop impact resistance of the mobile phone 82 can be improved.

Electro-Optical Device According to Sixteenth Embodiment

Figure 17:
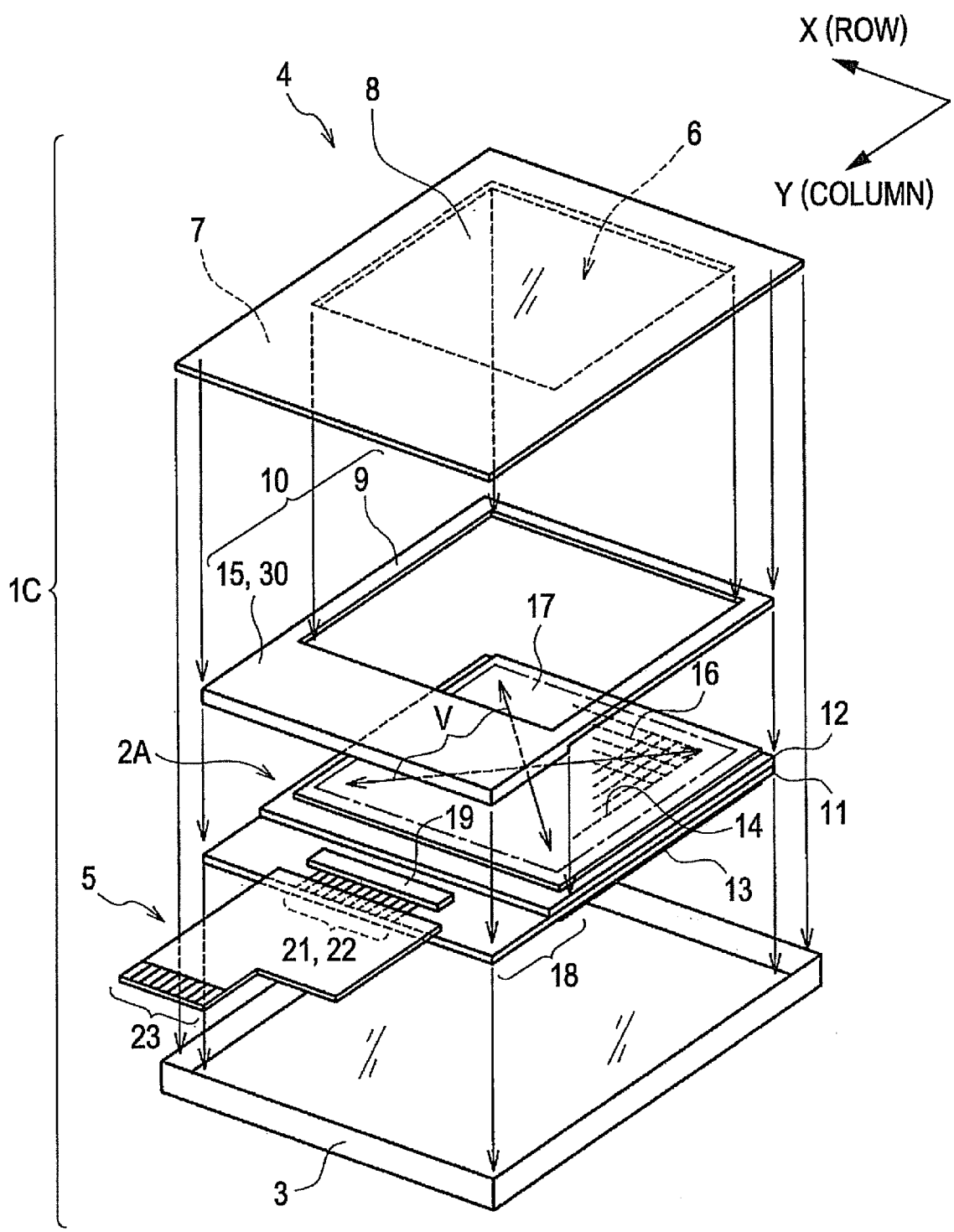
FIG. 17 is an exploded perspective view showing an electro-optical device according to a sixteenth embodiment of the invention.

FIG. 17 shows a liquid crystal display which is an example of an electro-optical device of this embodiment. In FIG. 17, the liquid crystal panel 2A has the same configuration as the liquid crystal panel 2A of the first embodiment shown in FIG. 1. The same parts are represented by the same reference numerals, and descriptions thereof will be omitted. This liquid crystal display 1C has the liquid crystal panel 2A serving as a panel, an FPC board 5, serving as a wiring board, connected to the liquid crystal panel 2A, a lower frame 3, and a protective cover 4 serving as a protective member. An additional member 10 is provided between the protective cover 4 and the liquid crystal panel 2A to receive the liquid crystal panel 2A.

The liquid crystal panel 2A is housed in the lower frame 3, and the protective cover 4 is incorporated into the lower frame 3 on the liquid crystal panel 2A with the additional member 10 interposed therebetween. Thus, the liquid crystal display 1C as a single module is completed. An adhesive or a bonding agent is coated on both surfaces of the additional member 10. Therefore, the lower surface of the additional member 10 is bonded to the liquid crystal panel 2A, and the upper surface of the additional member 10 is bonded to the lower surface of the protective cover 4. The details of the additional member 10 will be described below.

Figure 18A:
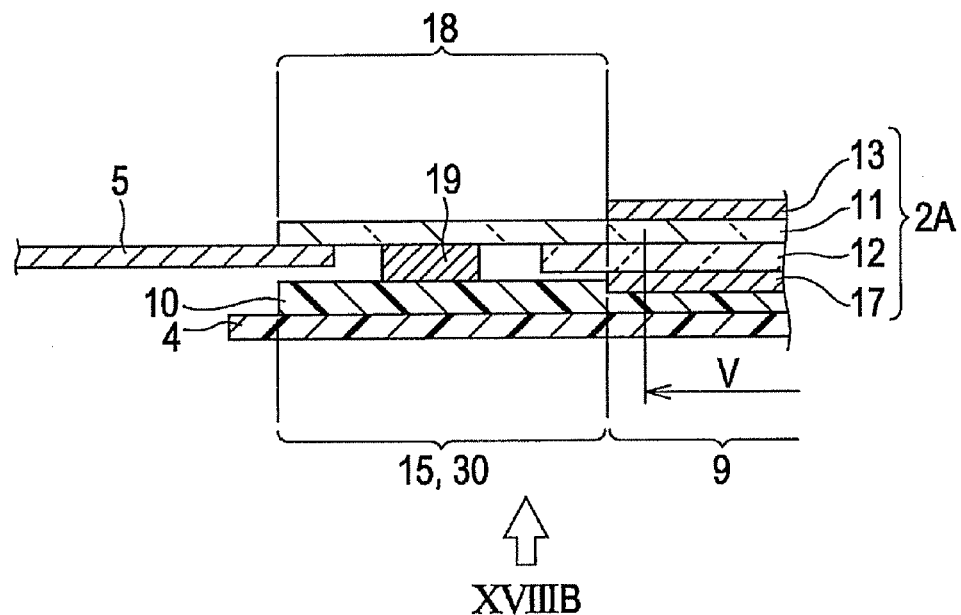
FIG. 18A is a side sectional view of main parts of the electro-optical device of FIG. 17.

FIG. 18A shows a sectional structure around the extended portion 18 of the element substrate 11. FIG. 18A shows a state where the element substrate 11 and the color filter substrate 12 are inverted vertically, as compared with the state of FIG. 17. In this embodiment, as shown in FIG. 18A, the polarizing plate 17 is provided around a surface on an outermost side of the liquid crystal panel 2A.

With this configuration, if a predetermined driving signal is input from the input terminals 23 of the FPC board 5, scanning signals and data signals for liquid crystal driving are generated by the driving IC 19, and are then transmitted to the subpixels constituting each pixel. Then, necessary TFT elements are turned on/off. Therefore, depending on the switching operation of the TFT elements, a desired image is displayed in the effective display region V.

In this embodiment, in order to bury the space portion, in other words, to eliminate the step portion, the additional member 10 is provided between the liquid crystal panel 2A and the protective cover 4. As shown in FIG. 17, the additional member 10 has a main body receiving portion 9 receiving the main body portion of the liquid crystal panel 2A, that is, a portion where the effective display region V is formed, and an extended portion 15 extending outside of the polarizing plate 17 in plan view. The main body receiving portion 9 has a rectangular (that is, oblong or square) ring shape, and is disposed to correspond to a region outside the effective display region V around the polarizing plate 17. The entire extended portion 15 is formed so as to be thicker than the main body receiving portion 9. Thus, the entire extended portion 15 forms a thick portion 30.

The main body receiving portion 9 and the extended portion 15 are integrally connected to each other in a material manner, that is, in a member manner. The thickness of the extended portion 15 is set such that the surface of the extended portion 15 on the panel side is in contact with or close to the surface of the driving IC 19. The state that the extended portion 15 is close to the surface of the driving IC 19 means that, although there is a gap between the extended portion 15 and the driving IC 19, this gap is sufficient to prevent the extended portion 18 of the element substrate 11 from being bent or curved toward the protective cover 4. That is, the extended portion 15 is not necessarily in contact with the driving IC 19, consequently, the liquid crystal panel 2A.

Figure 18B:
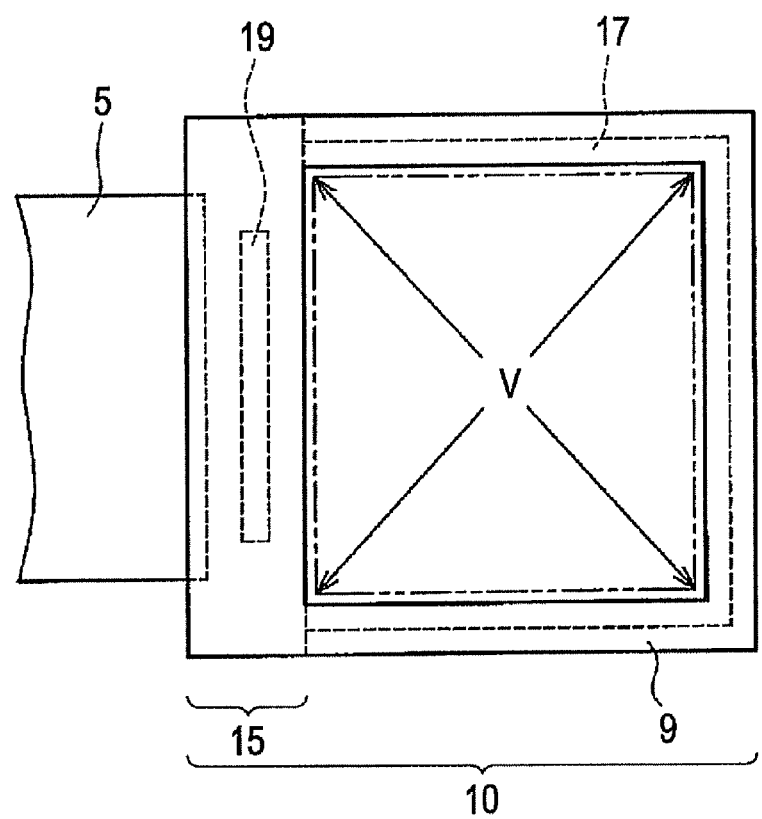
FIG. 18B is a plan view when viewed from an arrow XVIIIB of FIG. 18A.

FIG. 18B shows a state where the additional member 10 is viewed from an arrow XVIIIB of FIG. 18A in plan view. In FIG. 18B, the protective cover 4 is not shown. As shown in FIG. 18B, the ring-shaped main body receiving portion 9 is in contact with the periphery of the polarizing plate 17 and receives the polarizing plate 17 in the periphery. The extended portion 15, that is, the thick portion 30, is disposed in a region separated from the polarizing plate 17. As described above, the additional member 10 is provided between the extended portion 18 and the protective cover 4 in the end portion of the panel, and is also provided in a region outside the effective display region V in the peripheral region of the polarizing plate 17 serving as a surface member of the liquid crystal panel 2A.

The additional member 10 including the extended portion 15 is formed of an impact absorbing material. The impact absorbing material is a material that is elastically deformed when an impact load is applied, thereby absorbing impact. Examples of the impact absorbing material include (1) rubber, (2) a foam material containing acrylic resin as a major component, (3) a gel material containing urethane resin as a major component, (4) a gel material containing polyurethane resin as a major component, (5) a material containing ether-based polyurethane resin as a major component, and (6) a gel-phase material containing silicon as a major component. The additional member 10 may be formed of a material, such as polycarbonate or PET, which is not generally used as an impact absorbing material.

Rubber is a material that is elastically deformed when an impact load is applied and is then elastically deformed to be restored to the original state immediately. The foam material is a material having a foaming structure, that is, a foam structure. The foam material is a material that is elastically deformed when an impact load is applied and is then elastically deformed to be restored to the original state. The foam material has, however, has a low elastic restoration deformation speed, as compared with rubber, and thus it has a very small restoration repulsive force. The gel material is a soft material having an intermediate property between solid and liquid, and is, for example, a Japanese gelatin-phase, gelatin-phase, or a soft contact lens-phase material. Like the foam material, the gel material has a very small restoration repulsive force, and can achieve a large impact absorbing function.

For example, urethane is excellent in energy absorbability, and can absorb 90% or more of impact. If a golf ball is dropped on a urethane gel placed on a hard floor, the golf ball is not bounded and stops on the urethane gel.

In the case of the foam material containing acrylic resin as a major component, when the foam material is placed on a steel plate, an acceleration sensor is provided on the rear surface of the steel plate, and a metal plate of approximately 200 g is dropped from an upward position of the foam material, an impact acceleration can be significantly reduced, as compared with a case in which a metal plate is directly dropped on the steel plate without using a foam material. The degree of reduction can be adjusted large or small by changing the thickness of the foam material.

The main body receiving portion 9 of the additional member 10 is in contact with the surface of the polarizing plate 17 serving as a surface member of the liquid crystal panel 2A. Therefore, the entire liquid crystal panel 2A is received by the protective cover 4 through the additional member 10. In addition, the surface of the extended portion 15 of the additional member 10 on the liquid crystal panel side is in contact with or close to the surface of the driving IC 19. Therefore, the extended portion 18 of the element substrate 11 is received by the protective cover 4 through the driving IC 19 and the extended portion 15 of the additional member 10.

With the above-described receiving structure of the additional member 10 and the protective cover 4, the entire liquid crystal panel 2A of the FIG. 18A is received by the additional member 10 formed of an impact absorbing material. For this reason, as shown in FIG. 26B, when impact is applied to the liquid crystal panel due to dropping, the liquid crystal panel 2A is not subjected to large impact, and is protected from being damaged or cracked.

The space in the end portion of the liquid crystal panel 2A is buried by the thick portion 30 of the additional member 10. That is, the extended portion 18 of the element substrate 11 of the liquid crystal panel 2A is received by the extended portion 15 of the additional member 10 through the driving IC 19, and is further received by the protective cover 4. For this reason, the element substrate 11 is not curved or bent, and thus bending stress is not generated at the boundary between the element substrate 11 and the color filter substrate 12, that is, in the step portion. As a result, the element substrate 11 is prevented from being damaged or cracked. In this way, a liquid crystal display having excellent impact resistance is configured.

In this embodiment, the additional member 10 is provided between the extended portion 18 of the element substrate 11 and the protective cover 4 in the end portion of the liquid crystal panel 2A, and simultaneously the additional member 10 is provided in a portion other than the effective display region V in the main body portion of the liquid crystal panel 2A. If the additional member 10 is provided only in the space portion of the end portion of the liquid crystal panel 2A, and no additional member 10 is provided in the main body portion of the liquid crystal panel 2A, a step may be newly formed between the end portion and the main body portion of the liquid crystal panel 2A, and accordingly when impact is applied to the liquid crystal panel 2A, the liquid crystal panel may be damaged due to the new step. In contrast, in this embodiment, the additional member 10 extends to the main body portion, as well as the end portion of the liquid crystal panel 2A. Therefore, no step is newly formed between the end portion and the main body portion of the liquid crystal panel 2A.

If the additional member 10 extends to the main body portion of the liquid crystal panel 2A so as to be disposed in the peripheral region of the effective display region V, the main body portion of the liquid crystal panel 2A where the element substrate 11 and the color filter substrate 12 overlap each other can be reinforced.

Electro-Optical Device According to Seventeenth Embodiment

Figure 19A:
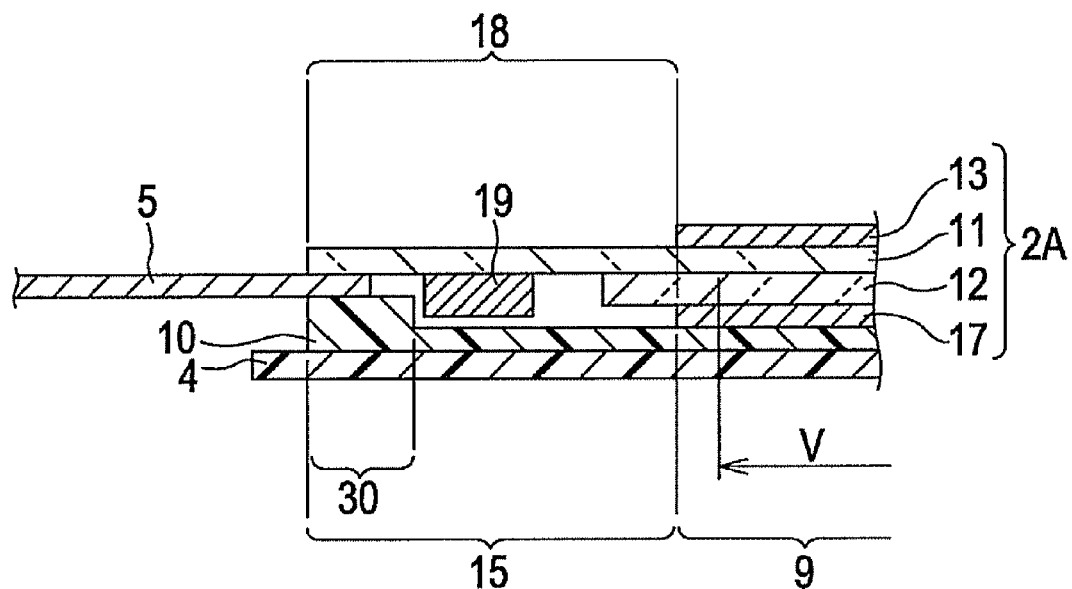
FIG. 19A is a side sectional view of main parts of an electro-optical device according to a seventeenth embodiment of the invention.

FIG. 19A shows a sectional structure of main parts of a liquid crystal display serving as an electro-optical device of this embodiment. A liquid crystal panel 2A shown in FIG. 19A has the same configuration of the liquid crystal panel represented by the same reference numeral in FIG. 18A. Similarly to the foregoing embodiment, as shown in FIG. 17, the liquid crystal panel 2A is housed in the lower frame 3 and is further received by the protective cover 4 to be protected.

In the embodiment of FIG. 18A, the entire extended portion 15 of the additional member 10 extending outside of the polarizing plate 17 serving as a surface member in plan view becomes the thick portion 30, and the extended portion 15 is in contact with or close to the surface of the driving IC 19. In contrast, in this embodiment, as shown in FIG. 19A, a portion on the tip side of the extended portion 15 of the additional member 10 becomes a thick portion 30, and the thick portion 30 is in contact with or close to the surface of the connection end portion of the FPC board 5 to the element substrate 11. The thickness of the thick portion 30 is set such that, in a state where the main body receiving portion 9 of the additional member 10 is in contact with the polarizing plate 17, the surface of the thick portion 30 on the liquid crystal panel side is in contact with or close to the surface of the FPC board 5.

As described above, the main body receiving portion 9 of the additional member 10 is in contact with the surface of the polarizing plate 17 serving as a surface member of the liquid crystal panel 2A. Therefore, the entire liquid crystal panel 2A is received by the protective cover 4 through the additional member 10. In addition, the surface of the thick portion 30 of the extended portion 15 of the additional member 10 on the liquid crystal panel side is in contact with or close to the surface of the FPC board 5. Therefore, the extended portion 18 of the element substrate 11 is received by the protective cover 4 through the FPC board 5 and the thick portion 30 of the extended portion 15 of the additional member 10.

With the above-described receiving structure of the additional member 10 and the protective cover 4, the entire liquid crystal panel 2A of FIG. 19A is received by the additional member 10 formed of an impact absorbing material. For this reason, as shown in FIG. 26B, when impact is applied to the liquid crystal panel due to dropping, the liquid crystal panel 2A is not subjected to large impact, and is protected from being damaged or cracked.

The space in the end portion of the liquid crystal panel 2A is buried by the thick portion 30 of the additional member 10. That is, the extended portion 18 of the element substrate 11 of the liquid crystal panel 2A is received by the extended portion 15 of the additional member 10 through the FPC board 5, and is further received by the protective cover 4. Therefore, the element substrate 11 is not curved or bent, and thus bending stress is not generated at the boundary between the element substrate 11 and the color filter substrate 12, that is, in the step portion. As a result, the element substrate 11 is prevented from being damaged or cracked. In this way, a liquid crystal display having excellent impact resistance is configured.

In this embodiment, the additional member 10 is provided between the extended portion 18 of the element substrate 11 and the protective cover 4 in the end portion of the liquid crystal panel 2A, and simultaneously the additional member 10 is provided in a portion other than the effective display region V in the main body portion of the liquid crystal panel 2A. If the additional member 10 is provided only in the space portion of the end portion of the liquid crystal panel 2A, and no additional member 10 is provided in the main body portion of the liquid crystal panel 2A, a step may be newly formed between the end portion and the main body portion of the liquid crystal panel 2A, and when impact is applied to the liquid crystal panel 2A, the liquid crystal panel 2A may be damaged due to the new step. In contrast, in this embodiment, the additional member 10 extends to the main body portion, as well as the end portion of the liquid crystal panel 2A. Therefore, no step is newly formed between the end portion and the main body portion of the liquid crystal panel 2A.

If the additional member 10 extends to the main body portion of the liquid crystal panel 2A so as to be disposed in the peripheral region of the effective display region V, the main body portion of the liquid crystal panel 2A where the element substrate 11 and the color filter substrate 12 overlap each other can be reinforced.

Electro-Optical Device According to Eighteenth Embodiment

Figure 19B:
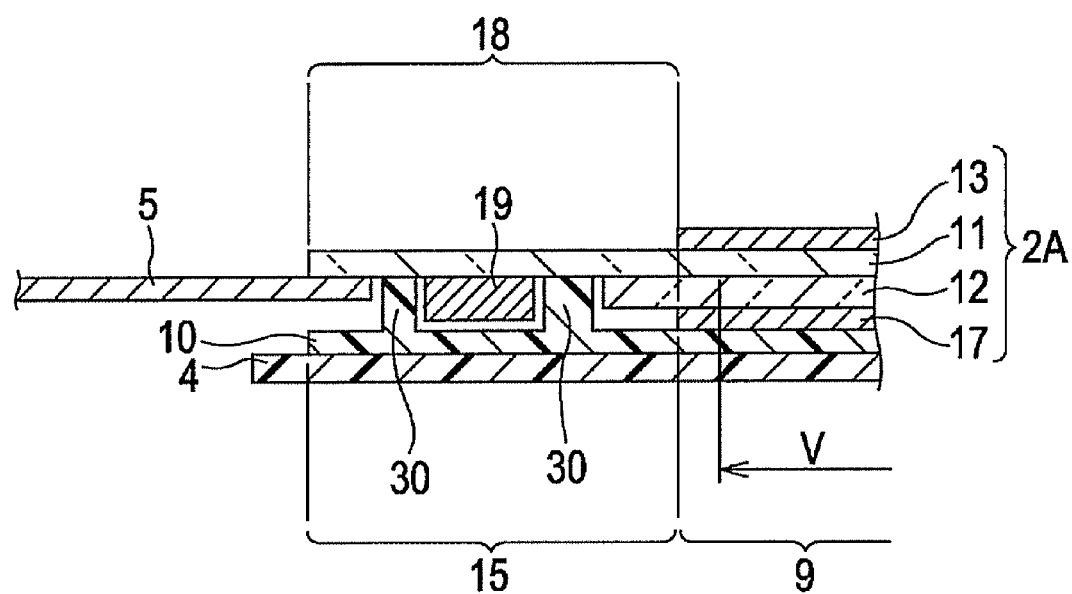
FIG. 19B is a side sectional view of main parts of an electro-optical device according to an eighteenth embodiment of the invention.

FIG. 19B shows a sectional structure of main parts of a liquid crystal display serving as an electro-optical device of this embodiment. The liquid crystal panel 2A shown in FIG. 19B has the same configuration as the liquid crystal panel represented by the same reference numeral in FIG. 18A. Similarly to the foregoing embodiment, the liquid crystal panel 2A is housed in the lower frame 3 of FIG. 17, and is further received by the protective cover 4 to be protected.

In the embodiment of FIG. 18A, the entire extended portion 15 of the additional member 10 extending outside of the polarizing plate 17 serving as a surface member in plan view becomes the thick portion 30, and the extended portion 15 is in contact with or close to the surface of the driving IC 19. In the embodiment of FIG. 19A, a portion on the tip side of the extended portion 15 of the additional member 10 becomes the thick portion 30, and the thick portion 30 is in contact with or close to the surface of the connection end portion of the FPC board 5 to the element substrate 11. In contrast, in this embodiment, as shown in FIG. 19B, a portion of the extended portion 15 surrounding the driving IC 19 becomes a thick portion 30. The thickness of the thick portion 30 is set such that, in a state where the main body receiving portion 9 of the additional member 10 is in contact with the polarizing plate 17, the surface of the thick portion 30 on the liquid crystal panel side is in contact with or close to the surface of the element substrate 11.

In this embodiment, the main body receiving portion 9 of the additional member 10 is in contact with the surface of the polarizing plate 17 serving as a surface member of the liquid crystal panel 2A. Therefore, the entire liquid crystal panel 2A is received by the protective cover 4 through the additional member 10. In addition, the surface of the thick portion 30 of the extended portion 15 of the additional member 10 on the liquid crystal panel side is in contact with or close to the surface of the element substrate 11. Therefore, the extended portion 18 of the element substrate 11 is received by the protective cover 4 through the extended portion 15 of the additional member 10.

With the above-described receiving structure of the additional member 10 and the protective cover 4, the entire liquid crystal panel 2A of FIG. 19B is received by the additional member 10 formed of an impact absorbing material. For this reason, as shown in FIG. 26B, when impact is applied to the liquid crystal panel due to dropping, the liquid crystal panel 2A is not subjected to large impact, and is protected from being damaged or cracked.

The space in the end portion of the liquid crystal panel 2A is buried by the thick portion 30 of the additional member 10. That is, the extended portion 18 of the element substrate 11 of the liquid crystal panel 2A is received by the extended portion 15 of the additional member 10, and is further received by the protective cover 4. For this reason, the element substrate 11 is not curved or bent, and thus bending stress is not generated at the boundary between the element substrate 11 and the color filter substrate 12, that is, in the step portion. As a result, the element substrate 11 is prevented from being damaged or cracked. In this way, a liquid crystal display having excellent impact resistance is configured.

In this embodiment, the additional member 10 is provided between the extended portion 18 of the element substrate 11 and the protective cover 4 in the end portion of the liquid crystal panel 2A, and simultaneously the additional member 10 is provided in a portion other than the effective display region V in the main body portion of the liquid crystal panel 2A. That is, the additional member 10 extends to the main body portion, as well as the end portion of the liquid crystal panel 2A. For this reason, no step is newly formed between the end portion and the main body portion of the liquid crystal panel 2A. In addition, if the additional member 10 extends to the main body portion of the liquid crystal panel 2A so as to be disposed in the peripheral region of the effective display region V, the main body portion of the liquid crystal panel 2A where the element substrate 11 and the color filter substrate 12 overlap each other can be reinforced.

Electro-Optical Device According to Nineteenth Embodiment

Figure 20A:
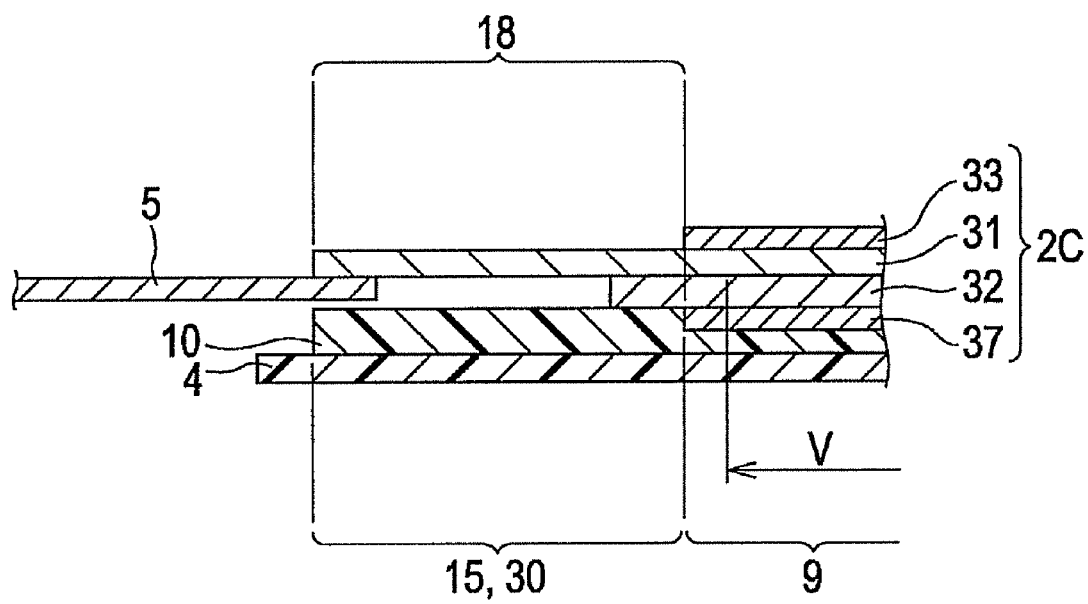
FIG. 20A is a side sectional view of main parts of an electro-optical device according to a nineteenth embodiment of the invention.

FIG. 20A shows a sectional structure of main parts of a liquid crystal display serving as an electro-optical device of this embodiment. Instead of the liquid crystal panel 2A of FIG. 17, a liquid crystal panel 2C is housed in the lower frame 3 and is protected by the protective cover 4. The liquid crystal panel 2C has an element substrate 31, a polarizing plate 33 adhered to the outer surface of the element substrate 31, a color filter substrate 32, and a polarizing plate 37, serving as a surface member, adhered to the color filter substrate 32.

Similarly to the element substrate 11 shown in FIG. 17, on the element substrate 31, a plurality of source lines 14 are formed so as to extend in the column direction Y, and a plurality of gate lines 16 are formed so as to extend in the row direction X perpendicular to the column direction Y. In each rectangular planar region surrounded by the source lines 14 and the gate lines 16, a TFT element serving as a switching element or an active element, a pixel electrode, and the like, all of which are not shown, are formed. In this embodiment, the TFT element is formed using a low-temperature polysilicon semiconductor.

In this embodiment, when the TFT element is formed using a low-temperature polysilicon semiconductor, the same circuit as the electronic circuit formed in the driving IC 19 of FIG. 17 is incorporated in the peripheral region of the element substrate 31 outside the effective display region V. In this embodiment using the SOG technique, as shown in FIG. 20A, no driving IC is mounted on the surface of the extended portion 18 of the element substrate 31.

In this embodiment, the entire extended portion 15 of the additional member 10 becomes a thick portion 30. Therefore, the surface of the extended portion 15 on the liquid crystal panel is in contact with or close to the surface of a portion outside of the polarizing plate 37 on the color filter substrate 32 in plan view. A slight gap is present between the tip portion of the extended portion 15 and the surface of the connection end portion of the FPC board 5 to the element substrate 31. Alternatively, the extended portion 15 may be in contact with the FPC board 5. The thickness of the thick portion 30 is set such that, in a state where the main body receiving portion 9 of the additional member 10 is in contact with the polarizing plate 37, the surface of the thick portion 30 on the liquid crystal panel side is in contact with or close to the surface of the color filter substrate 32.

In this embodiment, the main body receiving portion 9 of the additional member 10 is in contact with the surface of the polarizing plate 37 serving as a surface member of the liquid crystal panel 2C. Therefore, the entire liquid crystal panel 2C is received by the protective cover 4 through the additional member 10. In addition, the thick portion 30 of the extended portion 15 of the additional member 10 on the liquid crystal panel side is in contact with or close to the surface of the color filter substrate 32. Therefore, the extended portion 18 of the element substrate 31 is received by the extended portion 15 of the additional member 10 through the color filter substrate 32 and the FPC board 5, and is further received by the protective cover 4. A slight gap is present between the FPC board 5 and the extended portion 15 of the additional member 10, but in this state, the extended portion 15 can sufficiently receive the extended portion 18 of the element substrate 31.

With the above-described receiving structure of the additional member 10 and the protective cover 4, the entire liquid crystal panel 2C of FIG. 20A is received by the additional member 10 formed of an impact absorbing material. For this reason, as shown in FIG. 26B, when impact is applied to the liquid crystal panel due to dropping, the liquid crystal panel 2C is not subjected to impact, and is protected from being damaged or cracked.

The space in the end portion of the liquid crystal panel 2C is buried by the thick portion 30 of the additional member 10. That is, the extended portion 18 of the element substrate 31 of the liquid crystal panel 2C can be received by the extended portion 15 of the additional member 10 through the color filter substrate 32, and can be further received by the extended portion 15 of the additional member 10 in the connection end portion of the FPC board 5 to the element substrate 31. For this reason, the element substrate 31 is not curved or bent, and thus bending stress is not generated at the boundary between the element substrate 31 and the color filter substrate 32. As a result, the element substrate 31 is prevented from being damaged or cracked. In this way, a liquid crystal display having excellent impact resistance is configured.

In this embodiment, the additional member 10 is provided between the extended portion 18 of the element substrate 31 and the protective cover 4 in the end portion of the liquid crystal panel 2C, and simultaneously the additional member 10 is provided in a portion other than the effective display region V in the main body portion of the liquid crystal panel 2C. That is, the additional member 10 extends to the main body portion, as well as the end portion of the liquid crystal panel 2C. For this reason, no step is newly formed between the end portion and the main body portion of the liquid crystal panel 2C. In addition, if the additional member 10 extends to the main body portion of the liquid crystal panel 2C so as to be disposed in the peripheral region of the effective display region V, the main body portion of the liquid crystal panel 2C where the element substrate 31 and the color filter substrate 32 overlap each other can be reinforced.

Electro-Optical Device According to Twentieth Embodiment

Figure 20B:
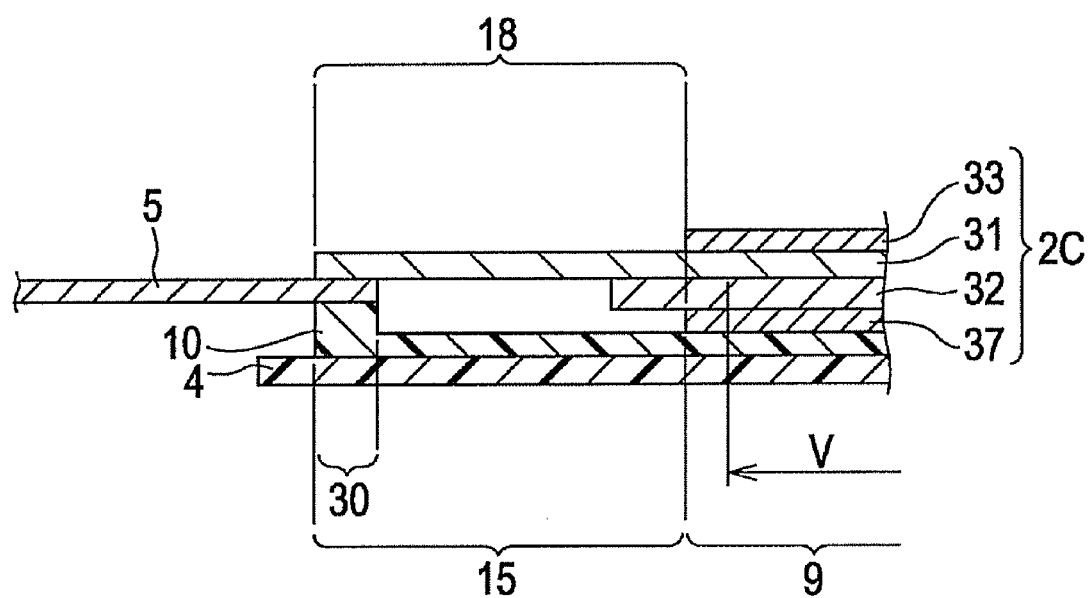
FIG. 20B is a side sectional view of main parts of an electro-optical device according to a twentieth embodiment of the invention.

FIG. 20B shows a sectional structure of main parts of a liquid crystal display serving as an electro-optical device of this embodiment. The liquid crystal panel 2C shown in FIG. 20B has the same configuration as the liquid crystal panel represented by the same reference numeral in FIG. 20A. Similarly to the foregoing embodiment, the liquid crystal panel 2C is housed in the lower frame 3 of FIG. 17, and is further received by the protective cover 4 to be protected.

In the embodiment of FIG. 20A, the entire extended portion 15 of the additional member 10 extending outside of the polarizing plate 37 serving as a surface member in plan view becomes the thick portion 30, and a portion of the extended portion 15 is in contact with the edge portion of the color filter substrate 32. In contrast, in this embodiment, as shown in FIG. 20B, a portion on the tip side of the extended portion 15 of the additional member 10 becomes a thick portion 30, and the thick portion 30 is in contact with or close to the surface of the connection end portion of the FPC board 5 to the element substrate 31. The thickness of the thick portion 30 is set such that, in a state where the main body receiving portion 9 of the additional member 10 is in contact with the polarizing plate 37, the surface of the thick portion 30 on the liquid crystal panel side is in contact with or close to the surface of the FPC board 5.

As described above, the main body receiving portion 9 of the additional member 10 is in contact with the surface of the polarizing plate 37 serving as a surface member of the liquid crystal panel 2C. Therefore, the entire liquid crystal panel 2C is received by the protective cover 4 through the additional member 10. In addition, the surface of the thick portion 30 of the extended portion 15 of the additional member 10 on the liquid crystal panel side is in contact with or close to the surface of the FPC board 5. Therefore, the extended portion 18 of the element substrate 31 is received by the extended portion 15 of the additional member 10 and the protective cover 4 through the FPC board 5.

With the above-described receiving structure of the additional member 10 and the protective cover 4, the entire liquid crystal panel 2C of FIG. 20B is received by the additional member 10 formed of an impact absorbing material. For this reason, as shown in FIG. 26B, when impact is applied to the liquid crystal panel due to dropping, the liquid crystal panel 2C is not subjected to impact, and is protected from being damaged or cracked.

The space in the end portion of the liquid crystal panel 2C is buried by the thick portion 30 of the additional member 10. That is, the extended portion 18 of the element substrate 31 of the liquid crystal panel 2C is received by the extended portion 15 of the additional member 10 through the FPC board 5, and is further received by the protective cover 4. For this reason, the element substrate 31 is not curved or bent, and thus bending stress is not generated at the boundary between the element substrate 31 and the color filter substrate 32. As a result, the element substrate 31 is prevented from being damaged or cracked. In this way, a liquid crystal display having excellent impact resistance is configured.

In this embodiment, the additional member 10 is provided between the extended portion 18 of the element substrate 31 and protective cover 4 in the end portion of the liquid crystal panel 2C, and simultaneously the additional member 10 is provided in a portion other than the effective display region V in the main body portion of the liquid crystal panel 2C. That is, the additional member 10 extends to the main body portion, as well as the end portion of the liquid crystal panel 2C. For this reason, no step is newly formed between the end portion and the main body portion of the liquid crystal panel 2C. In addition, if the additional member 10 extends to the main body portion of the liquid crystal panel 2C so as to be disposed in the peripheral region of the effective display region V, the main body portion of the liquid crystal panel 2C where the element substrate 31 and the color filter substrate 32 overlap each other can be reinforced.

Electro-Optical Device According to Twenty-First Embodiment

Figure 21A:
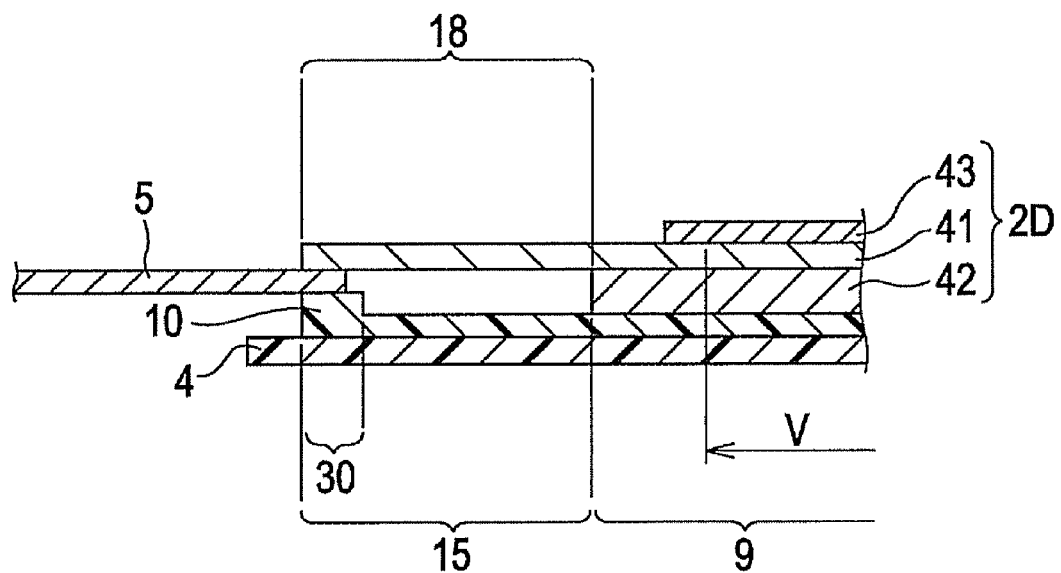
FIG. 21A is a side sectional view of main parts of an electro-optical device according to a twenty-first embodiment of the invention.

FIG. 21A shows a sectional structure of main parts of a liquid crystal display serving as an electro-optical device of this embodiment. In this liquid crystal display, instead of the liquid crystal panel 2A of FIG. 17, the liquid crystal panel 2D is housed in the lower frame 3 and is protected by the protective cover 4. The liquid crystal panel 2D has an element substrate 41, a polarizing plate 43 adhered to the outer surface of the element substrate 41, and a color filter substrate 42. No polarizing plate is provided on the outer surface of the color filter substrate 42. That is, the color filter substrate 42 itself forms a surface member that is a member provided on the outermost side of the liquid crystal panel 2D.

A polarizing element having the same function as the polarizing plate 17 of FIG. 18A is formed on the surface of the color filter substrate 42 between the element substrate 41 and the color filter substrate 42 by a known film forming process. That is, the polarizing plate on the color filter substrate 42 is formed inside of the panel. A portion extending outside of the color filter substrate 42 serving as a surface member on the element substrate 41 in plan view is an extended portion 18 of the element substrate 41.

The additional member 10 has a main body receiving portion 9 that is in contact with the color filter substrate 42 as a surface member of the liquid crystal panel 2D and receives the color filter substrate 42, and an extended portion 15 that extends outside of the color filter substrate 42 in plan view. A tip portion of the extended portion 15 becomes a thick portion 30. The thick portion 30 is in contact with or close to the surface of the connection end portion of the FPC board 5 to the element substrate 41. The thickness of the thick portion 30 is set such that, in a state where the main body receiving portion 9 of the additional member 10 is in contact with the color filter substrate 42, the surface of the thick portion 30 on the liquid crystal panel side is in contact with or close to the surface of the FPC board 5.

In this embodiment, the main body receiving portion 9 of the additional member 10 is in contact with the surface of the color filter substrate 42 serving as a surface member of the liquid crystal panel 2D. Therefore, the entire liquid crystal panel 2D is received by the protective cover 4 through the additional member 10. In addition, the surface of the thick portion 30 of the extended portion 15 of the additional member 10 on the liquid crystal panel side is in contact with or close to the surface of the FPC board 5. Therefore, the extended portion 18 of the element substrate 41 is received by the extended portion 15 of the additional member 10 through the FPC board 5, and is further received by the protective cover 4.

With the above-described receiving structure of the additional member 10 and the protective cover 4, the entire liquid crystal panel 2D of FIG. 21A is received by the additional member 10 formed of an impact absorbing material. Therefore, as shown in FIG. 26B, when impact is applied to the liquid crystal panel due to dropping, the liquid crystal panel 2D is not subjected to large impact, and is protected from being damaged or cracked.

The space in the end portion of the liquid crystal panel 2D is buried by the thick portion 30 of the additional member 10. That is, the extended portion 18 of the element substrate 41 of the liquid crystal panel 2D is received by the extended portion 15 of the additional member 10 through the FPC board 5. For this reason, the element substrate 41 is not curved or bent, and thus bending stress is not generated at the boundary between the element substrate 41 and the color filter substrate 42. As a result, the element substrate 41 is prevented from being damaged or cracked. In this way, a liquid crystal display having excellent impact resistance is configured.

In this embodiment, the additional member 10 is provided between the extended portion 18 of the element substrate 41 and the protective cover 4 in the end portion of the liquid crystal panel 2D, and simultaneously the additional member 10 is provided in a portion other than the effective display region V in the main body portion of the liquid crystal panel 2D. That is, the additional member 10 extends to the main body portion, as well as the end portion of the liquid crystal panel 2D. For this reason, no step is newly formed between the end portion and the main body portion of the liquid crystal panel 2D. In addition, if the additional member 10 extends to the main body portion of the liquid crystal panel 2D so as to be disposed in the peripheral region of the effective display region V, the main body portion of the liquid crystal panel 2D where the element substrate 41 and the color filter substrate 42 overlap each other can be reinforced.

Electro-Optical Device According to Twenty-Second Embodiment

Figure 21B:
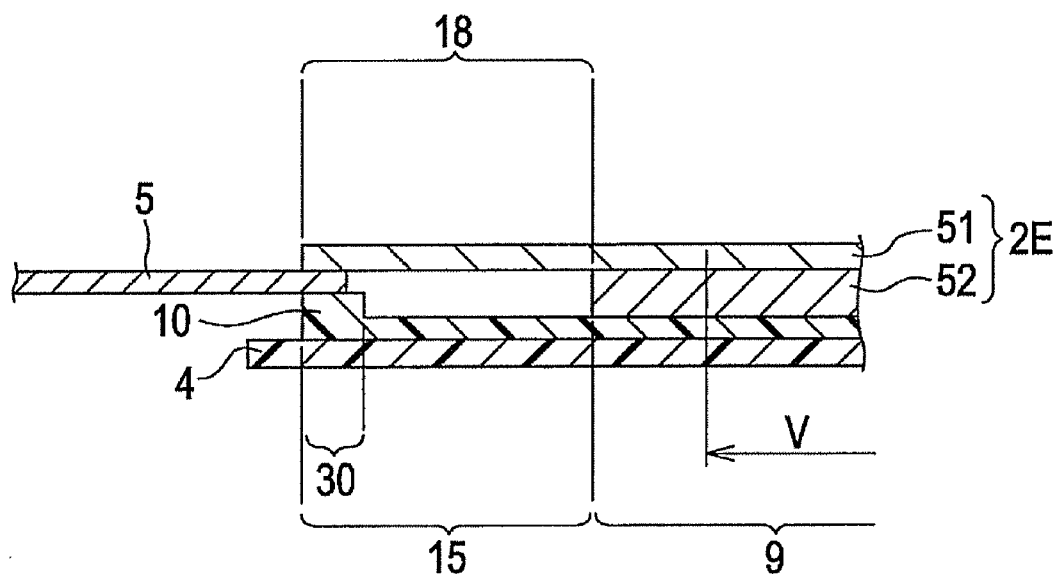
FIG. 21B is a side sectional view of main parts of an electro-optical device according to a twenty-second embodiment of the invention.

FIG. 21B shows a sectional structure of main parts of an organic EL display serving as an electro-optical device of this embodiment. In this embodiment, the same parts as those in the embodiment of FIG. 5 are represented by the same reference numerals, and descriptions thereof will be omitted. In this display, instead of the liquid crystal panel 2A of FIG. 17, an EL panel 2E serving as an electro-optical panel is housed in the lower frame 3 and is protected by the protective cover 4. The EL panel 2E has an element substrate 51 and a counter substrate 52.

An FPC board 5 is connected to the edge portion of the extended portion 18 extending outside of a surface member on the element substrate 51 in plan view.

An additional member 10 has a main body receiving portion 9 that is in contact with the counter substrate 52 serving as a surface member of the EL panel 2E and receives the counter substrate 52, and an extended portion 15 that extends outside of the counter substrate 52 in plan view. A tip portion of the extended portion 15 becomes a thick portion 30. The thick portion 30 is in contact with or close to the surface of the connection end portion of the FPC board 5 to the element substrate 51. The thickness of the thick portion 30 is set such that, in a state where the main body receiving portion 9 of the additional member 10 is in contact with the counter substrate 52, the surface of the thick portion 30 on the EL panel side is in contact with or close to the surface of the FPC board 5.

In this embodiment, the main body receiving portion 9 of the additional member 10 is in contact with or close to the counter substrate 52 serving as a surface member of the EL panel 2E. Therefore, the entire EL panel 2E is received by the protective cover 4 through the additional member 10. In addition, the surface of the thick portion 30 of the extended portion 15 of the additional member 10 on the EL panel side is in contact with or close to the surface of the FPC board 5. Therefore, the extended portion 18 of the element substrate 51 is received by the extended portion 15 of the additional member 10 through the FPC board 5, and is further received by the protective cover 4.

With the above-described receiving structure of the additional member 10 and the protective cover 4, the entire EL panel 2E of FIG. 21B is received by the additional member 10 formed of an impact absorbing material. For this reason, as shown in FIG. 26B, when impact is applied to the EL panel due to dropping, the EL panel 2E is not subjected to large impact, and is protected from being damaged or cracked.

The space in the end portion of the EL panel 2E is buried by the thick portion 30 of the additional member 10. Therefore, the extended portion 18 of the element substrate 51 of the EL panel 2E is received by the extended portion 15 of the additional member 10 through the FPC board 5, and is further received by the protective cover 4. For this reason, the element substrate 51 is not curved or bent, and thus bending stress is not generated at the boundary between the element substrate 51 and the counter substrate 52. As a result, element substrate 51 is prevented from being damaged or cracked. In this way, a liquid crystal display having excellent impact resistance is configured.

In this embodiment, the additional member 10 is provided between the extended portion 18 of the element substrate 51 and the protective cover 4 in the end portion of the EL panel 2E, and simultaneously the additional member 10 is provided in a portion other than the effective display region V in the main body portion of the EL panel 2E. That is, the additional member 10 extends to the main body portion, as well as the end portion of the EL panel 2E. For this reason, no step is newly formed between the end portion and the main body portion of the EL panel 2E. In addition, if the additional member 10 extends to the main body portion of the EL panel 2E so as to be disposed in the peripheral region of the effective display region V, the main body portion of the EL panel 2E where the element substrate 51 and the counter substrate 52 overlap each other can be reinforced.

Modification 3 of Electro-Optical Device

Figure 22:
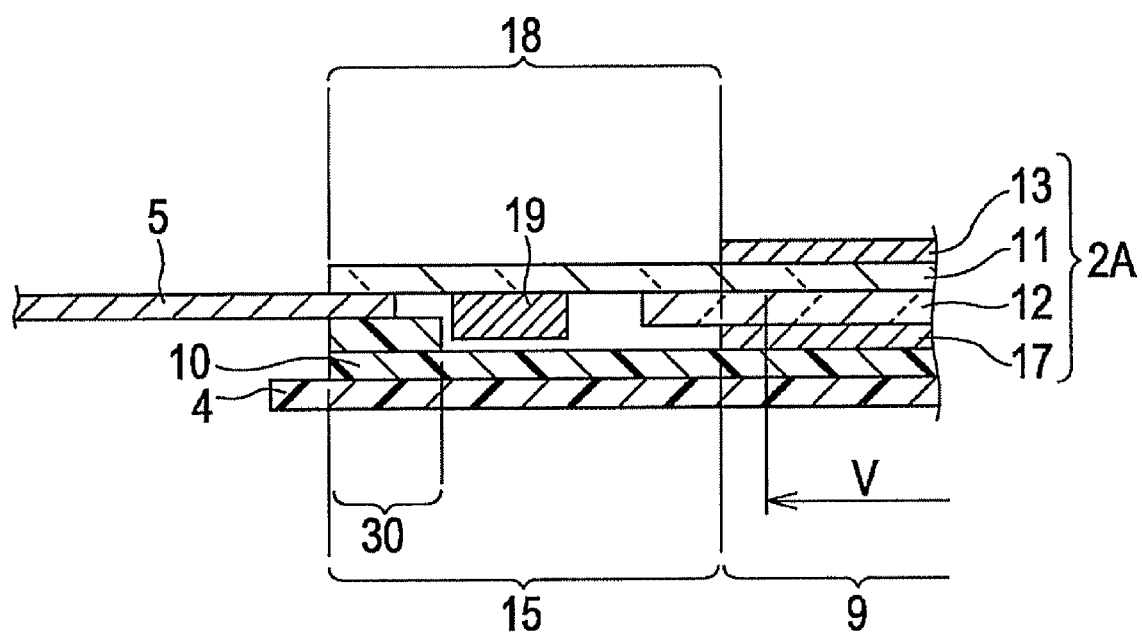
FIG. 22 is a side sectional view of main parts of the electro-optical device according to the twenty-second embodiment of the invention.

In the sixteenth to twenty-second embodiments, as shown in FIGS. 18A, 19A, 19B, 20A, 20B, 21A, and 21B, the thick portion 30 of the extended portion 15 of the additional member 10 is integrally connected to the remaining portion of the additional member 10 in a material manner, that is, in a member manner. Alternatively, for example, as shown in FIG. 22, which is a modification of FIG. 19A, a protruding portion of the thick portion 30 of the extended portion 15 of the additional member 10 toward the substrate 11 may be formed separately from the remaining portion of the additional member 10 in a material manner, that is, in a member manner, and the protruding portion and the remaining portion are bonded to each other, thereby forming the thick portion 30. In this case, the shape or dimension of the thick portion 30 can be freely formed. In addition, the main body portion and the thick portion 30 of the additional member 10 can be formed of materials having different properties, and as a result, a degree of freedom in design increases.

Electronic Apparatus According to Twenty-Third Embodiment

Figure 23:
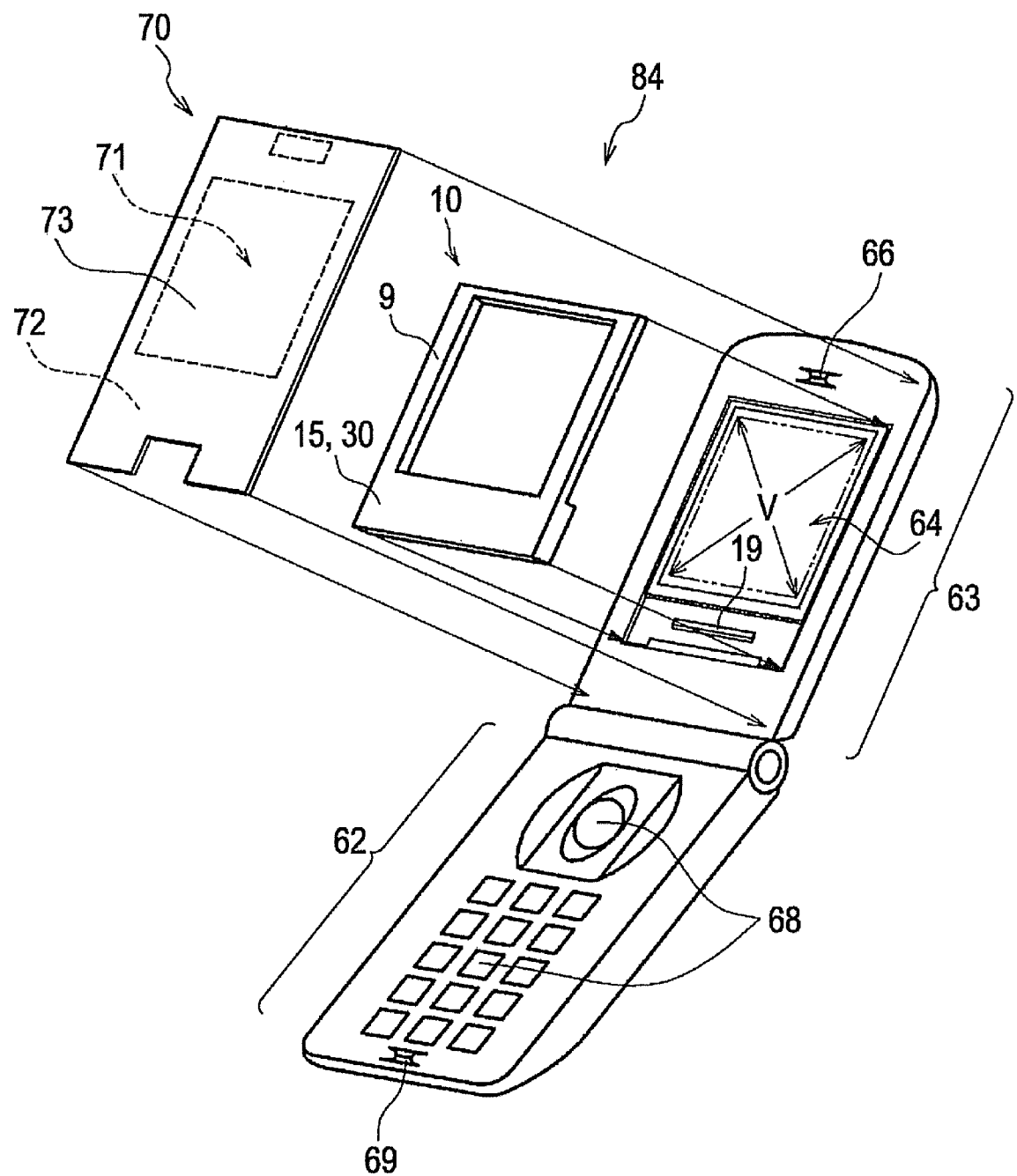
FIG. 23 is an exploded perspective view of an electronic apparatus according to a twenty-third embodiment of the invention.

FIG. 23 is an exploded perspective view of an electronic apparatus of this embodiment. A mobile phone 84 shown in FIG. 23 has a main body portion 62 and a display body portion 63 provided openably with respect to the main body portion 62. The display body portion 63 is provided with an electro-optical panel 64 and a receiver 66. A machine frame portion of the display body portion 63 forms a casing for housing, fixing and supporting the electro-optical panel 64. Various kinds of display regarding a telephone call are displayed in the effective display region V of the electro-optical panel 64. A control section for controlling the operation of the electro-optical panel 64 is incorporated into the main body portion 62 or the display body portion 63 as a part of a controller for overall control of the mobile phone or separately from the controller. The main body portion 62 is provided with operating buttons 68 and a transmitter 69.

The electro-optical panel 64 is formed by the liquid crystal panel 2A shown in FIG. 18A, 19A, or 19B, the liquid crystal panel 2C shown in FIG. 20A or 20B, the liquid crystal panel 2D shown in FIG. 21A, the EL panel 2E shown in FIG. 21B, or the liquid crystal panel 2A shown in FIG. 22. FIG. 23 shows a case in which the liquid crystal panel 2A of FIG. 18A is representatively used. The electro-optical panel 64 is housed in a container provided in the display body portion 63. A protective cover 70 is mounted in the machine frame portion on the surface of the display body portion 63 by bonding so as to cover the electro-optical panel 64 with an additional member 10 serving as a protective member interposed therebetween. The protective cover 70 is formed, for example, by adhering a transparent plastic sheet 73 to the entire surface of a plastic flat plate frame 72 having a rectangular opening 71 such that the opening 71 is covered with the transparent plastic sheet 73. The protective cover 70 is a sheet member that has flexibility and sufficient elastic strength to constantly maintain the planar sheet shape. The additional member 10 may be fixed to the electro-optical panel 64 by bonding or adhesion in advance, or may not be fixed to the protective cover 70.

The additional member 10 is formed of the above-described impact absorbing material. The additional member 10 has a main body receiving portion 9 receiving the main body portion of the electro-optical panel 64, and an extended portion 15 extending outside of the surface member (for example, in the liquid crystal panel 2A of FIG. 18A, the polarizing plate 17) of the electro-optical panel 64 in plan view. The main body receiving portion 9 has a ring shape larger than the effective display region V. The entire extended portion 15 is formed so as to be thicker than the main body receiving portion 9, and becomes a thick portion 30. The main body receiving portion 9 and the extended portion 15 are integrally connected to each other in a material manner, that is, in a member manner. The thickness of the extended portion 15 is set such that, in a state where the surface of the main body receiving portion 9 on the electro-optical panel 64 side is in contact with or close to the surface member of the electro-optical panel 64, the surface of the extended portion 15 on the electro-optical panel 64 side is in contact with or close to the surface of the driving IC 19.

In the assembling structure of the electro-optical panel 64, the additional member 10, and the protective cover 70 of this embodiment, the main body receiving portion 9 of the additional member 10 is in contact with the surface member of the electro-optical panel 64, for example, the polarizing plate 17 of FIG. 18A. Therefore, the entire electro-optical panel 64 is received by the protective cover 70 through the additional member 10. In addition, the surface of the extended portion 15 of the additional member 10 on the electro-optical panel 64 side is in contact with or close to the surface of the driving IC 19. Therefore, the extended portion of the substrate (for example, the extended portion 18 of the element substrate 11 in FIG. 18A) of the electro-optical panel 64 is received by the extended portion 15 of the additional member 10 and the protective cover 70 through the driving IC 19.

With the above-described receiving structure of the additional member 10 and the protective cover 70, the entire electro-optical panel 64 of FIG. 23 is received by the additional member 10 formed of an impact absorbing material. For this reason, as shown in FIG. 26B, when impact is applied to the electro-optical panel due to dropping, the electro-optical panel 64 is not subjected to large impact, and is protected from being damaged or cracked.

The space in the end portion of the electro-optical panel 64 is buried by the thick portion 30 of the additional member 10. That is, the extended portion of the substrate in the electro-optical panel 64 is received by the extended portion 15 of the additional member 10 and the protective cover 70 through the driving IC 19. For this reason, the substrate is not curved or bent, and thus bending stress is not generated in the substrate. As a result, the substrate is prevented from being damaged or cracked. In this way, an electro-optical device having excellent impact resistance is configured. Since the internal electro-optical device has high impact resistance, the mobile phone of this embodiment also has effectively high impact resistance.

Electro-Optical Device According to Twenty-Fourth Embodiment

Figure 24:
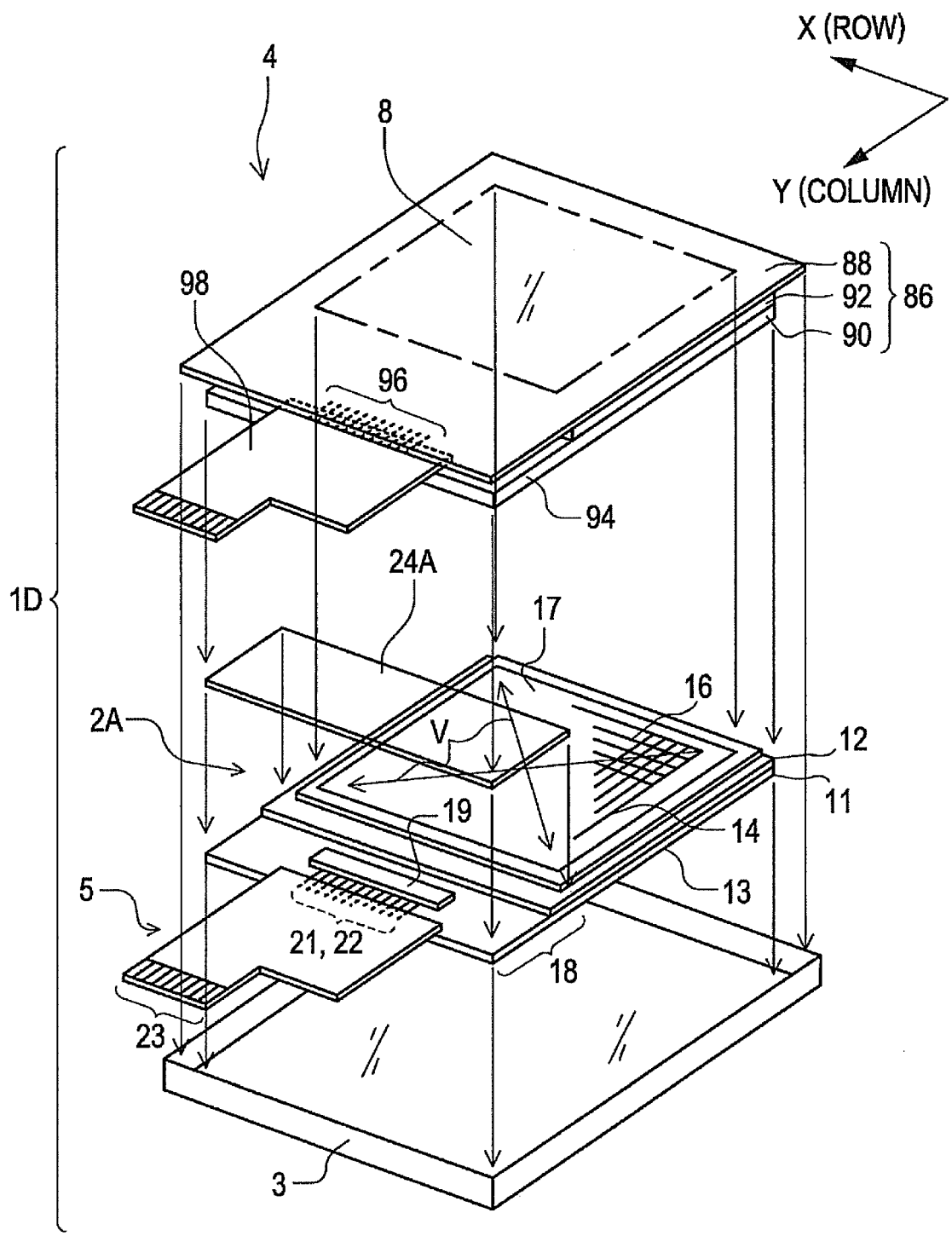
FIG. 24 is an exploded perspective view showing an electro-optical device according to a twenty-fourth embodiment of the invention.

FIG. 24 shows a liquid crystal display which is an example of an electro-optical device of this embodiment. In FIG. 24, a liquid crystal display 1D has the same configuration as the liquid crystal display 1A of the first embodiment shown in FIG. 1, excluding a touch panel 86. The same parts are represented by the same reference numerals, and descriptions thereof will be omitted.

The liquid crystal display 1D of this embodiment includes a liquid crystal panel 2A, and a touch panel 86, serving as a protective member, which is disposed to overlap a surface on a side of the liquid crystal panel 2A, from which display light is emitted.

The touch panel 86 that is disposed to overlap the liquid crystal panel 2A has a front substrate 88 and a rear substrate 90 disposed so as to be opposite each other at a predetermined gap. The substrates 88 and 90 are integrally bonded to each other by a sealing material 92 provided between the edge portions of the substrates 88 and 90.

The front substrate 88 has a uniform planar-shaped planar electrode, made of a transparent conductive material, having a uniform planar shape disposed on an inner surface (a surface on the rear substrate 90 side) of a substrate main body serving as a transparent substrate (not shown). The rear substrate 90 has a uniform planar-shaped planar electrode made of a transparent conductive material and a buffer material on an inner surface (a surface on the front substrate 88 side) of a substrate main body serving as a transparent substrate (not shown).

The rear substrate 90 is provided with an extracted portion 94 extracted toward an outer circumference of the front substrate 88. A terminal portion 96 is formed in the extracted portion 94, and the planar electrode of the front substrate 88 and the planar electrode of the rear substrate 90 are electrically connected to the terminal portion 96. The terminal portion 96 is electrically connected to an external input control circuit through a flexible board 98.

If a user presses the upper surface of the front substrate 88 of the touch panel 86 with an input device or his/her finger, the planar electrode of the front substrate 88 comes into contact with the planar electrode of the rear substrate 90, and the voltage value of the planar electrode is measured by the input control circuit through the planar electrode. When a press position by the input device or the user's finger moves in a predetermined direction on the upper surface of the front substrate 88, the input control circuit detects the position coordinate values in the X direction and Y direction of the press position having moved in the predetermined direction.

A resin film (not shown) formed of a light-transmissive material having a high refractive index is provided between the liquid crystal panel 2A and the touch panel 86. The resin film is formed of methacrylate-based UV curable resin having a refractive index after being cured of 1.4 to 1.9. Instead of the resin layer provided on the entire surface of the rear substrate 90, four sides of the rear substrate 90 may be fixed by a double-sided tape.

A step portion corresponding to the thickness of the color filter substrate 12 and a step portion corresponding to the thickness of the polarizing plate 17 are present between the element substrate 11 and the touch panel 86. The height of a step portion provided in the liquid crystal panel 2A means the total thickness of the step portions. If an additional element is provided on the polarizing plate 17, a corresponding step portion is included in the height of the step portion of the liquid crystal panel 2A. If the touch panel 86 is mounted on the surface of the liquid crystal panel 2A, that is, on the surface of the polarizing plate 17, a space portion is formed between the extended portion 18 of the element substrate 11 and the touch panel 86 due to the step portion of the liquid crystal panel 2A.

A tape 24A serving as a space filling member is provided on the extended portion 18 of the element substrate 11. The tape 24A is provided over a portion of the color filter substrate 12 protruding from the polarizing plate 17 in plan view, the top surface of the driving IC 19, and the upper surface of the connection end portion of the FPC board 5 to the element substrate 11. The height of the outer surface of the tape 24A from the surface of the element substrate 11 is set so as to be equal to the height of the step portion of the liquid crystal panel 2A, in this embodiment, the total thickness of the step portion corresponding to the thickness of the color filter substrate 12 and the step portion corresponding to the thickness of the polarizing plate 17. Therefore, the outer surface of the tape 24A is aligned with the outer surface of the polarizing plate 17 serving as a surface member.

When the tape 24A is formed separately from the touch panel 86, the tape 24A may be fixed to the touch panel 86 by bonding or adhesion, or may not be fixed to the touch panel 86.

As described above, in this embodiment, when the liquid crystal panel 2A is received by the touch panel 86, in a region corresponding to the extended portion 18, the touch panel 86 is in contact with the surface of the tape 24A, such that there is no gap between the touch panel 86 and the extended portion 18. For this reason, as shown in FIG. 26B, even if impact is applied to the liquid crystal panel due to dropping, the element substrate 11 is not curved or bent, and thus bending stress is not generated at the boundary between the element substrate 11 and the color filter substrate 12. As a result, the element substrate 11 is prevented from being damaged or cracked.

The spacer 25 described in the eighth to fourteenth embodiments or the additional member 10 described in the sixteenth to twenty-second embodiments may be provided, instead of the tape 24A. In this case, as shown in FIG. 26B, even if impact is applied to the liquid crystal panel due to dropping, the element substrate 11 is not curved or bent, and thus bending stress is not generated at the boundary between the element substrate 11 and the color filter substrate 12. As a result, the element substrate 11 is prevented from being damaged or cracked.

The touch panel 86 may be used instead of the protective cover 4 in FIGS. 8 and 17.

Electronic Apparatus According to Twenty-Fifth Embodiment

Next, a specific example of an electronic apparatus that includes a liquid crystal display (hereinafter, representatively referred to as a "liquid crystal display 1000 of this embodiment") having a mount structure according to one of the first to fifth, eighth to fourteenth, sixteenth to twenty-second, and twenty-fourth embodiments and modifications will be described with reference to FIG. 25.

An example where the liquid crystal display 1000 is applied to a display body portion of a mobile phone will be described.

Figure 25:
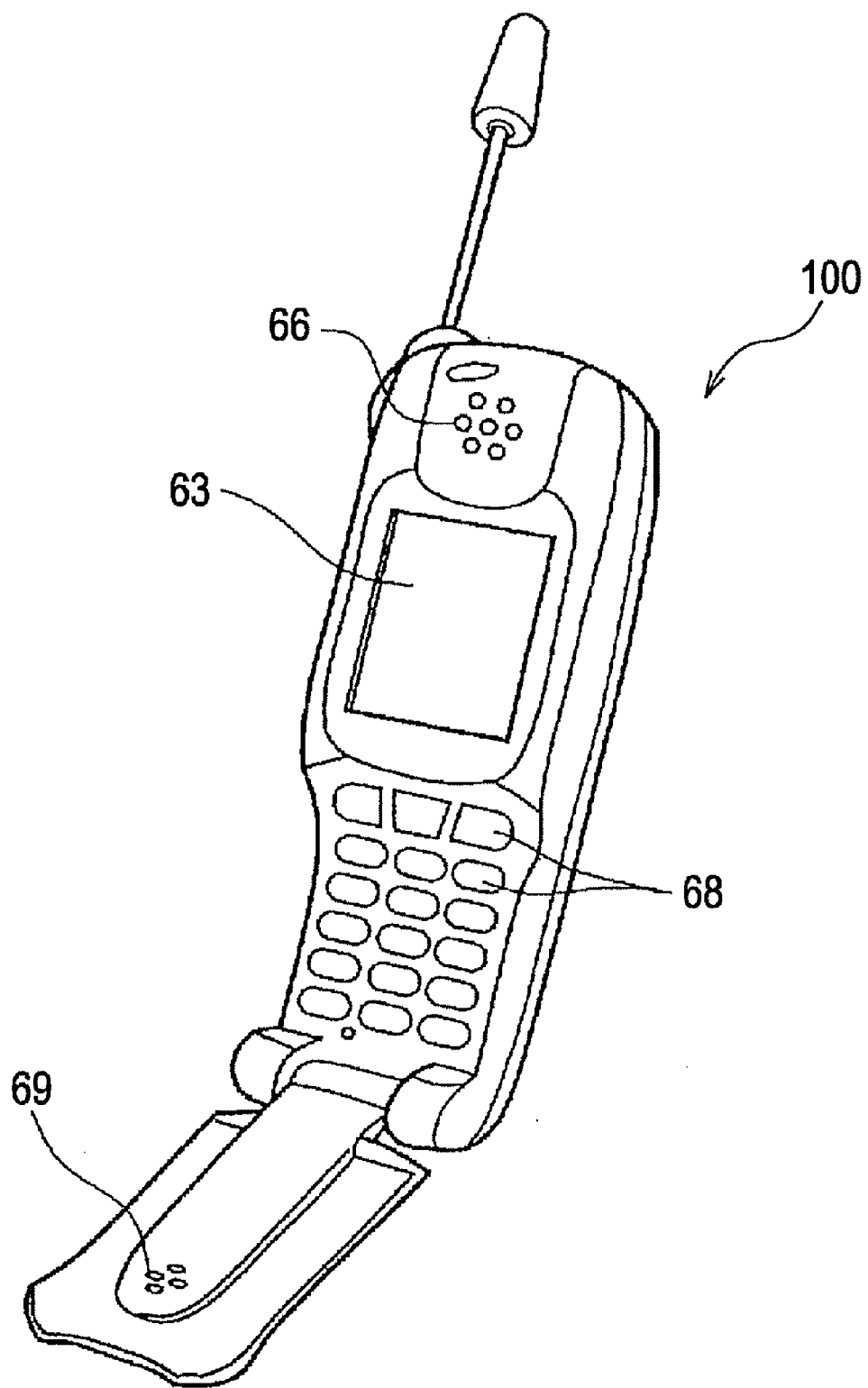
FIG. 25 is a perspective view of an electronic apparatus according to a twenty-fifth embodiment of the invention.

FIG. 25 is a perspective view showing the configuration of a mobile phone. As shown in FIG. 25, a mobile phone 100 includes a plurality of operating buttons 68, a receiver 66, a transmitter 69, and a display body portion 63 to which the liquid crystal display 1000 of this embodiment is applied.

Other Embodiments

Although the invention has been described in connection with the exemplary embodiments, the invention is not limited to the embodiments, and various modification may be made without departing from the scope of the invention described in the appended claims.

Although in the foregoing description, an active matrix type liquid crystal panel is exemplified as an electro-optical panel, a liquid crystal panel may have an arbitrary structure. For example, a simple matrix type liquid crystal panel may be used.

Although in the foregoing embodiments, the invention is applied to a liquid crystal display and an organic EL device, the invention may be applied to other electro-optical devices, for example, an inorganic EL device, a plasma display (PDP: Plasma Display Panel), an electrophoretic display (EPD), and a field emission display (FED).

Although in the foregoing embodiments, the invention is applied to a mobile phone, the invention may be applied to other electronic apparatuses. For example, the invention may be applied to a personal digital assistant (PDA), a personal computer, a liquid crystal television, a view-finder-type or monitor-direct-view-type video tape recorder, a car navigation apparatus, a pager, an electronic organizer, an electronic calculator, a word processor, a workstation, a video phone, a POS terminal, a digital still camera, and an electronic book.

The entire disclosure of Japanese Patent Application Nos: 2008-41042, field Feb. 22, 2008 and 2008-41043, field Feb. 22, 2008 and 2008-41044, field Feb. 22, 2008 are expressly incorporated by reference herein.

What is claimed is:

1. An electro-optical device, comprising:
an electro-optical panel having an electro-optical material, the electro-optical panel including:
    a first substrate;
    a second substrate disposed opposite the first substrate, the second substrate having an extension portion that extends outward relative the first substrate and includes a plurality of terminals;
    a polarizer disposed on the first substrate;
    a flexible printed circuit board connected to the plurality of terminals;
    a protective member disposed on the polarizer and extending outward from the polarizer to overlap the first substrate, the extension portion of the second substrate, and the flexible printed circuit board such that a space is defined between the protective member, the second substrate, and an end of the flexible printed circuit board connected to the terminals, and the polarizer; and
    a tape having a first end disposed directly between and overlapping the protective member and the flexible printed circuit board, the tape extending into the space and having a second end directly adhered to the extension portion of the second substrate such that a gap exists between the second end of the tape and the protective member, and another gap exists between the flexible printed circuit board, a portion of the tape proximate the first end, and the extended portion of the second substrate.

2. The electro-optical device of claim 1, further comprising:
a casing fixed to the panel; and
the protective member is provided in the casing to protect the panel.

3. The electro-optical device according to claim 2, wherein the first end of the tape is fixed to the protective member.

4. An electronic apparatus having mounted thereon the electro-optical device according to claim 1.

* * * * *